July 4, 1967  H. A. CURRIE, JR., ET AL  3,329,807
PRICE COMPUTING AND MARKING APPARATUS
Filed Jan. 14, 1964  20 Sheets-Sheet 1

INVENTORS
HARRY A. CURRIE, JR.,
JACK S. MASON,
ROBERT H. WISE
BY
ATTORNEY

July 4, 1967   H. A. CURRIE, JR., ET AL   3,329,807
PRICE COMPUTING AND MARKING APPARATUS Filed Jan. 14, 1964   20 Sheets-Sheet 2

INVENTOR
HARRY A. CURRIE, JR.,
JACK S. MASON,
ROBERT H. WISE

BY

ATTORNEY

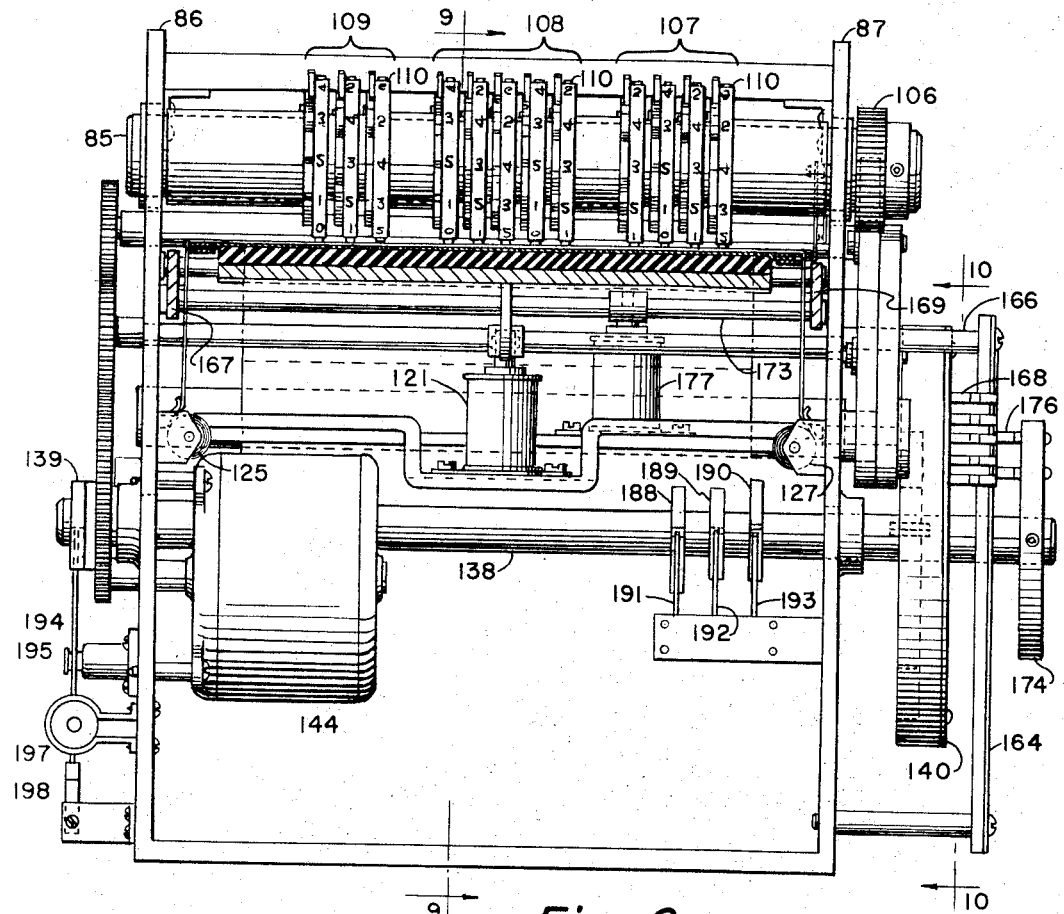
Fig. 6
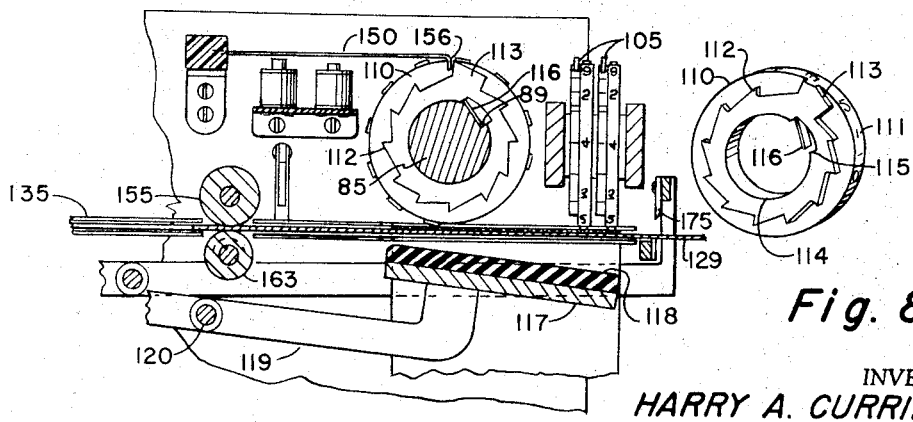
Fig. 12
Fig. 8
INVENTORS
HARRY A. CURRIE, JR.,
JACK S. MASON,
ROBERT H. WISE
BY
ATTORNEY

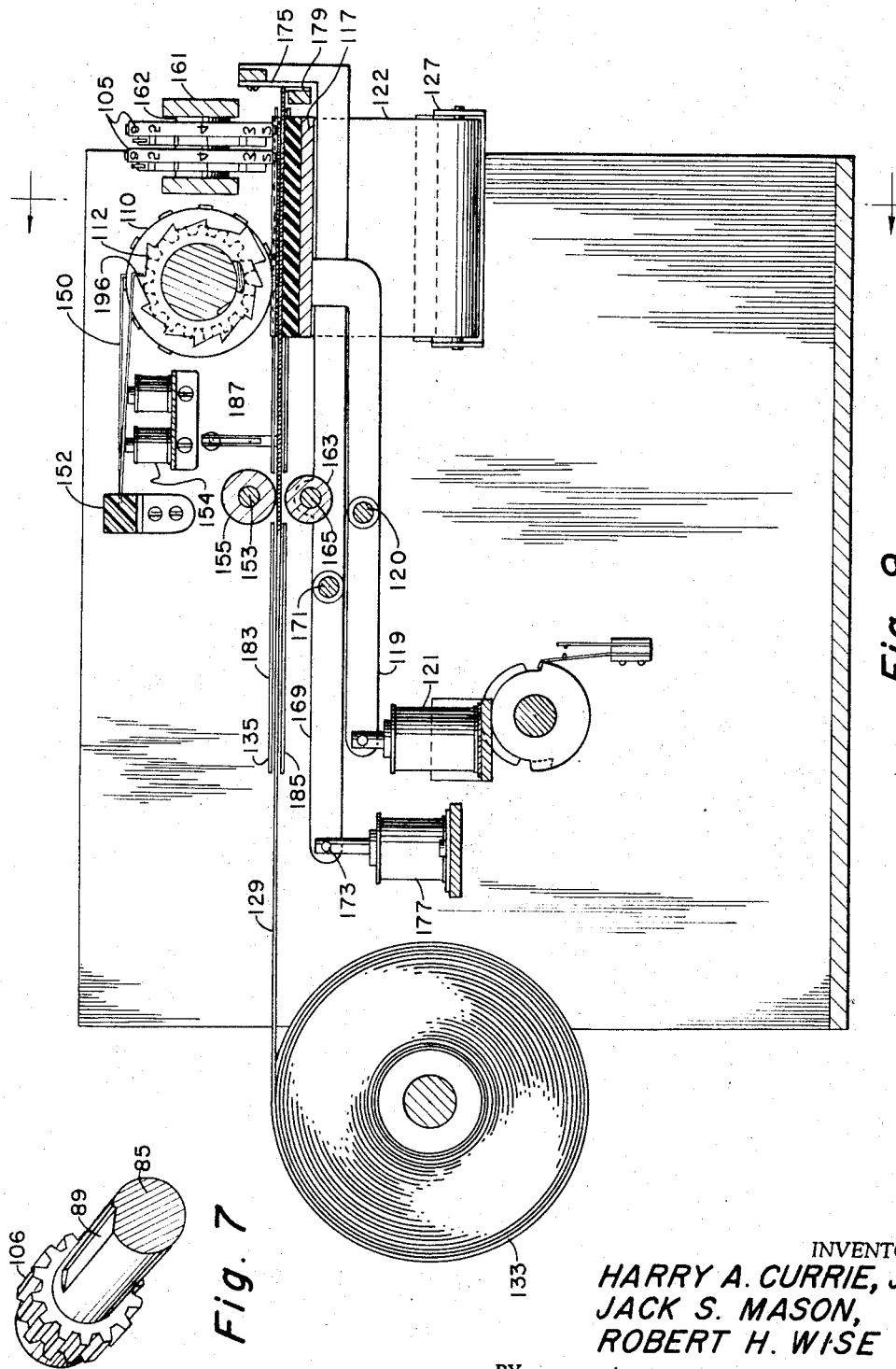

July 4, 1967     H. A. CURRIE, JR., ETAL     3,329,807
PRICE COMPUTING AND MARKING APPARATUS
Filed Jan. 14, 1964     20 Sheets-Sheet 6

HARRY A. CURRIE, JR.,
JACK S. MASON,
ROBERT H. WISE
INVENTORS.

BY

ATTORNEY

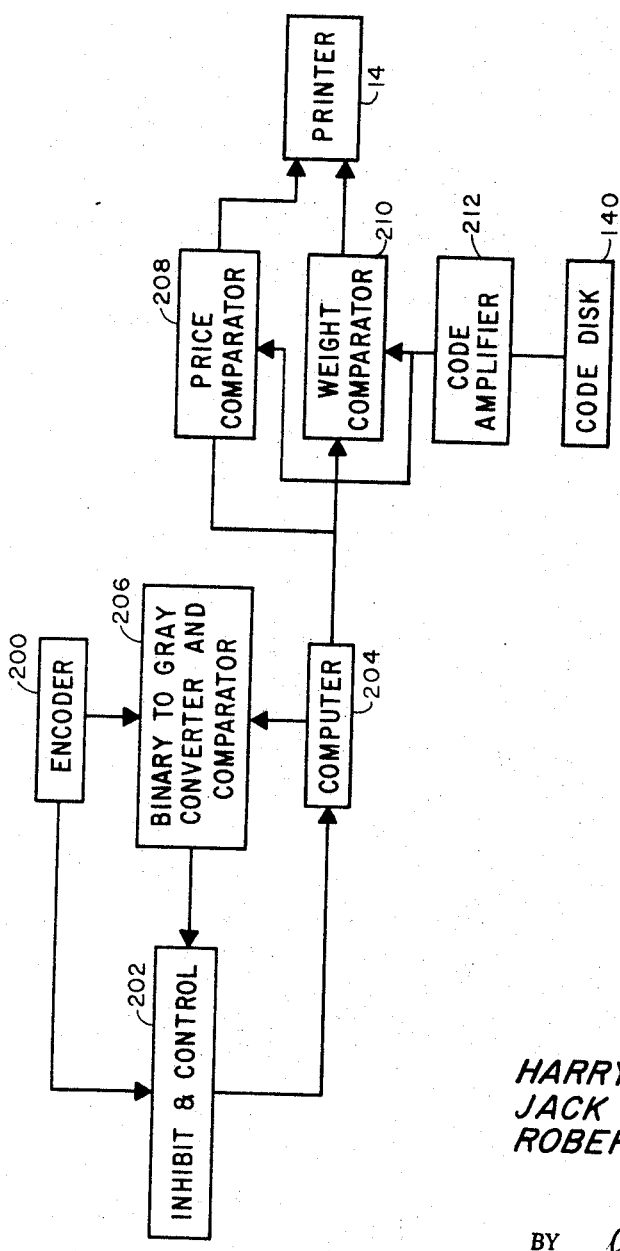

HARRY A. CURRIE, JR.,
JACK S. MASON,
ROBERT H. WISE
INVENTORS

BY

ATTORNEY

HARRY A. CURRIE, JR.,
JACK S. MASON,
ROBERT H. WISE
INVENTORS

July 4, 1967     H. A. CURRIE, JR., ET AL     3,329,807

PRICE COMPUTING AND MARKING APPARATUS

Filed Jan. 14, 1964     20 Sheets-Sheet 14

INVENTOR.
HARRY A. CURRIE, JR.,
JACK S. MASON,
BY ROBERT H. WISE

ATTORNEY

July 4, 1967  H. A. CURRIE, JR., ET AL  3,329,807
PRICE COMPUTING AND MARKING APPARATUS
Filed Jan. 14, 1964  20 Sheets-Sheet 15

INVENTORS
HARRY A. CURRIE, JR.,
JACK S. MASON, ROBERT H. WISE
BY
ATTORNEY

July 4, 1967  H. A. CURRIE, JR., ETAL  3,329,807
PRICE COMPUTING AND MARKING APPARATUS
Filed Jan. 14, 1964  20 Sheets-Sheet 16

HARRY A. CURRIE, JR.,
JACK S. MASON,
ROBERT H. WISE
INVENTORS

BY [signature]
ATTORNEY

July 4, 1967   H. A. CURRIE, JR., ET AL   3,329,807
PRICE COMPUTING AND MARKING APPARATUS
Filed Jan. 14, 1964   20 Sheets-Sheet 18
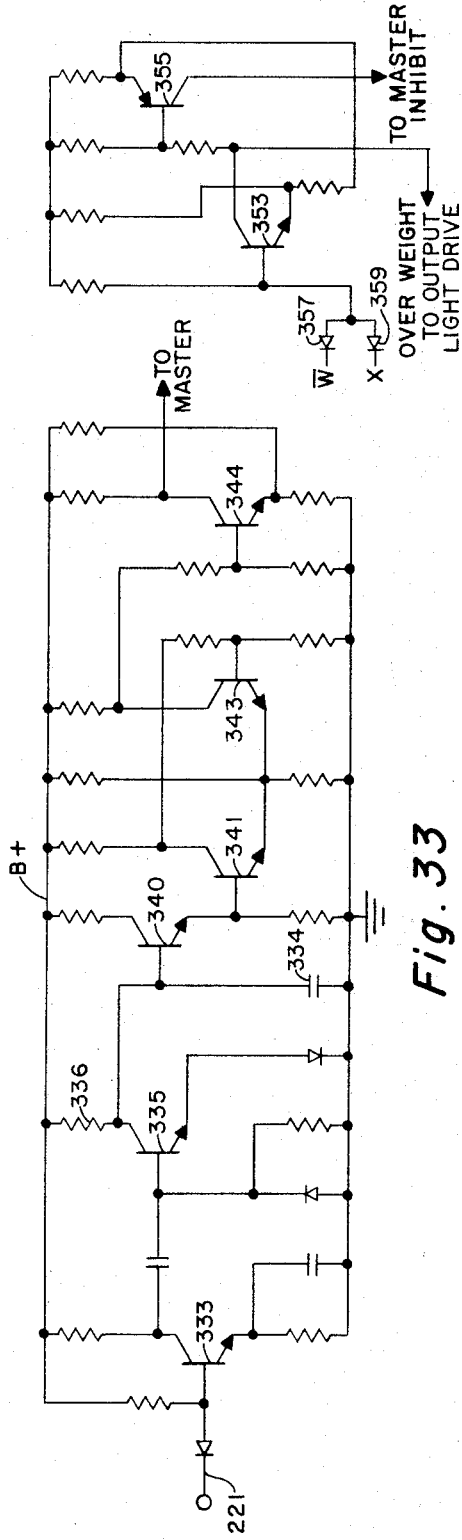
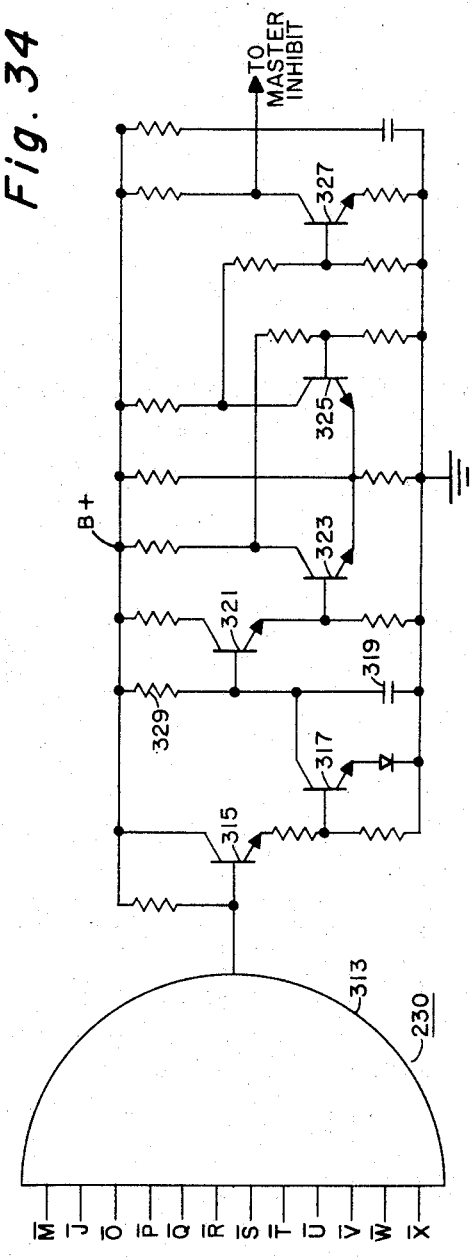
INVENTORS
HARRY A. CURRIE, JR.,
JACK S. MASON, ROBERT H. WISE
BY
ATTORNEY

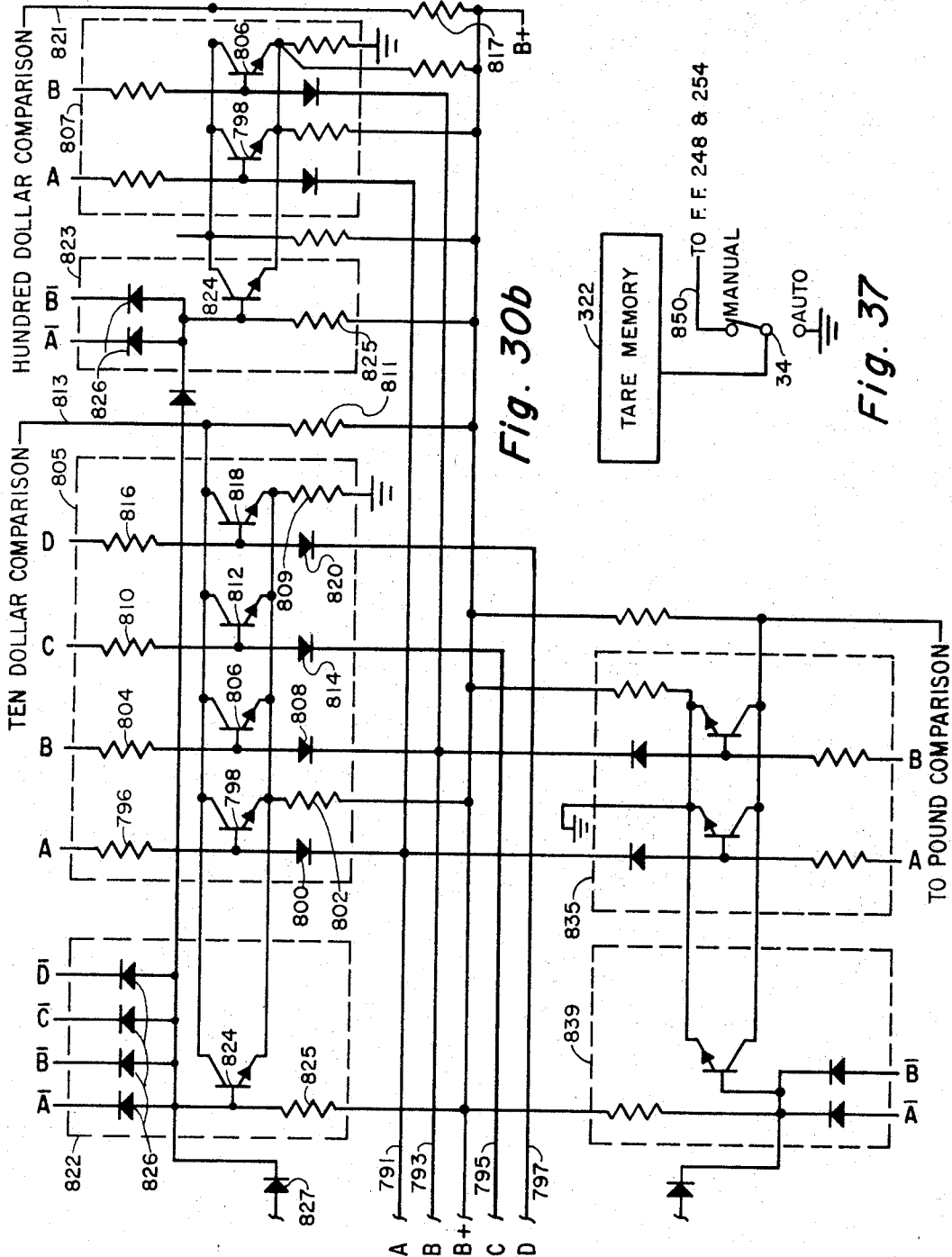

July 4, 1967   H. A. CURRIE, JR., ET AL   3,329,807
PRICE COMPUTING AND MARKING APPARATUS
Filed Jan. 14, 1964   20 Sheets-Sheet 20
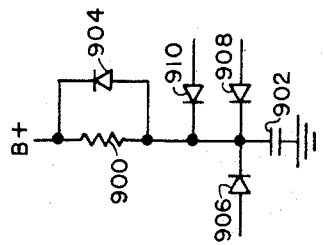
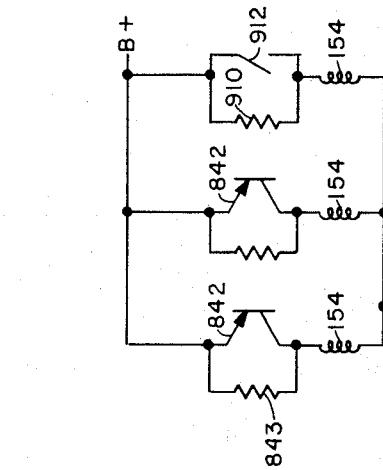
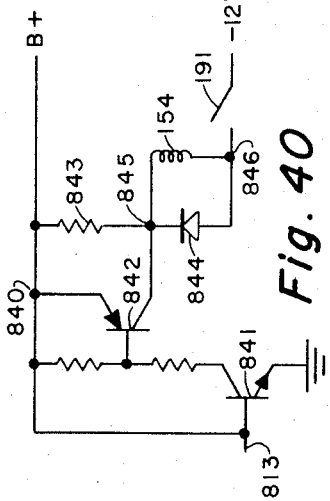
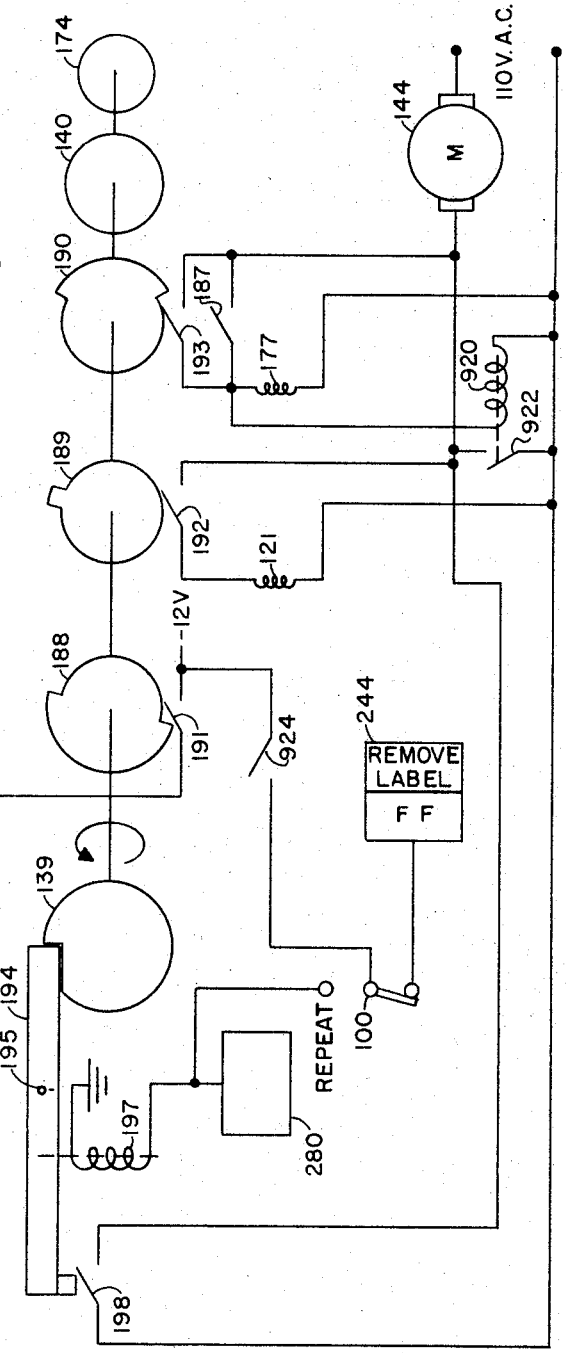
INVENTORS
HARRY A. CURRIE, JR.,
JACK S. MASON, ROBERT H. WISE
BY
ATTORNEY United States Patent Office 3,329,807
Patented July 4, 1967

3,329,807
PRICE COMPUTING AND MARKING APPARATUS
Harry A. Currie, Jr., Dallas, Jack S. Mason, Richardson, and Robert H. Wise, Dallas, Tex., assignors, by direct and mesne assignments, of one-half to Texas Instruments Incorporated, Dallas, Tex., a corporation of Delaware, and one-half to Sanitary Scale Company, Belvidere, Ill., a corporation of Illinois
Filed Jan. 14, 1964, Ser. No. 337,619
5 Claims. (Cl. 235—159)

The present invention relates to automatic price computing and marking machines, and more particularly to such apparatus which is especially adapted for use with a scale which displaces a driven element an amount proportional to the weight being measured and wherein provision is made for automatically compensating for the tare weight of the wrapping material.

The present trend is toward the large super markets which handle a high volume of food products and away from the smaller grocery and meat market which only serves a small trade area. In a large super market, the customer normally serves himself, and it is common for the products to be prepackaged. Various laws and regulations regulating the sale of products are very strict in requiring that the net weight of the products sold be shown and the price of the product is computed on this weight. Accordingly, the weight of the wrapping material must be deducted from the gross weight and the price computed only on the net weight. However, in view of the large volume of the super markets, it is important that the weighing and computing operation be conducted with a high degree of accuracy to prevent loss of money by the super markets, while fulfilling the requirements of the various laws and regulations.

The present invention provides an improved weighing and computing apparatus which is especially adapted for use with a scale which displaces a driven element an amount proportional to the weight being measured. A digital word indicative of the measured weight is obtained, and the computer utilized in the apparatus is disabled until certain conditions have been satisfied, insuring proper operation of the apparatus. Thereafter, a clock pulse generator is utilized to drive digital price registers and weight registers. At such time as the digital word from a gross weight register compares to the digital word indicative of the measured weight, the computer is stopped and the digital information in the price and weight registers is used for setting and enabling a print mechanism to produce a ticket which is imprinted with the necessary price and weight information. Thereafter, the computer is disabled until such time as the ticket which is marked with the price and weight information is removed. The tare weight of the wrapping and packaging material can be set either manually or automatically.

In accordance with the preferred embodiment of the invention, an optical encoder is utilized for deriving weight information from the scales responsive to movement of the driven element rather than electrical contacts. Once the printer has delivered a ticket which is marked with the required price and weight information, the computer is inhibited from further operation until at which time the ticket is removed. The computer is also inhibited if the scale is moving, if zero weight is on the scale, if the total weight on the scale is in excess of a predetermined amount, or if the tare has not been properly set.

Among the features of the preferred embodiment is the print mechanism used in the printer and an electronic zero supression circuit which prevents unnecessary zeros being printed. Of special interest is the digital rate multiplication employed in the computer which renders it possible to operate at clock frequencies an order of magnitude less than would be required if the same computing speed were obtained using conventional circuitry, thereby greatly reducing the complexity and cost of the computer. The apparatus provided by the present invention is smaller than most presently available systems and operates at a greater speed due to the use of digital techniques throughout the system. Another important feature is that of tare compensation wherein the weight of the wrapping material can be automatically compensated for when the total price of the product is computed. The method and apparatus used for automatically setting the tare weight is especially desirable in that it automatically corrects for any error in actual tare weight caused by improper zero adjustment of the scale.

Many objects and advantages of the invention will become apparent to those skilled in the art as the following detailed description of the same unfolds when taken in conjunction with the appended drawings, wherein like reference numerals denote like parts and in which:

FIGURE 6 is an elevation view, partially in cross section, illustrating a portion of the printer;

FIGURE 7 is a perspective view illustrating a portion of a shaft provided within the printer;

FIGURE 8 is a perspective view illustrating a print wheel;

FIGURE 9 is a view, partially in cross section, taken along line 9—9 of FIGURE 6;

FIGURE 12 is a view, partially in cross section, illustrating the manner in which the print wheels are reset to zero position;

FIGURE 18 is a block diagram illustrating the computer and control provided by the present invention;

FIGURE 28b shows the symbol used to represent a pulse gate;

FIGURES 30a and 30b are schematic diagrams illustrating a weight comparator and a price comparator;

FIGURE 32 is a schematic diagram illustrating a zero weight detection circuit;

FIGURE 33 is a schematic diagram illustrating a motion detection circuit.

FIGURE 34 is a schematic diagram illustrating a circuit for detecting overweight conditions;

FIGURE 36 is a schematic diagram showing the turn on circuit utilized in practicing the present invention;

FIGURE 37 is a schematic diagram illustrating the operation of the function switch provided by the present invention;

Figure 39:
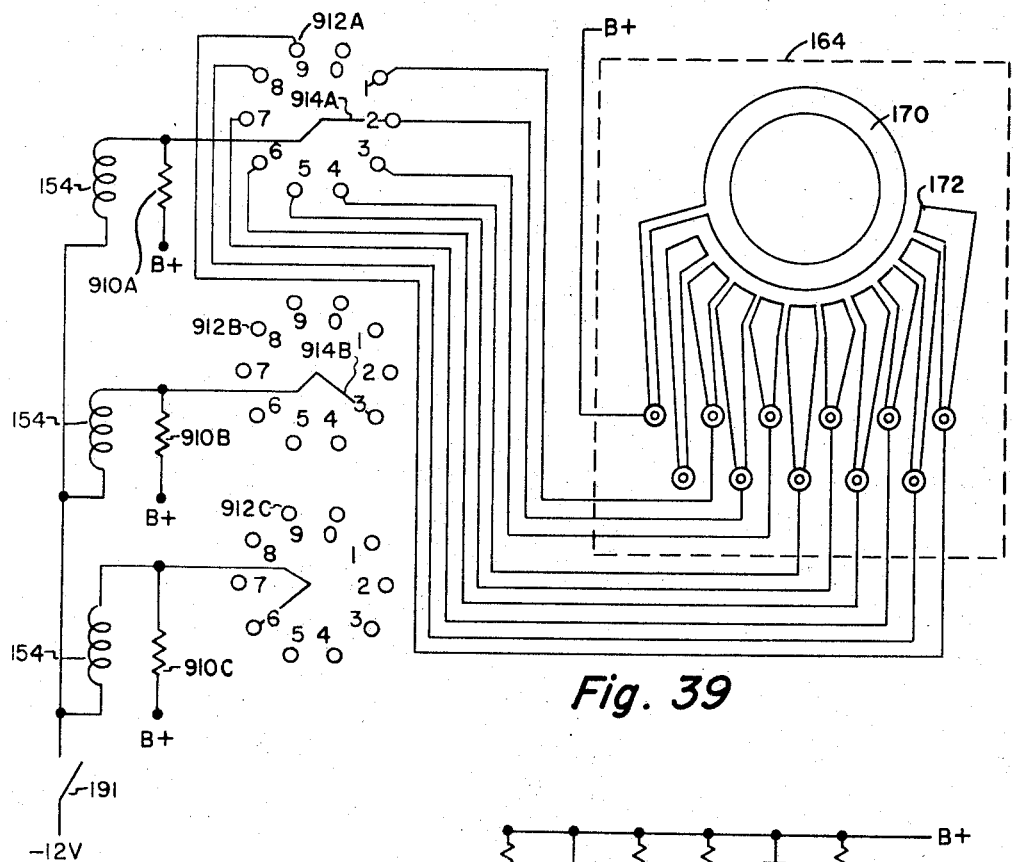

FIGURE 38 diagrammatically illustrates a portion of the inhibit and control which controls the operation of the printer;

FIGURE 39 diagrammatically illustrates the manner in which signals are applied to set the price per pound print wheel; and FIGURE 40 is a schematic diagram illustrating a solenoid driver amplifier utilized in the present invention.

Figure 1:
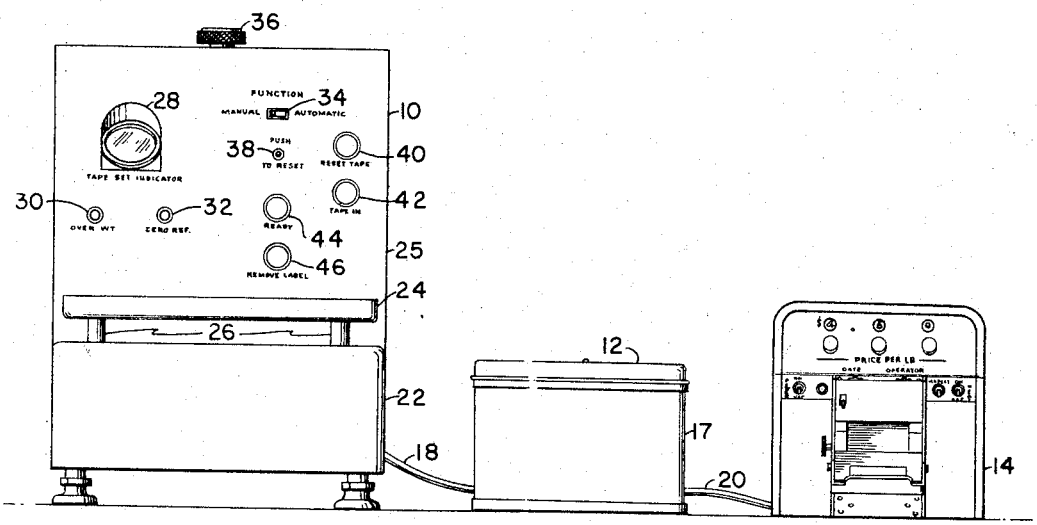
FIGURE 1 is a front elevation view showing the apparatus provided by the present invention.

Turning now to the drawings, it can be seen by reference to FIGURE 1 that the apparatus of the present invention basically comprises a scale 10, a computer and control system 12, and a printer 14. A portion of the computing and control system 12 is physically located within the body of the scale 10 and electrically connected to the major portion of computer and control 12 physically positioned within the case 17 by cable 18. Cable 20 provides electrical connection between the major portion of computer and control system 12 and a portion physically located in the case of the printer 14, as shown.

The scale is of conventional configuration and the scale 10 may suitably comprise a base portion 22 which contains the necessary linkages (not shown). A scale pan 24 is supported by legs 26 which extend into the base portion and engage the scale linkages. The scale 10 also includes an upright portion 25 which is provided with a recessed indicator 28 which indicates the amount of weight on the scale and also can be used for manually setting the tare. Lights 30 and 32 are provided immediately below the indicator 28 for indicating the presence of an overweight condition and the proper zero setting of the scale, respectively.

On the right side of the upright portion 25 there is provided a Function switch 34 which controls whether the tare weight is automatically or manually set. If the tare is to be set manually, the knurled knob 36 can be used in conjunction with the indicator 28 and light 32 for adjusting the indicated weight on the scale to zero when the desired quantity of packaging material is on the scale. Immediately below the Function switch 34 is a reset switch 38 which can be operated by depressing a spring loaded button, a Reset Tare lamp 40, a Tare In lamp 42, a Ready lamp 44, and a Remove Label lamp 46, each of whose function will become apparent as the following description unfolds.

Figure 2:
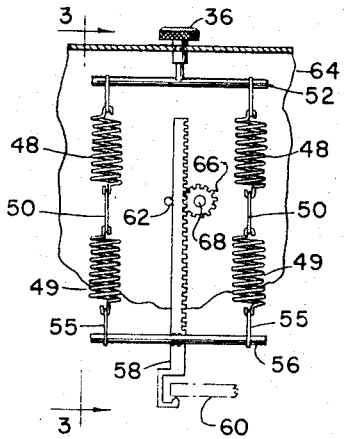
FIGURE 2 is a view, partially in cross section, showing the manner in which springs are attached to the scale linkages and the manner in which the movement of the scale linkages displaces a rack gear an amount proportional to the weight on the scale.
Figure 3:
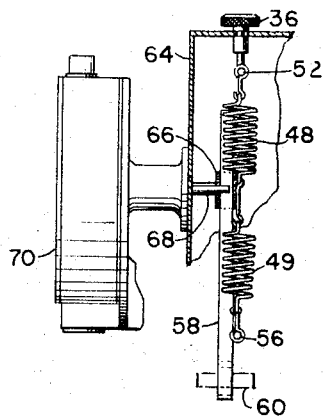
FIGURE 3 is a view, partially in cross section, taken along line 3—3 of FIGURE 2.

Enclosed by the upright portion 25 are four coil springs 48 and 49 which are connected by the linkages 50, as shown in FIGURE 2. The springs 48 are connected to a horizontal member 52 which, in turn, is fixedly connected to the knob 36 positioned on the upper surface of the upright enclosure 25. When the knob 36 is turned, the member 52 moves vertically, lessening or increasing the tension on the springs 48 and 49. The knob 36 can therefore be used for manually setting tare in the system and for zero adjustment of the scale. The linkages 55 support a second horizontal member 56 which carries a vertically disposed rack gear 58. A portion of the linkage 60 (only a portion of which is shown in phantom) which engages the legs 26 and supports the scale pan 24, engages the rack gear such that the rack gear 58 will be forced downward against the bias provided by springs 48 and 49 an amount proportional to the amount of weight placed on the scale pan. The pin 62 which projects outwardly from a vertical plate member 64, biases the rack gear 58 against the gear 66. The gear 66 is mounted on a shaft 68 which extends through plate 64 into optical encoder 70 as shown in FIGURE 3. The optical encoder 70 is also mounted to the plate 64.

The optical encoder 70 is suitably of the type disclosed in the United States Patents Numbers 2,941,088 and 2,949,539, each of which is entitled "Optical Encoder," and assigned to the Baldwin Piano Company of Cincinnati, Ohio. For complete description of the optical encoder, reference may be had to these patents. However, for purposes of understanding the present invention, a brief description of the manner in which they operate will be given.

Figure 4:
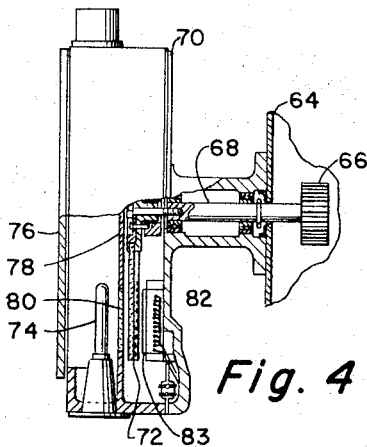
FIGURE 4 is a cut-away view, partially in cross section, illustrating optical encoder utilized in the present invention.

Thus, as shown in FIGURE 4, the optical encoder comprises a code disk 72 which is mounted on the shaft 68. A lamp 74, which provides a source of light, is mounted within the case 76. A plate 78 having an elongated aperture 80 is provided, separating the lamp and the code disk and permitting the light to impinge only on a relatively narrow radial line portion of the code disk. In opposed relation to the lamp and aperture but on opposite sides of the code disk are a plurality of silicon photo diodes 82. A lens 83 is provided for focusing the light-transmitted through the code disk onto the P–N junction of the photo diodes 82.

As is well known in the art, the code disk is formed to have transparent and opaque areas such that the amount of light impinging on the individual photo diodes varies in accordance with the particular code formed on the disk. The preferred type of code disk includes alternate transparent and opaque areas arranged to form what is commonly known in the art as a Gray code disk. If the code disk 72 is properly oriented with respect to the position of shaft 68 as the shaft turns responsive to the movement of the rack gear, the outputs of the various photo diodes will provide digital information in Gray code form which indicates the weight on the scale. From the above, it can be seen that it is not necessary that electrical contact be provided between thhe computer and control 12, of which the optical encoder 70 comprises a part, and the weighing mechanism. Rather, the computer and control 12 is optically coupled to the weighing mechanism. The output of the optical encoder 70 is digital information in Gray code form which indicates the weight of the scale in increments as small as 0.01 pound.

*The printer*

The printer 14 may be suitably of any conventional type However, the preferred printing mechanism is that shown in FIGURES 5 through 16 of the drawings. As shown in FIGURE 1 of the drawings but best seen with reference to FIGURE 5, the printer mechanism is encased in a generally rectangular enclosure 90. Positioned on the front of the enclosure are three knobs 92, 93 and 94, each of which has an indicia revealing apertures 95, 96 and 97, respectively, associated therewith. The knobs 92 through 94 each operate a wafer switch having contacts which control the application of power to certain print wheel solenoids as will be explained hereinafter and also having contacts which set price per pound information in the computer and control 12. The indicia, which can be viewed through apertures 95 through 97, indicates the price per pound of the particular product to be weighed and whose price is to be computed. In the particular example shown, the price per pound of the commodity to be weighed is $4.50 per pound.

Positioned to the left side of the enclosure is a switch 98 which applies power to the entire system when closed. A lamp 99 may be provided for indicating when the power is on. Positioned on the right hand side of the enclosure 90 are two additional switches 100 and 101. The Repeat switch 100 contributes to the control of the system, as will be explained hereinafter. The Heat switch 101 controls the application of power to the heating element 102.

The heating element 102 is seen to comprise a portion of an inclined ramp 103. The U-shaped bracket member 104 is pivotally mounted to the ramp 103, as shown, and spring biased in the upper position whereby it serves to guide the tickets, once they've been printed, onto the heating element 102. The printed ticket comes to rest on the heating element 102 with its printed side down. Within a very short time, sufficient heat will be applied to the ticket to cause the adhesive on its reverse or upward side to become tacky. Thereafter, when the package containing the commodity which has been weighed and the price computed is pressed downward on the ticket to receive same, the U-shaped bracket member 104 moves downward. As the U-shaped bracket member 104 is depressed, it closes a switch (not shown) which provides a signal to the computer and control 12 that the ticket has been removed. Since a computation sequence for another package cannot be initiated until the ticket imprinted with the weight and price information of the preceding package is removed, the possibility of applying the ticket to the wrong package is minimized.

Four manually operated print wheels 105 are also provided. The print wheels 105 can be utilized for placing miscellaneous information on the ticket. For example, the two wheels on the left can be used for imprinting the day and month the ticket was made, and the two print wheels on the right can be utilized for indicating the employee number of the employee operating the apparatus.

Turning now to FIGURES 6 through 16 of the drawings, certain structural details of the printer 14 are shown. It will be appreciated that the drawings are not intended to be complete, as the drawings are only intended to show certain novel features of a preferred embodiment of the print mechanism. Referring now to FIGURE 6 of the drawings, an elevational view taken immediately to the rear of the front panel of enclosure 90 is shown. The print mechanism is seen to comprise a shaft 85 which turns in journals formed in upstanding bracket members 86 and 87. As best seen in FIGURE 7, a notch 89 is formed in a portion of the shaft, as shown, the notch 89 being shaped to define one-half of the segment of the circle cut by a cord lying along the base of the notch. Gear 106 is rigidly attached to one end of the shaft 85, as shown. Three groups 107, 108 and 109 of print wheels 110 are rotatably mounted onto the shaft 85. Appropriate spacers (not shown) are suitably provided for maintaining the linear position of the print wheels 110 on the shaft 85 and providing decimal points.

One of the print wheels 110 is shown in perspective view in FIGURE 8. The print wheel 110 is of generally disk-shaped configuration and suitably molded of plastic. The print characters 111 formed in the edge of the disk are raised above the edge of the disk for purposes of creating an impression on the material to be printed. One side of the print wheel 110 is shaped to define a plurality of ratchet teeth 112, the major diameter of the ratchet gear formed being less than the diameter of the disk itself. A stop member 113 of greater height than the ratchet teeth is also provided. The print wheel 110 is formed to define a concentric opening 114 of a diameter substantially the same as shaft 85 whereby print wheel 110 can be rotatably positioned on the shaft 85. A notch 115 is also provided and a resilient spring member 116 is mounted for movement in the notch 89 (on shaft 85) and notch 115 as the wheel 110 rotates on shaft 85. It will be seen that there are ten ratchet teeth, one corresponding to each of the ten digits. When the print wheels 110 are positioned on shaft 85, the resilient spring member frictionally engages the shaft causing the print wheel 110 to tend to rotate with the shaft 85. When the print wheel 110 is aligned with shaft 85, for reasons that will become apparent as the description unfolds, the spring 116 engages the notch 89 of the shaft 85 contributing to the alignment.

Figures 14, 16:
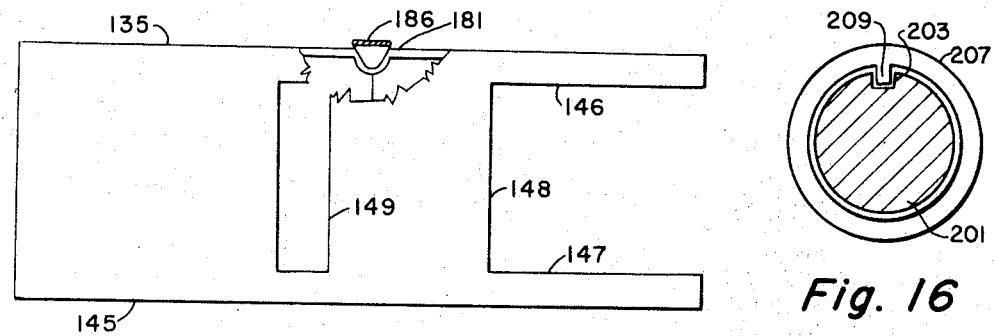
FIGURE 14 is a plan view illustrating a paper guide.
FIGURE 16 is a view, partially in cross section, illustrating a friction ring and shaft suitable for use in the alternative form of print wheel mechanism.
Figure 15:
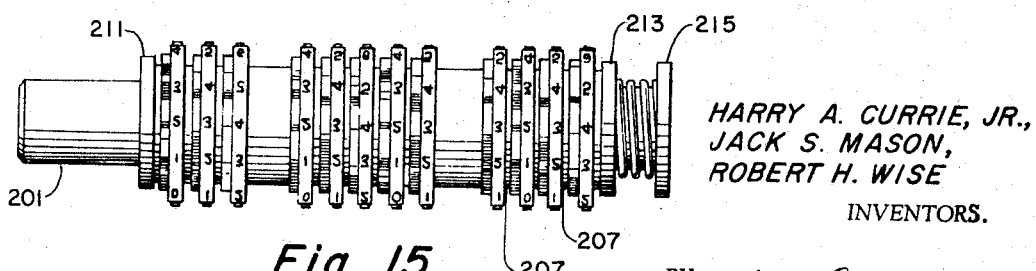
FIGURE 15 is a front elevation view illustrating an alternate form of print wheel mechanism.

A structurally different print wheel mechanism but one whose mode of operation is the same is shown in FIGURES 15 and 16. As shown, the shaft 201, which corresponds to shaft 85, is formed with a slot 203. The print wheels 205, which are suitably shown in FIGURE 8, except the spring 116 is eliminated, are rotatably mounted on shaft 201 with spacers 207 therebetween. As shown in FIGURE 16, the spacer 207 includes an ear 209 which fits into the slot 203, causing the spacer to rotate with the shaft. Collars 211 and 213 in cooperation with spring 215 bias the spacers and print wheels together, providing frictional coupling between the print wheels and the shaft.

Figure 11:
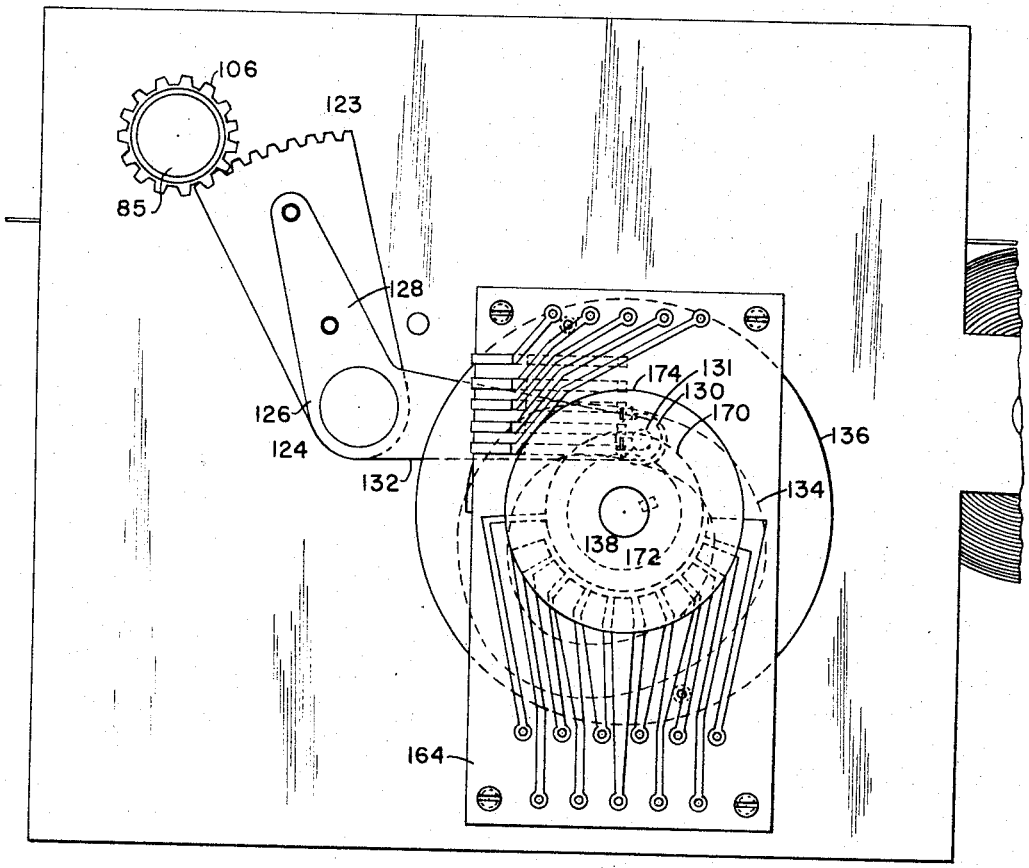
FIGURE 11 is a view showing the manner in which code disk is utilized to provide information in digital form relating to the position of shaft on which the print wheels are mounted.
Figure 10:
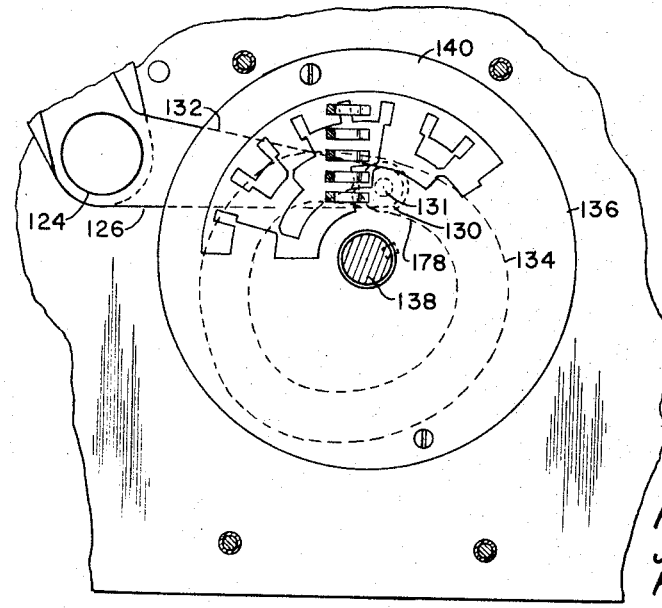
FIGURE 10 is a view taken along line 10—10 of FIGURE 6 illustrating a cam and code disk.

As best seen in FIGURES 10 and 11, the gear 106 is driven by a segment gear 123 which is pivotally mounted on shaft 124. The generally L-shaped cam follower 126 is also pivoted about the shaft 124. The portion 128 of the cam follower is connected to the segment gear, as shown. A cylindrical member 130 is rotatably mounted on pin 131 perpendicular to the portion 132 of the cam follower 126. The cylindrical member 130 follows the cam groove 134 formed in the cam 136. The cam 136 is of disk shaped configuration and mounted onto shaft 138. A binary code disk 140 is connected to the circular cam 136, as shown.

Figure 13:
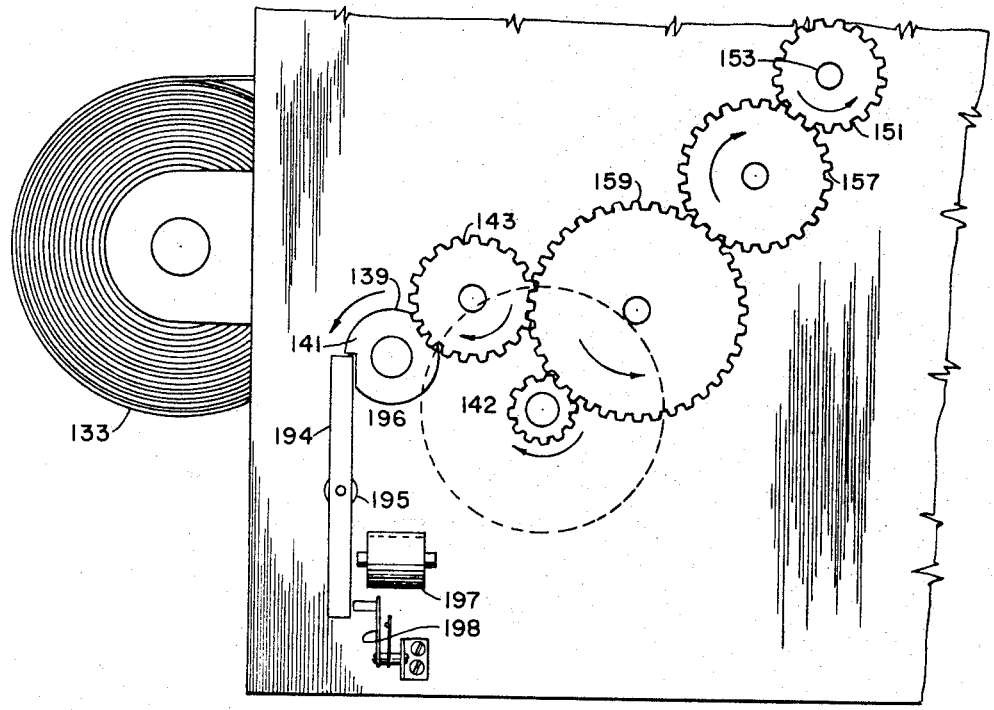
FIGURE 13 is a side elevation view, partially in cross section, illustrating the interconnections between the motor and certain driven shafts.

The shaft 138 extends through the upstanding bracket members 86 and 87 and carries a clutch 139 as shown in FIGURES 6 and 13. The clutch 139 is of the type using a wire spring to engage the shaft when the clutch is engaged. A gear 141 is rotatably mounted on shaft 138 and carried by clutch 139. The gear 141 and, in turn, the shaft 138 are driven by a motor 144 through a gear train comprising gears 137, 142 and 143. It will be seen that as the circular cam 136 rotates, the cam follower arm 126 will move up and down, causing the segmented gear 123 to rotate in an oscillatory rotating manner. The shaft 85 and the print wheels 110 carried thereon will, therefore, move in an oscillatory rotating motion. In the specific example shown, the relation between the gears are such that the maximum excursion or rotation of the shaft 85 is approximately 330°.

As shown in FIGURE 9, a plurality of resilient pawls 150 are mounted in cantilever fashion to a mounting bar 152. One solenoid 154 is associated with each of the pawls. The pawls are positioned such that when the solenoid 154 is energized, it will draw one of the pawls 150 down, causing it to engage the ratchet teeth on one of the print wheels 110. As best seen in FIGURE 12, when the solenoid is de-energized, the pawl member 150 will clear the ratchet teeth 112 but engage the stop member 113. When the shaft is at its neutral position, the spring member 116 of the print wheel 110 will engage the notch 89 formed in the shaft 85 and the end 156 of the pawl will bear against the stop member 113, as shown. The print wheels 110 will therefore be in alignment with the shaft 85.

A platen 117 which suitably has an upper surface 118 of soft rubber is also provided. Platen 117 is supported by one end of arm 119. Arm 119 is pivoted about shaft 120, and its other end is connected to a print solenoid 121. When the solenoid 121 is de-energized, platen 117 will fall away from the print wheels 110 as in FIGURE 12. When the solenoid 121 is energized, the platen will be raised into the position shown in FIGURE 9 pressing the ticket to be printed and the inked ribbon 122 against the print wheels to produce an impression in accordance with the particular digits facing downward at that time. The ribbon 122 is suitably carried by spools 125 and 127. Ratchet means (not shown) are provided for indexing the spools 125 and 127 each print operation in a conventional manner. The ribbon is supported by the ticket feed chute slightly below the print wheels 110 but above the tape 129 of the tickets.

The tape 129 of tickets is fed from a supply roll 133 and supported by the paper guide 135. The guide 135 is shown in plan view in FIGURE 14 and is formed to include a generally rectangular portion 145 and two arms 146 and 147 which form an opening 148 in which the platen 117 moves. A rectangular opening 149 is provided for permitting paper drive rollers to engage the tape of tickets.

Referring to FIGURE 9, a paper drive roller 155 is mounted on shaft 153. The shaft 153 is driven by motor 144 through a gear train comprising gears 137, 151, 157 and 159 as shown in FIGURE 13. A pressure idler roller 163 is rotatably mounted on shaft 165. The shaft 165 is carried by arms 167 and 169 which are pivotably mounted on shaft 171. The arms 167 and 169 are connected by rod 173 at one end and carry a shear blade 175 at the other end, A paper drive solenoid 177 is connected to the rod 173. When the solenoid 177 is energized it causes the arms to pivot about shaft 171 raising the shear blade 175 and the roller 163. When the shear blade 175 is raised, an opening is provided between the blade 175 and a second blade 179 which is mounted to the brackets 86 and 87. The pressure roller 163 presses the tape of tickets against the drive roller 155, driving the tape of tickets through the opening between the shear blades. When the solenoid 177 is de-energized, the shear blade will fall, shearing the printed ticket from the tape and removing the pressure biasing the tape of tickets against the drive roller 155.

Figure 17:
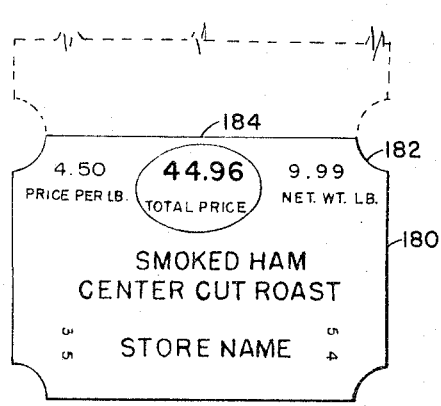
FIGURE 17 is a plan view illustrating a ticket provided by the present invention.

The tape of tickets is suitably such as is shown in FIGURE 17. It can be seen that opposed semicircular notches 182 are formed in each edge of the tape, with a line 184 passing through the center of opposed notches constituting the dividing line between adjacent tickets.

A portion of the chute 135 is broken away in FIGURE 14 to reveal a curved member 181 which extends between the two plates 183 and 185 comprising the chute 135. The curved member is connected to one leaf 186 of a leaf switch 187 shown in FIGURE 9. When the curved member 181 engages one of the notches 182 in the tape 129 of tickets, the tickets will be properly indexed for printing, and the switch 187 will be open. When the tape of tickets is not properly indexed, the member 181 will be displaced outwardly closing the switch 187 and insuring that the paper drive solenoid remains energized and power is applied to the drive roller 155 until the tape of tickets is properly indexed.

Referring to FIGURE 6, three cam wheels 188, 189 and 190 are also mounted to shaft 138 as shown. As the cam wheels 188, 189 and 190 turn, they close leaf switches 191, 192 and 193, respectively. There is also provided a flat member 194 which is pivoted about pin 195 and biased against the edge of clutch 139 to engage the notch 196 formed therein. When the member 194 engages the notch 196, the clutch is disengaged and shaft 138 will not turn. When print command solenoid 197 is energized, the member 194 is withdrawn from the notch 196, permitting clutch 139 to engage as the gear 141 turns. As the member 194 pivots about pin 195 responsive to solenoid 197 being energized, member 194 will close leaf switch 198 which applies power to the motor 144. At such time as power is removed from the print command solenoid, the clutch will have turned sufficiently that the member will ride on the edge of the clutch but out of the notch. However, after the shaft 138 turns 360°, the member 194 will again engage the notch 196, disengaging the clutch and opening switch 198.

As mentioned before, manually settable print wheels 105 for store use and not connected with the imprinting of the price and weight information are also provided. The manually settable print wheels 105 are suitably rotatably mounted on parallel shafts 162 which attach to brackets 161 as shown in FIGURE 9. A commodity slug (not shown) for printing information on the ticket as to the type of product is also provided.

Turning again to FIGURE 6 an insulated printed circuit board 164 is mounted to the bracket 87 by standoffs 166. The printed circuit board 164 carries wipers 168 which bear against the code disk 140. In accordance with the preferred embodiment, the code disk includes five concentric rings and, accordingly, five wipers 168 are provided. The outermost ring is a conductive layer formed or bonded onto the surface of board disk 140. The four inner rings each comprise alternating conductive and insulating segments placed annularly around the shaft 138, and arranged in accordance with the binary decimal code. Each of the four inner rings corresponds to a bit of digital information. The code disk thus forms a series code as it is rotated which corresponds to the binary coded decimal code employed in the computer registers. The outermost of the five wipers 168 is connected to a source of positive potential, and as the disk turns, electrical signals will be produced on the other four wiper blades in binary decimal code indicating the relative position of the shaft 138 and, therefore, the relative position of the shaft 85 and the print wheels aligned with shaft 85. The binary information provided by the code disk is applied to a price comparator 208 and a weight comparator 210, each of which comprises a portion of the computer and control 12 as will be described in greater detail as the description unfolds. The comparators 208 and 210 produce output signals which are effective to control the energization of the solenoids 154 associated with the print wheels in groups 107 and 108, respectively, as will be explained hereinafter.

Also, as shown in FIGURE 11, a generally annular conductive area 170 which is concentric with the shaft 138 is formed on the printed circuit board 164. In addition, ten conductive contact areas 172 are also provided, the ten contact areas 172 being arranged in a generally semicircular configuration. A disk shaped member 174 of insulating material is also mounted onto the shaft 138 for rotation as the shaft 138 turns. Disk shaped insulating member 174 carries two radially aligned wiper members 176, the innermost of which continuously contacts the annular conductive area 170, and the outermost of which sequentially contacts the conductive areas 172. For the present it will suffice to say that each of the conductive areas 172 is connected to one or more of the contacts on the wafer switches operated by knobs 92 through 94 mentioned previously. As the member 174 turns, power is applied to the solenoids which control the rotation of the print wheels in group 109, causing the pawls 150 to engage the print wheels in group 109 at the proper time to stop rotation of the print wheels when the desired digits oppose the platen 117. A more complete description of the cooperation between the wafer switches, contacts 172 and wipers 176 will be provided in conjunction with the description of the control and computer system 12.

The operation of the print mechanism is as follows. When the print command solenoid is energized, power is applied to the motor, the clutch is engaged, and shaft 138 will rotate one revolution. As the shaft 138 rotates, the switch 191 is closed by cam wheel 188 as shown in FIGURE 13 and remains closed for approximately one-half revolution, applying B+ power (suitably −12 volts) to one side of the solenoids 154. The angular position of the shaft 138 and, therefore, the angular position of the shaft 85 will be indicated by the binary information provided from the code disk 140. The price comparator 208 and weight comparator 210 will cause power (suitably +18 volts) to be applied to the other side of selected ones of the solenoids associated with groups 107 and 108 of the print wheels in accordance with the angular position of the shaft 85. When a solenoid is energized, the resilient pawl 150 will be pulled downward toward the solenoid causing the end 156 to engage one of the teeth in the ratchet wheel and prevent further rotation of the print wheel as shown in FIGURE 12. The timing of the solenoid is such that when it is energized, the desired one of the print characters will be facing the platen 117. Thereafter, as the shaft 85 continues to rotate, the spring member 116 of the print wheel 110 will be cammed upward into the notch 115, and the shaft 85 will continue to rotate with the spring member 116 bearing against the surface of the shaft. If the print wheel is not to print a digit but rather a blank is desired, the solenoid will not be energized and the print wheel will turn with the shaft until the pawl engages the stop 113. When the pawl engages the portion 113, a blank portion of the print wheel will oppose the platen 117.

When the cam wheel 189 closes switch 192, power is applied to the print solenoid 121 causing the platen 117 to move upward forcing the ticket and inked ribbon against each of the print wheels and the commodity slug. Both of the switches 191 and 192 are then permitted to open removing power from the solenoids 154 and print solenoid 121.

It will be observed that the cam 136 is formed such that it has a generally flat portion 178 as best seen in FIGURE 10. As the cam follower moves across the generally flat portion 178 of the cam, the segment gear 123 will not move, and, consequently, the shaft 85 will momentarily pause at the point of maximum angular rotation. During this interval of time, the actual printing operation will occur. As the cam follower moves past the flat portion 178, the segment gear 123 will begin to move downward, causing the shaft 85 to move in the clockwise direction as shown in FIGURE 11. The solenoids 154 will be de-energized and the pawl 150 will have returned to its raised position in which it does not contact the ratchet teeth 112 (FIGURE 12). However, as each of the print wheels 110 turns with the gear, the end 156 of the pawl will engage the stop portion 113 on the ratchet gear, preventing further rotation of the print wheel. When in this position, the print wheel will be in substantially the neutral position. As the shaft 85 continues in its clockwise rotation, it will return to the neutral point and the spring member 116 will again lock into the notch 89.

Immediately following the opening of switches 191 and 192, the switch 193 is closed by cam wheel 190 and remains closed until the shaft 138 has nearly completed its completed revolution. As switch 193 is closed, it applies power to the paper drive solenoid 177, causing the arms to raise, cocking the shear blade 175 and biasing the tape of tickets against the drive roller 155, all as shown in FIGURE 9. The tape of tickets will then be driven forward closing switch 187 and insuring that power will be applied to the motor 144 and shear solenoid 177 until the tape is properly indexed for the next printing operation.

The switch 193 will always open before the switch 187, as the time required to index the tape is greater than the time required for one revolution of the shaft 138. When the switch 187 opens, power is removed from the motor 144 and the paper drive solenoid 177. All shafts will have stopped turning, and the shear blade 175 will drop. As the printed ticket is sheared from the tape it falls onto the ramp 103 and slides onto the heating element. A retractable deflector, not shown, is used for flipping the ticket as it falls such that the printed side is against the heating element. The heating element will heat the ticket sufficiently that the adhesive will become tacky, permitting the ticket to be attached to the package by the simple expedient of pressing the package against the ramp. In instances when it is desirable to dispense labels with the printed side up, the deflector may be retracted and the labels will fall onto the ramp 103 and slide onto the heating element. When operating in this manner, the heating element should be turned off.

A typical ticket 180 provided by printer 14 is shown in FIGURE 17. The number 35 printed in the lower left corner is a code number that indicates the date the ticket was made. The number 54 represents an employee identification number, showing the operator of the apparatus. The numbers 35 and 54 are produced by print wheels 105. The product description is provided by the commodity slug. The net weight, total price and price per pound are printed by the wheels in groups 107, 108 and 109, respectively. In accordance with one preferred embodiment, the maximum weight was to be 25.50 pounds, the maximum price per pound was $9.99, and the maximum total price $254.75. Accordingly, four print wheels are provided in group 107, five in group 108, and only three in group 109.

*Computer and control*

Referring now to FIGURE 18, the computer and control 12 is shown in block diagram form and can be seen to comprise an encoder 200 which produces twelve Gray code bits responsive to the outputs from the optical encoder described previously in regard to the scale 10. The twelve Not Functions and one of the Functions generated by the encoder 200 are applied to inhibit and control 202. The inhibit and control 202 provides electrical signals for controlling the operation of computer 204 which provides weight and price information. Weight information from the computer 204 is fed to binary to Gray converter and comparator 206. When a twelve bit digital word produced by a gross weight register within the computer 204 corresponds to the twelve bit digital word produced by encoder 200, the converter and comparator 206 produces an output which is applied to the inhibit and control 202. The inhibit and control 202 stops the computer 204 responsive to the output from the converter and comparator 206. The weight and price information which is stored in digital form is then compared against the digital information from a print code disk 140 and code amplifier 212 utilizing price comparator 208 and weight comparator 210. The output signals from the price comparator 208 and weight comparator 210 control two groups of solenoids for setting the print wheels within the printer to print the weight and price information.

One of the features of the present system is that the computer is disabled until the scale has completely stabilized and all conditions are satisfactory for performing the computing operation. The computer then operates until the comparison occurs, indicating that the gross weight indicated by the computer is equal to the gross weight indicated by the scale, at which time it is disabled and the information from the computer is fed to the printer control circuitry for printing the ticket. Once the print control circuitry is actuated, the computer remains disabled until all inhibiting functions are removed.

*Encoder*

Figure 19:
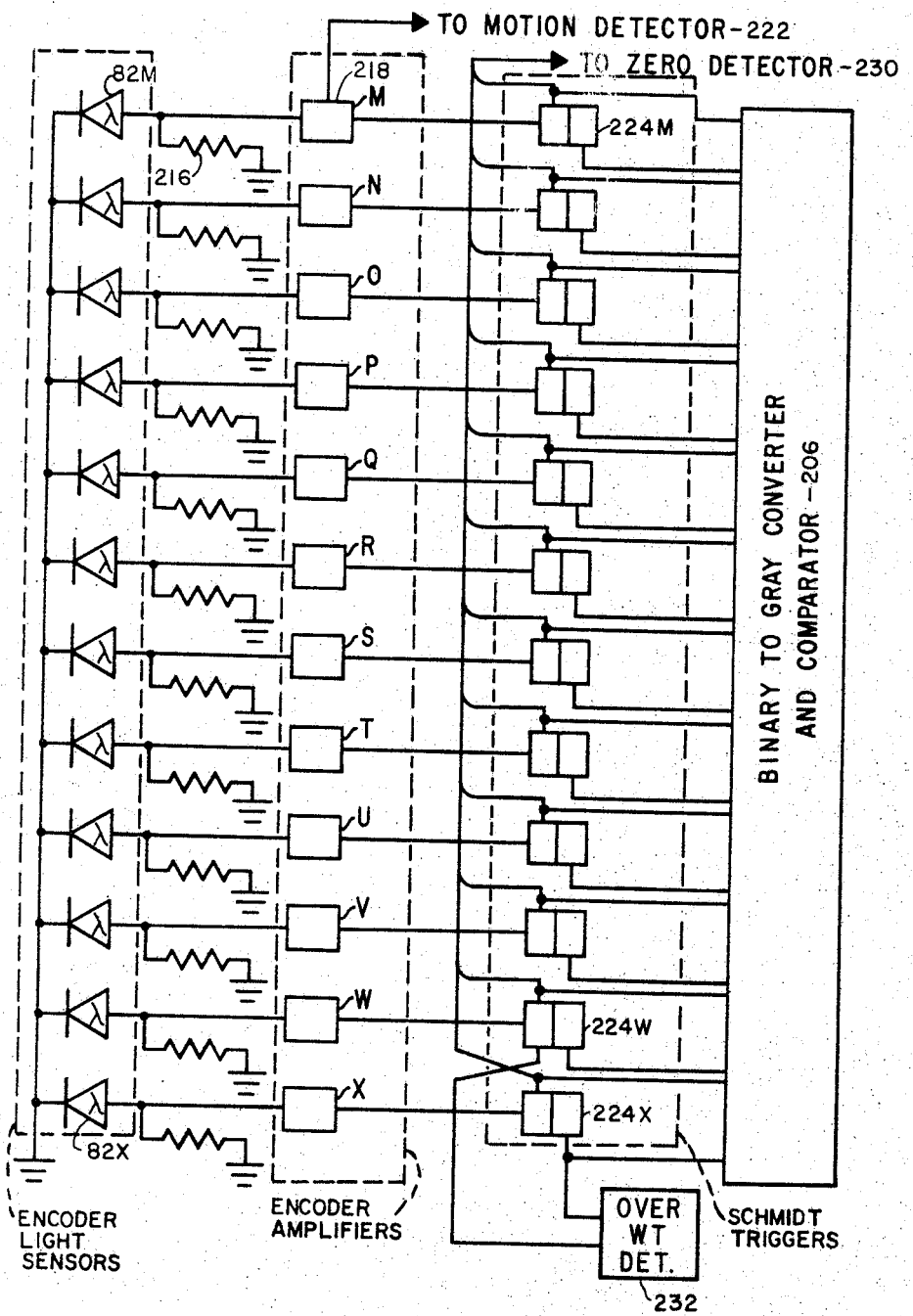
FIGURE 19 is a block diagram illustrating the encoder provided by the present invention.

Turning now to FIGURE 19 of the drawings, the encoder 200 is seen to comprise the twelve silicon photo diode devices 82M–82X. The cathodes of each of the photo diodes are grounded and each of the devices produces a positive voltage at its anode responsive to light impinging thereon. The anodes of the photo diodes are applied to twelve amplifiers 218M–218X, respectively. The resistors 216 are provided to load the devices, insuring that the amplitude of similar signals from the photo diodes 82 will be uniform.

Figure 21A:
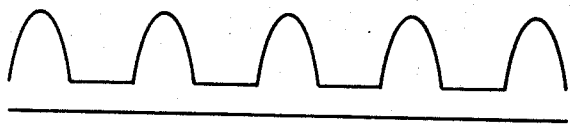
FIGURE 21a–21c are curves illustrating the signals applied to the input of the amplifier of the encoder.
Figure 21B:
Figure 21C:
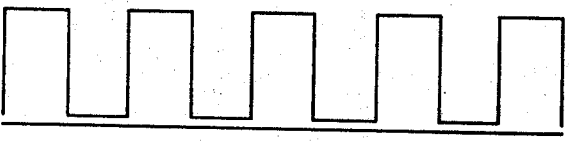

One of the features of the present invention is that the lamp 74, which comprises a portion of the optical encoder 70, receives power from a source of alternating current supply voltage, which is half wave rectified and regulated but not filtered, rather than from a direct current supply voltage. Accordingly, the signals applied to the input of the amplifiers 218 will be as shown in FIGURES 21a–21c. Thus, if the scale has stabilized and the code disk is not turning, the signal applied to the input of amplifier 218 will be as shown in FIGURE 21a if a transparent portion of the disk separates the element 82 and light 74.

If, however, the light 74 and one of the elements 82 are separated by an opaque portion of the code disk, the signal applied to the amplifier will be as shown in FIGURE 21b, where the peak to peak signal level is much less.

The amplifiers 218 are biased such that an output will not be obtained if the input signal is as shown in FIGURE 21b, but a signal such as that illustrated in FIGURE 21a will cause the amplifier to produce a positive voltage at the output of the rectifier filter, indicating the presence of a digital "1." It is therefore possible to utilize A.C. amplifiers rather than D.C. amplifiers, with the attendant decrease in expense but increase in stability and reliability.

FIGURE 21c illustrates the wave form applied to the input of amplifier 218 when the code disk is turning, indicating that the scale has not reached a stable position. The importance of this signal will become apparent as the operation of the motion detector 222 is described.

Figure 20:
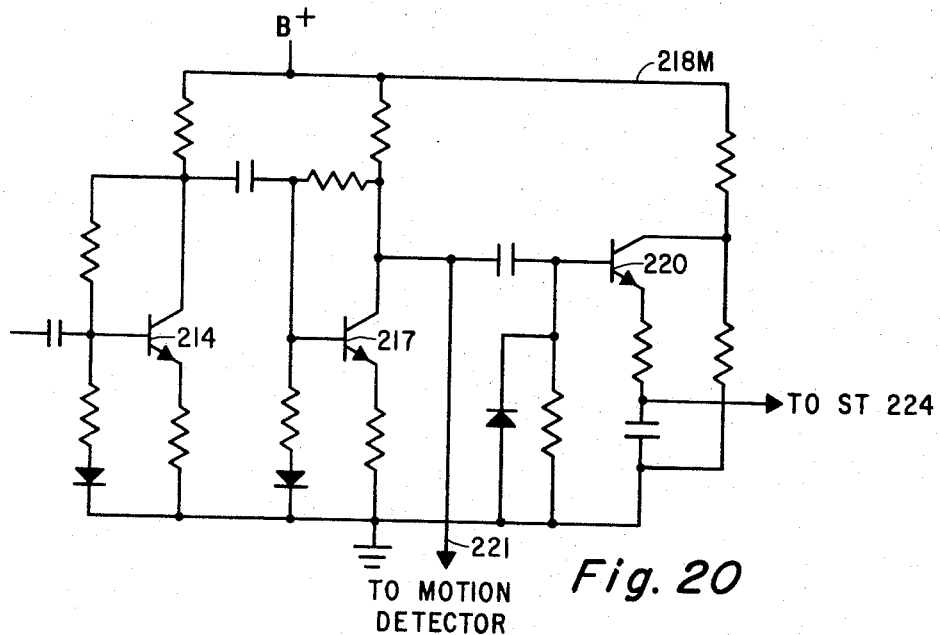
FIGURE 20 is a schematic diagram illustrating the amplifier utilized in the encoder.

A suitable amplifier 218 for use and practicing the invention is shown in FIGURE 20 and can be seen to be a conventional type cascaded amplifier comprising two transistors 214 and 217. If desired, additional stages can be provided. The output of the second stage 217 is connected to a transistor 220 which is connected to produce a rectified, filtered output. A transistor is used as the rectifying element to provide a high input impedance load to the output of the amplifier comprising transistor 217 and prevent loading. The particular amplifier shown in FIGURE 20 is 218M which has a lead 221 connected directly to the output of the second stage of the amplifier and to a motion detector 222 which comprises a part of the inhibit and control 202. The outputs of the twelve amplifiers 218M–218X are applied to the left side of Schmitt triggers 224M–224X, respectively.

The Schmitt triggers 224 are suitably conventional monostable circuits comprising two transistors. The trigger circuit is biased such that the left input is normally off. However, if a positive potential in excess of a predetermined level is applied to the left input, the Schmitt trigger will switch and remain in the opposite state for the duration of the positive potential. In addition to the Schmitt triggers, two similar circuits are used to a considerable extent in the invention, namely, the conventional flip flop circuit and the conventional one shot circuit. The flip flop is a bistable circuit which can be switched from one stable state to the other and will thereafter remain in the other stable state. The one shot is monostable and produces output pulse responsive to a negative pulse being applied to the base of its normally conducting transistor. Because of the similarity to such switching circuits, each is represented schematically by the symbol shown in FIGURE 22, although only the inputs and outputs actually utilized will be shown. The left output is taken from the collector of the left hand transistor and the right output is taken from the collector of the right hand transistor. In similar fashion, the left input and right input are applied to the bases of the left hand and right hand transistor, respectively. Each of the transistors is capable of being turned on responsive to a positive potential applied to its base, and each of the transistors can be turned off by a negative potential applied to its base. This interconnection between the transistors is such that if one of the transistors conducts, a bias will be produced to cut off the other. If one of the transistors is conducting, a digit "0" is produced at its collector. If one of the transistors is not conducting, the potential at its collector will be near B+ (suitably +18 volts), and the digital output is a "1." The digital Function is always taken from the collector of the right hand transistor, and the Not Function is taken from the output of the left side. Thus, twelve Gray code bits M–X are provided which form digital words in Gray code representative of the decimal digit corresponding to the scale indication in pounds. Each bit includes two functions, the Not Function and the Function. The Not Function of, for example, bit A can be denoted $\overline{A}$ and the Function of A as A.

Referring again to FIGURE 19 of the drawings, it is sen that the output of each of the amplifiers is applied to the left input of the Schmitt triggers. The left outputs of each of the Schmitt triggers, the Not Function of each of the digital bits M–X, is applied to the zero weight detector 230 of the inhibit and control 202 as described with reference to FIGURE 18. Both the Function and the Not Function of Gray code bits M–X from Schmitt triggers 224 are applied to the binary to Gray converter and comparator 206. The left output of Schmitt trigger 224W and the right output of Schmitt trigger 224X are applied to the overweight detector 232 which also comprises a part of the inhibit and control 202.

*Inhibit and control*

Figure 31:
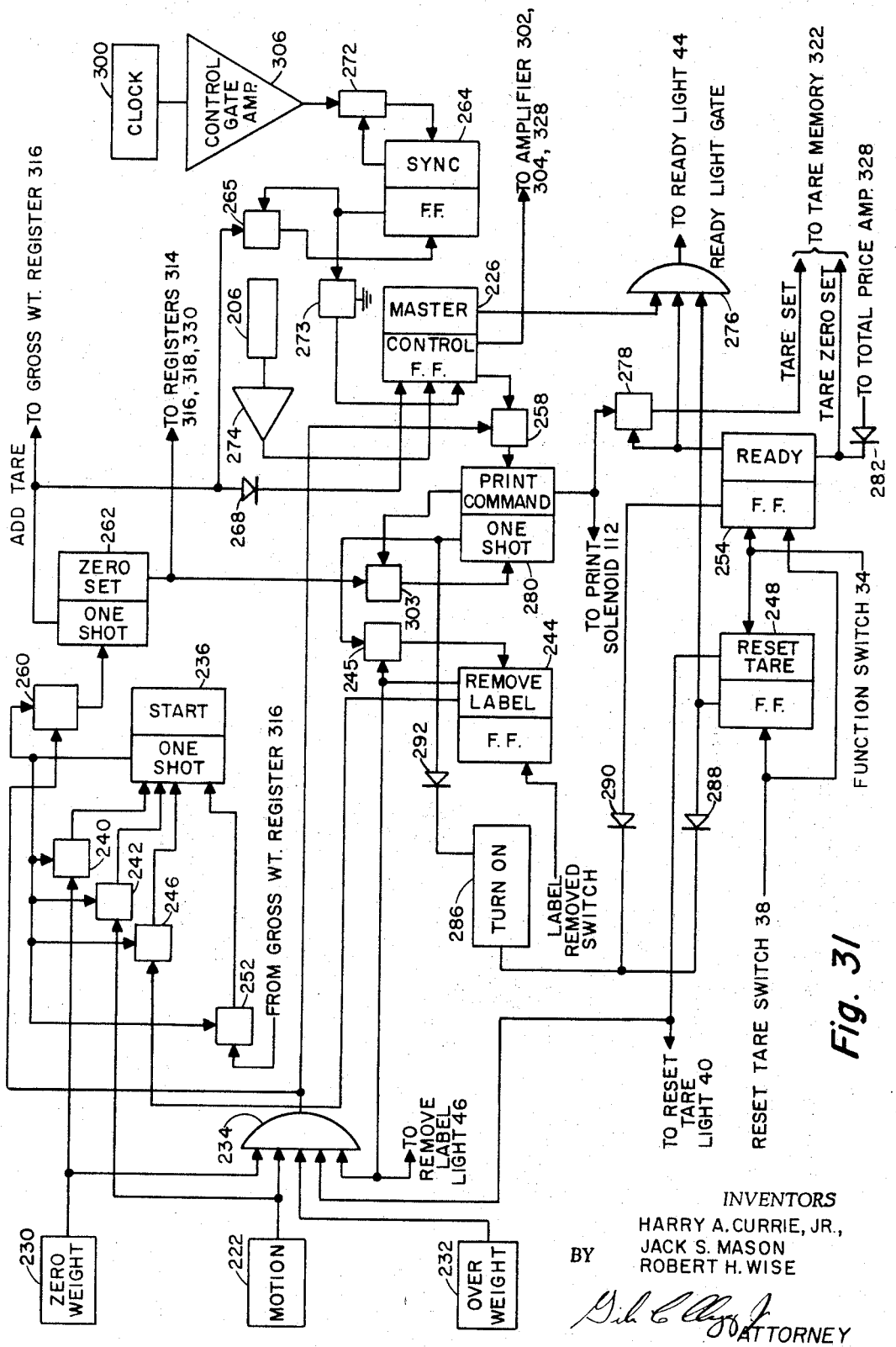
FIGURE 31 is a block diagram showing the inhibit and control provided by the present invention.

The inhibit and control 202 controls the operation of the computer 204 and the printer 14 as mentioned earlier. The inhibit and control 202 is shown in block diagram form in FIGURE 31 and can be seen to comprise the zero weight detector 230, the motion detector 222 and the overweight detector 232, each of which have outputs connected to a master inhibit gate 234. Also, the output of zero weight detector 230 is connected to a start one shot 236 through a pulse gate 240. The output of the motion detector 222 is also connected to the start one shot 236 through a pulse gate 242, as shown.

Turning now to FIGURE 32 of the drawings, the zero weight detector 230 is seen to comprise a conventional positive AND gate 313 having twelve inputs. The Not Functions from each of the Schmitt triggers 224M–224X are applied to the twelve inputs of the AND gate 313. If the weight on the scale is zero, each of the inputs to the AND gate 313 will be a "1," and the output of the gate will be a positive potential which biases transistor 315 on. When transistor 315 turns on, it will bias transistor 317 on and capacitor 319 will discharge. When the capacitor 319 is sufficiently discharged, the bias will be removed from the input to transistor 321, cutting it off, also cutting transistor 323 off. Transistor 323 can be seen to be the left hand transistor of a conventional Schmitt trigger, and, therefore, the transistor 325 will turn on. The bias will, therefore, be removed from the transistor 327 and a digital "1" (positive potential) will therefore be applied to the input of the master inhibit gate 234. The action of the capacitor 319 which is charged through a large resistor 329 is very important in that if a very small weight is placed on the scale, the motion detector 222 may not sense that the scale has not completely stabilized. However, since the capacitor 319 must be charged prior to the time that the transistor 321 will begin to conduct, even though the zero detector indicates the presence of weight, the positive voltage will not be removed from the input to the master inhibit gate 234 for an appreciable interval of time. The interval of time required for the capacitor to charge will be sufficient to insure that any slight movement of the scale occasioned by the placing of a small weight thereon will be damped by the time the capacitor is charged to a sufficient voltage to turn on the transistor 321. Once the transistor 321 turns on, it will apply a positive signal to the input of transistor 323, turning it on and turning transistor 325 off. The positive voltage applied to the input of transistor 327 will turn it on. The potential at the collector of transistor 327 will therefore be near ground, and a binary "0" will therefore be applied to the input of the master inhibit gate 234. However, if at any time the scale weight should return to zero, the voltage applied to the transistor 323 is removed, the Schmitt trigger will return to its original state wherein transistor 323 is off and a "1" will be applied to the master inhibit gate 234.

The motion detector 222 provided by the present invention is shown in FIGURE 33. As described with respect to FIGURE 20, the collector of transistor 217 of the amplifier 218M is applied directly to the input of the motion detector through line 221. In the absence of movement of the code disk, the transistor 333 will conduct continuously as the bias across the emitter is such that it will not be cut off by the signal produced at the output of the amplifier 218M. In this regard, it will be noted that the output of the amplifier in the absence of motion when a "1" is produced will be a ripple voltage having a peak to peak amplitude of approximately 5 volts riding on a D.C. signal of approximately 8 volts. However, if the code disk is moving, the light applied to the photo diode, which drives amplifier 218M, will produce a chopped signal of an amplitude in the order of 10 volts riding on a D.C. signal of approximately 6 volts. The transistor 333 is biased such that if the input thereto falls to approximately 2 volts, the transistor 333 will cut off.

Accordingly, the output of the amplifier 218M is of a character that the amplifier stage comprising the transistor 333 will be momentarily cut off each time the light impinging on the photo diode 84M is chopped. The Gray code bit M is the least significant bit, and, accordingly, the ring M on the code disk will chop the light at a greater frequency and in response to a smaller movement than any of the other rings. When the transistor 333 cuts off, voltage is applied to the base of the transistor 335 causing it to turn on, permitting the capacitor 334 to discharge slightly. The resistor 336, which provides a charge path for the capacitor 334 sufficiently large that as the transistor 335 conducts periodically responsive to movement of the disk, the capacitor 334 will discharge much quicker than it will charge, and within the space of relatively small movement of the code disk, the capacitor 334 will be sufficiently discharged that the transistor 340 will turn off, also turning transistor 341 off. The transistor 341 comprises the left hand portion of a Schmitt trigger. Accordingly, the right hand transistor 343 will turn on, removing the bias from transistor 344, causing it to turn off and produce a positive output signal which is applied to the master inhibit gate 234. If, on the other hand, the code disk is not moving, the signal applied to transistor 333 will not be sufficient to cut transistor 333 off and the output applied to the master inhibit gate will be a digital "0."

The overweight gate 232 is shown in FIGURE 34 and is seen to comprise two transistors 353 and 355. The emitter of the transistor 353 is biased above ground a sufficient amount that a substantial potential is required at the input of the transistor to turn it on. The transistor 353 will therefore remain off so long as either the Function $\overline{W}$ or the Function X is a binary zero, as the diodes 357 and 359 will be forward biased and the voltage applied to the base of transistor 353 will be near ground. In accordance with the preferred embodiment of the invention, the apparatus is designed only to accommodate 25.50 pounds on the scales. The digital word for 25.50 is 110100001101 in the Gray code, the code disk here is preferably arranged such that at 25.51 pounds, the digital word will be 100100001101, rather than the normal next word in the Gray code, and the digital word for 25.52 is 100000000000.

The above is in accordance with a cyclic binary code wherein only one bit changes for each increment of weight. Accordingly, when the weight on the scales reaches 25.51 pounds, both the Functions $\overline{W}$ and X will be binary ones back biasing the diodes 357 and 359. As the transistor 353 conducts, it applies bias voltage to the transistor 355, causing it to conduct and apply a positive potential to the master inhibit gate 234.

A remove label flip flop 244 is also provided. The remove label flip flop has its right output connected to the master inhibit gate 234 and the remove label light 46. The right output of removel label flip flop 244 is also connected to apply a control voltage to pulse gate 245, and a pulse through gate 246 to the start one shot 236. The left input of the label removed flip flop is connected to the remove label switch on the printer, and the right input is connected through gate 245 to the output of the print command one shot 280.

The master inhibit gate 234 also receives an input which is applied from the right side of reset tare flip flop 248. The right side of reset tare flip flop 248 also applies an enabling voltage to the reset tare light 40 when the right output is a "1." The left output is connected to the ready light gate 276. The left input of the reset tare flip flop is connected to the reset tare switch 38, and the right input is connected to the Function switch 34.

Figure 35:
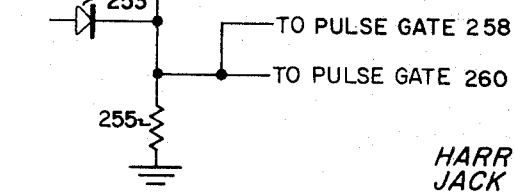
FIGURE 35 is a schematic diagram illustrating a master inhibit gate.

The master inhibit gate 234 is a positive OR gate which produces a positive voltage which is applied to the control electrode of pulse gates 258 and 260 any time a positive voltage is applied to its input. The master inhibit gate 234 is shown schematically in FIGURE 35 and can be seen to comprise five diodes 241, 243, 249, 251 and 253, whose cathodes are commonly connected through a resistor 255 to ground. Each of the inputs to the master inhibit gate is applied to the anode of one of the diodes. The output of the gate 234 is taken from the overterminal of resistor 255.

The left output of the start one shot 236 provides control potentials to the pulse 240, 242, 246, and 252 and also provides an input to the pulse gate 260.

The start one shot 236 also receives an input from the gross weight register 316 (a part of computer 204) through gate 252.

The output of the pulse gate 260 is applied to the left input of the zero set one shot 262. In response to a negative pulse from the start one shot, the left hand side of the zero set one shot 262 produces a positive add tare pulse which is applied through a pulse gate to the gross weight register 316, to the left input of the sync flip flop 264 through gate 265 and through diode 268 to the left input of the master control flip flop 266. However, the pulse gates block the positive pulse and prevent it being applied to the gross weight register and the sync flip flop. The right hand output is a negative going pulse which is applied (through pulse gates not shown) to all of the registers in the computer 204 except the tare memory register, and to the left input of print command one shot 280, through pulse gate 303. When the zero set one shot returns to its original state (left output a "1"), a negative add tare pulse which passes through the pulse gates is applied to the gross weight register 316 and the sync flip flop 264.

The clock 300 applies negative going pulses to the control gate amplifier 306 (both clock 300 and amplifier 306 are part of computer 204) whose output is applied to the input of the pulse gate 272. The control voltage to the gate 272 is provided from the right output of the sync flip flop 264 and the output of the control gate 264 is applied to the right input of the sync flip flop. The left output of the sync flip flop is a negative going pulse which is applied to the control electrode of pulse gate 265 and to the left input of the master control flip flop 266 through pulse gate 273.

The master control flip flop also receives an input from the comparator amplifier 274 which is driven by the binary to Gray converter and comparator 206. The left output of the master control flip flop is connected to amplifiers 328, 302 and 304 (in computer 204) for inhibiting them when the left output is a "0." The left output of the master control flip flop is also applied to the input of pulse gate 258, as mentioned previously. The right hand output of the master control flip flop 266 is applied to a ready light gate 276. An input to the ready light gate 276 is also provided from the left output of the reset tare flip flop 248 and from the right output of ready flip flop 254. The ready light gate is a positive AND gate which only produces an output when all three inputs are positive.

The right output of ready flip flop 254 provides the control voltage for the gate 278, which receives its input from the right side of the print command one shot 280. The output of the pulse gate 278 is applied to the tare memory 322 for purposes of setting the tare in the tare memory. The right output of the ready flip flop 254 is also applied to the tare memory 322 and provides the tare zero set pulse. The right output of the ready flip flop, in addition, is connected through a diode 282 to the total price amplifier 328. The left input of ready flip flop is connected to the Function switch and Reset Tare switch.

The left outputs of the reset tare flip flop 248 and the ready flip flop 254 and the right output of the print command one-shot 280 are connected to a turn-on circuit 286 through diodes 288, 290 and 292, respectively.

Figure 22:
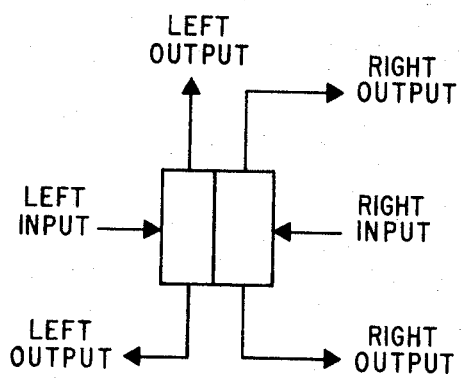
FIGURE 22 illustrates the symbol utilized to denote a flip flop.

The various flip flop circuits used in the inhibit and control 202 are of conventional type. Accordingly, the symbol shown in FIGURE 22 is used. The one shots 236, 262 and 280 are also of conventional type wherein one side will be biased to be normally conducting. If a negative pulse is applied to the one side, the state of the one shot will shift for a period of time determined by its internal time constant and then will return to the original state. Thus, the one side will go positive then negative, and the other side will go negative then positive. The symbol used for the one shot is the same as the symbol used for the flip flop due to their basic similarity.

Figures 28A, 28C:
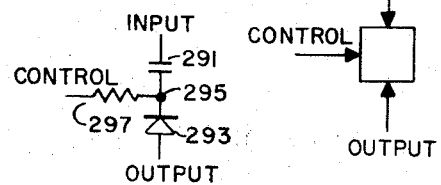
FIGURE 28a is a schematic diagram illustrating a pulse gate.
FIGURE 28c is a schematic diagram illustrating a pulse gate utilized in the decimal rate multiplication system.

The pulse gate used is shown schematically in FIGURE 28a of the drawings and can be seen to comprise a capacitor 291 connected in series with a diode 293. The diode 293 is poled such that a positive potential applied to the juncture 295 between the diode 293 and resistor 297 will back bias the diode 293. The input to the pulse gate will be applied to the capacitor 291, and the diode 293 is connected to the output. The control voltage is applied through resistor 297. It will be remembered that the various negative pulses are produced when the output of one of the flip flops or one shots goes from a "1" to a "0." Accordingly, the capacitor 291 differentiates the change in potential to produce the desired negative pulse. The control voltage is either a digital "1" or a digital "0." It is normally necessary that the control voltage be a digital "0" or at ground potential before the pulse gate will pass the negative pulse. The symbol used to designate the pulse gate is shown in FIGURE 28b.

The manner in which the inhibit and control operates will not be described at the present time, but rather will be described in conjunction with the operation of the system as a whole.

*Computer*

Figure 25:
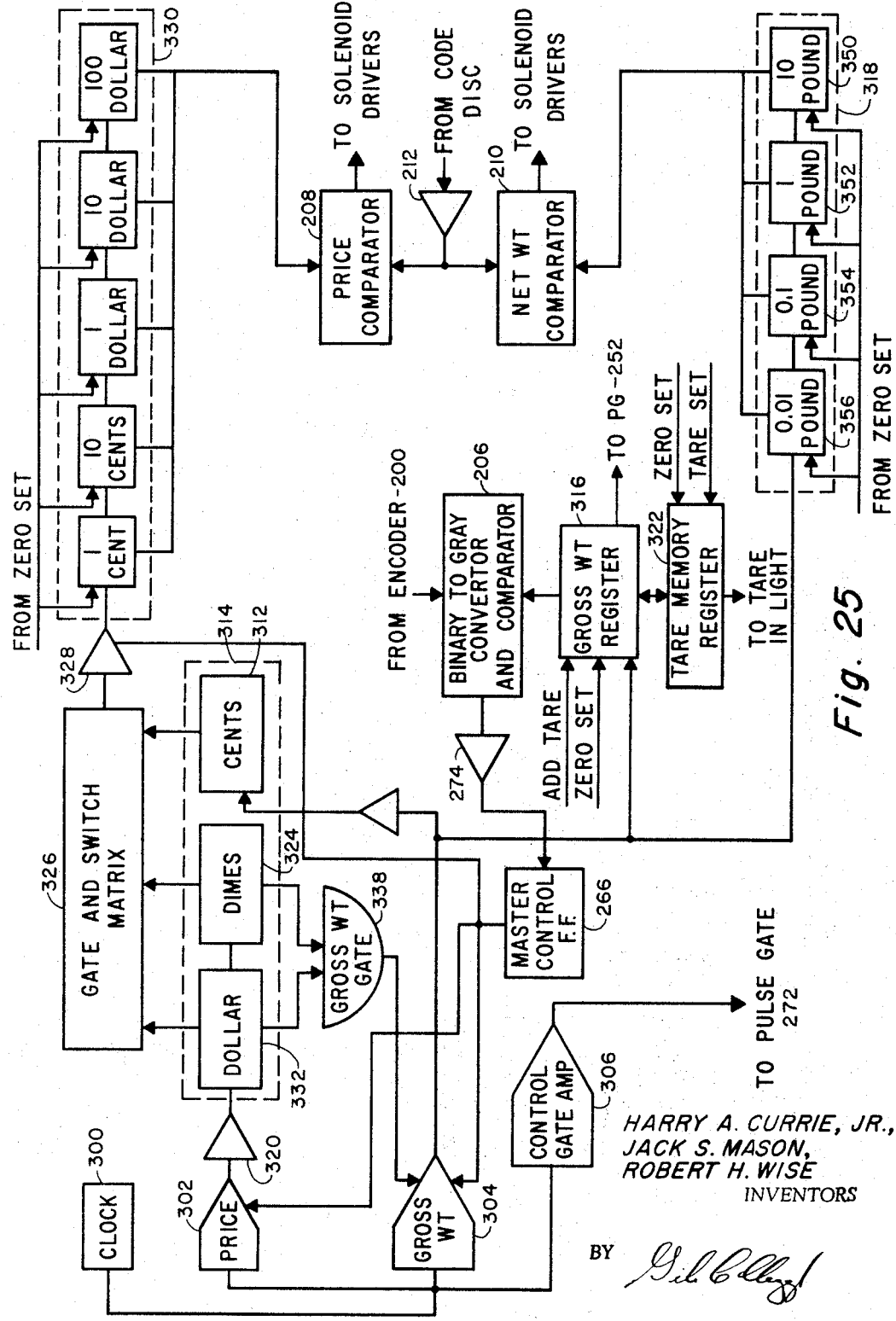
FIGURE 25 is a block diagram of the computer provided by the present invention.

Turning now to FIGURE 25 of the drawings, the computer 204 is shown in block diagram form and can be seen to include a clock 300 which may comprise any suitable pulse generator having a reasonably constant output frequency. The output of the clock 300 is applied to three amplifiers, a price amplifier 302, a weight amplifier 304 and a control gate amplifier 306. The amplifiers 302, 304 and 306 are of convention type and serve to amplify the pulses produced by the clock 300 and also in some instances are utilized as gates to control the application of the clock pulses to various registers included in the computer.

Five separate registers, namely, a price per pound register 314, a gross weight register 316, a net weight register 318, a tare memory register 322 and a total price register 330 are provided. The price per pound register 314 comprises a cents decade 312, a dimes decade 324 and a dollars decade 332. The cents decade 312 is suitably a five decade connected to form what is known as a Johnson counter. Five bits A–E are thereby provided. The dimes decade 324 and dollars decade 332 are each conventional binary decimal code decades, each having four bits A–D.

The gross weight register 316 comprises three, four bit binary counters, each of which is capable of counting to 16, or a total count of 4096. As mentioned earlier, the gross weight register 316 provides twelve binary bits A–L. The tare memory register 322 is also a conventional binary register, but only having eight bits A–H.

The net weight register 318 and total price register 330 each comprise an appropriate number of decades, each of which is connected to count to ten according to the binary decimal code. Each decade, therefore, provides four bits A–D. Five decades are provided in the total price register, and the net weight register includes four decades.

The output of the control gate amplifier 306 is applied to a control gate 272 included in the inhibit and control 202. The output of the gross weight amplifier 304 is applied to the amplifier 310 which functions to invert the signal and apply clock pulses to the input of the cents decade 312 of the price per pound register 314. The output of the gross weight amplifier 304 is also applied to the input of the gross weight register 316 and to input of a net weight register 318. The output of the price per pound amplifier 302 is applied through an inverting amplifier 320 to the input of the dollar decade 332 of the price per pound register 314.

The 13 binary bits generated by the price per pound register 314 are each applied to a gate and switch matrix 326 whose output is a selected number of pulses. The output of the gate and switch matrix 326 is applied through amplifier 328 to the total price register 330. The number of counts stored in the total price register 330 provides a binary coded decimal word indicative of the total price of the product being weighed and whose price is being computed.

As described previously with respect to FIGURE 18, the output of the total price register 330 is applied to the price comparator 208 which compares the binary coded decimal word produced by the total price register with the binary coded decimal numbers produced by the code amplifier 212 and enables certain solenoid drivers at specific times to set the print wheels in group 108.

A tare memory register 322 is also provided. The tare memory register can be set to store a number of pulses equal to that stored in the gross weight register responsive to a tare set pulse from the tare set gate 278. Thereafter, the gross weight register 316 can be set to a binary number equal to that stored in the tare memory register responsive to an add tare pulse from the zero set 262 (a portion of the inhibit and control 202).

The output of the gross weight register is twelve binary bits A–L which are applied to the binary to Gray converter and comparator 206 and compared against the Gray code bits M–X produced by the encoder 200. Upon comparison, a pulse is applied through amplifier 274 to the master control flip flop 266. The master control flip flop will thereupon apply an inhibit voltage to the amplifiers 302 and 304 and 328 preventing further pulses being applied to the price per pound register 314, the total price register 330, gross weight register 316, and the net weight register 318.

The output functions produced by the net weight register 318 are applied to the net weight comparator 210, and when comparison is effected between the binary bits A–D of each decimal digit produced by the net weight register 318 and the binary bits A–D from the code amplifier 212, output signals are applied to the solenoid amplifiers for energizing selected solenoids 154 to position the print wheels in group 107.

It will be seen that the outputs are provided from the dollar per pound decade 332 and from the dime per pound decade 324 to the gross weight gate 338. The gross weight gate 338 is connected to apply inhibit voltage to the gross weight amplifier 304.

Briefly, the operation of the computer is as follows. The clock 300 will be running, but an inhibit voltage will be applied to the gross weight amplifier 304, the price per pound amplifier 302 and the total price amplifier 328 by the master control flip flop 266. Accordingly, pulses will not be applied to any of the registers in the computer. All of the registers in the computer will be set to zero except that the tare memory register will store a digital number indicative of the tare weight if the automatic tare setting provision of the invention is to be utilized.

To set the tare weight in the tare memory register, the mode switch is placed in the automatic position, the reset button is pressed, and the wrapping materials are placed on the scale. After all inhibit voltages are removed, indicating that the scale is operating within set limits, the clock pulses are applied to the price per pound register 314, the gross weight register 316, and the net weight register 318. However, the total amplifier 328 is biased off by the ready flip flop 254 preventing pulses being applied to the total price register. The encoder will provide 12 bits M–X forming a digital word in Gray code form representative of the tare weight indicated by scale when only the required amount of packing material is weighed. At such time as the number of pulses applied to the gross weight register 316 are sufficient to produce a digital word at the output of the gross weight register (in binary form) which compares to the digital word (in Gray code form) produced by the encoder 200, the binary to Gray converter and comparator 206 will produce an output pulse which will trigger the master control flip flop 266 and inhibit the gross weight amplifier 304 and the price per pound amplifier 302. Thereafter, when the print command one shot 280, FIGURE 31, a portion of the inhibit and control circuit 202, is actuated, the tare memory register will be triggered by a tare set pulse from the tare set gate 278, causing the tare memory register to assume the same condition as the gross weight register 316.

The operation of the computer will be inhibited until conditions are satisfactory for computation to begin. The required conditions will be explained in greater detail with respect to the description of the inhibit and control circuit 202.

When the wrapping material and produce to be weighed and whose price is to be computed is placed on the scale, the encoder 200 will provide a twelve bit digital word in Gray code form to the binary to Gray converter and comparator 206. When the output of master inhibit gate 234 becomes a "0," a zero set pulse from the zero set 262 will set all of the registers except the tare memory register to zero. An add tare pulse is applied to the gross weight register from the zero set one shot 262 at the end of the zero set pulse, causing the gross weight register to be preset to the count stored in the tare memory.

The master flip flop will thereafter remove the inhibit voltage from the price per pound amplifier 302, the gross weight amplifier 304 and the total price amplifier 328. Clock pulses from the clock 300 will, therefore, be applied to the dollar per pound decade 332. Every ten pulses applied to the dollar per pound register will produce one output pulse which is applied to the dime per pound decade 324. For every 100 pulses applied to the dollar per pound register, the gross weight gate 338 will produce one output pulse which momentarily removes the inhibit voltage provided by the gross weight gate to the gross weight amplifier and one pulse will be applied to the gross weight register 316, the net weight register 318, and to the cents per pound decade 312.

At such time as the weight indicated by the twelve bit digital word produced by the gross weight register compares to the twelve-bit digital word from the encoder 200, the binary to Gray converter and comparator 206 will produce an output pulse which will trigger the master control flip flop 266 to inhibit the gross weight amplifier, the price per pound amplifier 302, and the total price amplifier 328, preventing additional pulses from the clock 300 being applied to any of the registers. The bit functions produced by the dollar per pound decade 332, and dimes decade 324, and cents per pound decade 312 in the price per pound register 314 are each applied to a gate and switch matrix 326 which selectively passes certain of the pulses to accomplish multiplication of the weight stored in the net weight register 318 by the price per pound information which is set into the computer described previously with reference to the print mechanism.

Pulses produced by the gate and switch matrix 326 are applied through the total price amplifier 328 to the total price decade 330 which counts the pulses and produces five digital numbers in binary decimal code form indicative of the total price of the product. In similar fashion, the net weight register 318 produces four digital words, each comprising four bits in binary decimal code which is indicative of the net weight of the produce being weighed.

It will be appreciated that the count in the gross weight register 316 will be greater than the count in the net weight register 318 by the quantity stored in the tare memory register and transferred to the gross weight register. Therefore, the correct weight of the wrapping materials is not of interest and it will not adversely affect the accuracy of the net weight obtained if the scale is not properly adjusted to zero prior to the time that the tare weight is measured. Any error in tare weight and total gross weight is automatically compensated for when the tare count is set in the gross weight register.

The operation of the computer 204 will now be described in greater detail. Initially, the price per pound of the article is preset into the system, using the knobs 92–94 described with reference to the printer 14, thereby setting certain wafer switches included in the gate and switch matrix 326. The clock 300 has its output connected to the input of the dollar per pound decade counter unit 322 through amplifiers 302 and 320, as described previously. For present purposes, it will be assumed that amplifier 302 is not inhibiting pulses from the clock to the input of the decade unit 332. The decade unit 332 generates an output pulse in response to the tenth input pulse thereto, and the output pulse is fed to the dime decade counter unit 324. This unit is identical to the preceding unit and also produces one output pulse for each ten input pulses thereto.

The two most significant Functions from the dollar decade 322 and the dimes decade 324 are applied to the AND gate 338. An inhibit voltage will normally be applied to the amplifier 304 from AND gate 338. However, each one-hundredth pulse applied to the dollar decade 332 will momentarily remove the inhibit voltage from amplifier 304, permitting every one-hundredth pulse generated by clock 300 to be applied to the cents decade 312, the gross weight register 316, and the net weight register 318.

The net weight register 318 comprises four serially connected decade counters 350, 352, 354 and 356. Counter 350 is designated the 10 lb. unit, and it accumulates a number corresponding to the largest integral number by which the total weight of the article is divisible by ten. The counter 352 designated 1 lb. accumulates a count corresponding to the largest integral number of pounds by which the weight of the article exceeds the weight accumulated in the 10 lb. counter. Counter 354, designated .1 lb., accumulates a count corresponding to the largest integral number of .1 lb. by which the weight of the article exceeds the total weight accumulated by the 1 lb. and 10 lb. counters, and counter 356 designated .01 lb. accumulates a count corresponding to the largest integral number of .01 lb. by which the weight of the article exceeds the total weight accumulated by the .1 lb., 1 lb., and 10 lb. counters. Thus, for example, if the total weight of the article is 24.57 lbs., the 10 lbs. counter will register the number 2, and the 1 lb. counter will register the number 4, the .1 lb. counter will register the number 5, and the .01 lb. counter will register the number 7. Since the first decade counter represents .01 lb., it can be seen that each pulse to the input thereof represents .01 lb., and for the example given, there will be required at the input of the first decade counter a total of 2,457 input pulses to accumulate the correct weight of the article.

As only each one-hundredth pulse is applied to the gross weight counter, 245,700 pulses must be produced by clock 300 and applied to dollar decade 332 for the count in the gross weight register to be as above. As described previously, the digital word from the gross weight register is compared with the digital word from the encoder 200 by converter and comparator 206, and upon comparison, the amplifiers 302 and 304 are inhibited, preventing additional pulse being applied to any of the registers from clock 300. Also as described previously, each of the decades 324 and 332 comprise four flip flops connected to count according to the binary decimal code. Four bits of digital information can be obtained from each of the decades in registers 324 and 332, namely, four Functions A, B, C and D, and four Not Functions $\overline{A}, \overline{B}, \overline{C}$, and $\overline{D}$. The decade 312 comprises five flip flops and five bits A, B, C, D and E of digital information can be obtained.

To calculate the correct total price of the article being weighed, certain of the outputs of each of the decade counters 312, 324 and 332 are connected to the inputs of gates which are controlled by price per pound control units. Pulses are generated at these outputs in response to input pulses to the particular decade counter, and as will become apparent below, only one output pulse is generated at any single instant.

Figure 26:
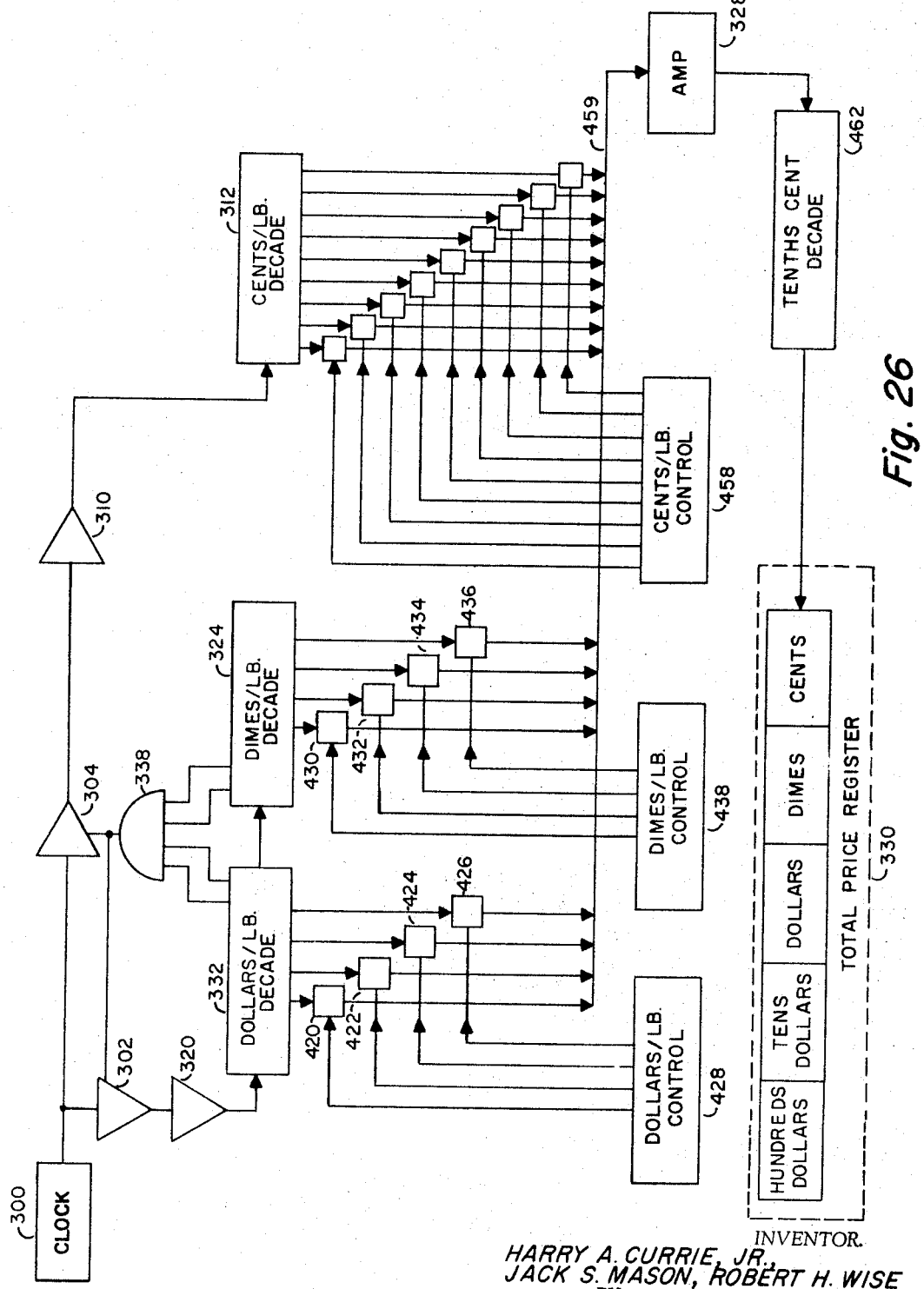
FIGURE 26 is a block diagram illustrating the decimal rate multiplication system provided by the present invention.

Referring to FIGURE 26, the four Not Functions of the dollars per pound decade unit 332 are connected to the inputs of gates 420, 422, 424, and 426, respectively. A suitable gate is that shown in FIGURE 28c which is seen to comprise a capacitor 540 connected in series with the cathode of a diode 542. If a positive control voltage is applied to the juncture 541 between the capacitor and the diode, the diode will be reverse biased, and a negative pulse of magnitude less than the positive control voltage applied to the capacitor will not be passed by the diode. However, an output will be produced at the anode of diode 542 if the magnitude of the control voltage at juncture 541 becomes less than the magnitude of the input pulse causing the diode to become forward biased. In the form shown, the control voltage, suitably B+, is applied through a resistor 544 to the juncture, and the juncture 541 is connected through resistor 546 and switch 545 to ground. The resistances of resistors 544 and 546 are chosen such that when switch 545 is closed, a negative pulse in the order of ten volts will forward bias the diode and produce a negative pulse output at the anode of the diode. If the switch is open, the control voltage will maintain the diode back biased and the pulse cannot pass. Thus, when a negative pulse is applied to one of the gates from the decade unit, it will pass through the gate or be blocked thereby, depending upon whether the gate is opened or closed by the switch of its particular control unit.

A dollars per popnd control unit 428 is connected to each of the gates 420, 422, 424 and 426 of the dollars per pound decade unit 332 to permit pulses from the decade unit to pass through selected numbers of the gates, wherein the selected number is the integral number of dollars per pound of the article. A negative pulse is produced each time one of the Not Functions changes from a "1" to a "0." Similarly, the dimes decade unit 324 is provided with gates 430, 432, 434 and 436 which are controlled by a dimes per pound control 438 to permit negative pulses from the dimes per pound decade to pass through selected gates thereof, the particular gates opened by the control unit being determined by the largest integral number of dimes per pound of the article exceeding the largest integral number of dollars per pound of the article.

The cents per pound decade unit 312 has five flip flops and is somewhat more complicated than the preceding dollars and dimes per pound decade units. Nine outputs are connected from the cents per pound decade to nine gates which are controlled by the cents per pound control 458. The control 458 opens a selected number of the gates determined by the largest integral number of cents per pound of the article exceeding the addition of the price per pound set by controls 428 and 438. As the pulses from the three decade units 312, 324 and 332 pass through the particular gates which are opened by the controls, they are applied to the line 459 which is connected to the input of an amplifier 328, where they are amplified and fed to the input of a tenths cent decade 462. As will be explained hereinafter, the tenths cent decade 462 cooperates with the cents decade 312 and the cents per pound control 458 to round off the total price of the article to the nearest cent. That is to say, if the total price of the article is 4.374 dollars, the price will be rounded off to 4.37 dollars. If, however, the actual total cost of the article is 4.375 dollars, the price will be rounded off to 4.38 dollars. The output of the tenth cent decade unit 462 is connected to the input of the total price register 330 which comprises five decade units designated respectively as the cents, dimes, dollars, tens dollars and hundred dollars decade units.

In order to illustrate how the total price is accumulated in the register 330, an example will be assumed where the total weight of the article is 3.65 pounds, and the price of the article is $2.36 per pound, the price per pound previously set in the printer. A total of 365 pulses must be applied to the input of the gross weight register 316 before comparison will be effected and the amplifiers 302 and 304 inhibited. Since only each one-hundredth pulse is applied to the gross weight register 316, a total of 36,500 pulses will have been applied to the input of the dollars per pound decade 332. In this example, the dollars per pound control unit 428 is set at two dollars per pound, the dimes control unit is set at three dimes per pound, and the cents control unit 458 is set at six cents per pound.

Initially, all decade counters are preset to a zero count before computation of weight and price is started. The decade units 312, 324 and 332, which will be described below in detail, generate one pulse at the input of one of the gates connected thereto for each input pulse. The function of the price per pound control units is to open selected gates to pass to line 459 a selected number of pulses for each ten input pulses to each price per pound decade unit, where the selected number is equal to the number of dollars, dimes or cents per pound, as the case may be.

Thus, in the example given, for each ten input pulses to the dollars per pound decade 332, two pulses are passed to line 459 through one or more of the gates connected to the decade as selected by the dollars/lb. control 428. For each ten input pulses to the dimes per pound decade 324, three pulses are passed to line 459 through one or more of the gates connected to the decade as selected by the dimes/lb. control 438. Similarly, for each ten input pulses to the cents decade 312, six pulses are passed to line 459 through one or more of the gates selected by the cents/lb. control 458. Moreover, in those instances wherein the total number of pulses applied to the input of the cents decade during the price computation is not an exact multiple of ten, such as the case of the present example, there are 365 input pulses, the cents/lb. control 458 passes six pulses to line 459 for each ten input pulses up to 360. The number of pulses passed to line 459 for the remaining five input pulses is such as to produce the proper round off function in conjunction with the tenths cent decade 462, as will be described below.

It can be seen, then, that the sequence in which the cents per pound control 458 opens the gates connected to the cents decade is important. In the course of the count, 7300 pulses will be applied to line 459 from the dollars per pound decade 322 in response to the 36,500 input pulses thereto, 1095 pulses will be applied to the line 459 from the dimes per pound decade 324 in response to the 3650 input pulses thereto, and 216 pulses will be applied to line 459 from the cents per pound decade 312 in response to the first 360 input pulses thereto in addition to a number of pulses in response to the remaining five input pulses determined in the manner described hereinafter. It will be noted that pulses are applied to the line 459 from the respective decade units in response to the series of pulses from the clock 300, and, therefore, none of the pulses applied to the line 459 will occur simultaneously with any other pulse applied thereto.

To properly round off the total price to the nearest whole cent, the tenth cent decade 462 is initially preset to a count of five, and thereafter performs a count of ten function as pulses are applied to its input through amplifier 328. This is equivalent to applying five pulses to the input of the tenths cents decade 462 prior to starting the computation. The output of the tenths cent decade 462 drives the serially connected decade counters comprising the total price register with one output pulse for every ten input pulses.

At the start of the computation, a pulse is delivered to the input of the total price register in response to the fifth input pulse to the tenths cent decade 462, since the latter is initially preset to a count of five, which is equivalent to accumulating a price of one cent for the first one-half cent computed and thereafter accumulating one cent in the price register for every one cent computed. It can then be seen that after the first five input pulses to the tenths cent decade, that one cent in price will be accumulated in the register for each ten input pulses to the tenths cent decade. If, after the first five input pulses to the tenths cent decade 462, the number of pulses exceeding the largest number of pulses which is an integral multiple of ten is equal to or greater than five, an additional cent in price will be accumulated; whereas, if the number is less than five, the additional cent will not be added.

Each pulse applied to the net weight register 318 represents .01 pound and, therefore, the total number of pulses applied to the inputs of the dollars and the dimes decades 332 and 324 will be an even multiple of ten. Since the dollars and dimes control units 428 and 438 are preset to pass an integral number of pulses to line 459 for each ten pulses applied to its respective decade unit, the sequence in which the pulses applied to the line 459 is immaterial, and only the total number of pulses applied in response to each ten pulses applied to the input of either of the decades is important. However, this is not the case for the cents decade unit 312. In order to determine the total number of pulses to be applied through line 459 to the input of tenths cent decade 462 from the cents per pound decade 312, it is helpful to use an example to determine how the total correct price of the article is accumulated, wherein the above example will be used. It has already been established that 7300 pulses will be derived from the dollars decade, 1095 pulses will be derived from the dimes decade and 216 pulses will be derived from the cents decade for the first 360 input pulses thereto, or a subtotal of 8611 pulses. The price accumulated in the total price register up to this point can be determined by adding five pulses to this subtotal to account for the initial presetting of the tenths cent decade to a count of 5. This is now 8616 pulses. Dividing this by 10 to account for the divide by ten function of the tenths cent decade yields 861 input pulses to the total price register and leaving the tenths cent decade at a count of 6. Thus the dollars counter in the total price register is at a count of 8, the dimes decade is at a count of 6 and the cents decade is at a count of 1, or a price of $8.61. By multiplying the total weight of the article (3.65 lbs.) by the price per pound ($2.36/lb.) yields a total price of $8.61. Since the total price accumulated to this point is correct, it can be seen that the cents/lb. control 58 must pass no more than three additional pulses to the tenths cent decade in response to the last five input pulses to the cents decade 16 or the tenths cent decade count will be advanced back to zero and will deliver an additional pulse to the cents decade of the total price register. It is now apparent that the total number of pulses passed to line 459 from the cents decade 312 by the control 458 for each ten input pulses thereto is important, but in addition, the sequence of occurrence of these pulses is important.

The particular sequences by which the pulses from the cents decade 312 must be applied to the line 459 for the various settings of the cents per pound control can be seen as follows: The cents per pound control 458 is set to add a certain number of cents to the total price for each pound of the item accumulated in the weight register. Each input pulse to the cents per pound decade 312 represents .01 lb., and therefore, the cents per pound control 458 can be thought of as adding to the total price of the item a certain number of hundredths of a cent for each hundredth of a pound accumulated in the weight register. Since the tenths cent decade 462 is capable of counting only the integral number of tenths cents comprising the total price and then rounding off to the nearest cent, only those pulses from a cents per pound decade 312 representing the largest number of integral tenths cents should be applied to the input of the tenths cent decade 462. In the present example, the price of the article was assumed to be $2.36/lb. This means that the cents per pound control 458 would add six cents for every pound accumulated in the weight register, or .06 cent for every one-hundredth of a pound accumulated in the weight register. Thus for each input pulse to the cents per pound decade 312, .06 cent should be added to the total price. However, since .06 cent is less than an integral number of tenth cents, this should be discarded and not applied to the tenths cent decade 462. Two pulses to the input of the cents per pound decade 312 will be equivalent to an addition of .12 cent to the total price. Since this is more than one-tenth cent but less than two-tenths cent, one pulse should be applied to the tenths cent decade 462. Three pulses to the input of the cents per pound decade is equivalent to an addition of .18 cent to the total price and still only one pulse should be applied. Four input pulses will require the addition of two pulses to the tenths cent decade 462, since this is an addition of .24 cent to the total price. By carrying this procedure out for ten input pulses to the cents per pound decade 312 and then repeating the procedure ten times for 0 to 10 cents a pound, it can be seen that the cents per pound control 458 should pass a first pulse to line 459 when the product of the price per pound in cents as set by the control 458 and the number of input pulses is equal to or greater than 10 but less than 20, a second pulse when the product is equal to or greater than 20 but less than 30, and so forth. These sequences will provide the proper rounding off function in conjunction with the tenths cent decade 462 whatever the price per pound or the total weight of the article.

Figure 27:
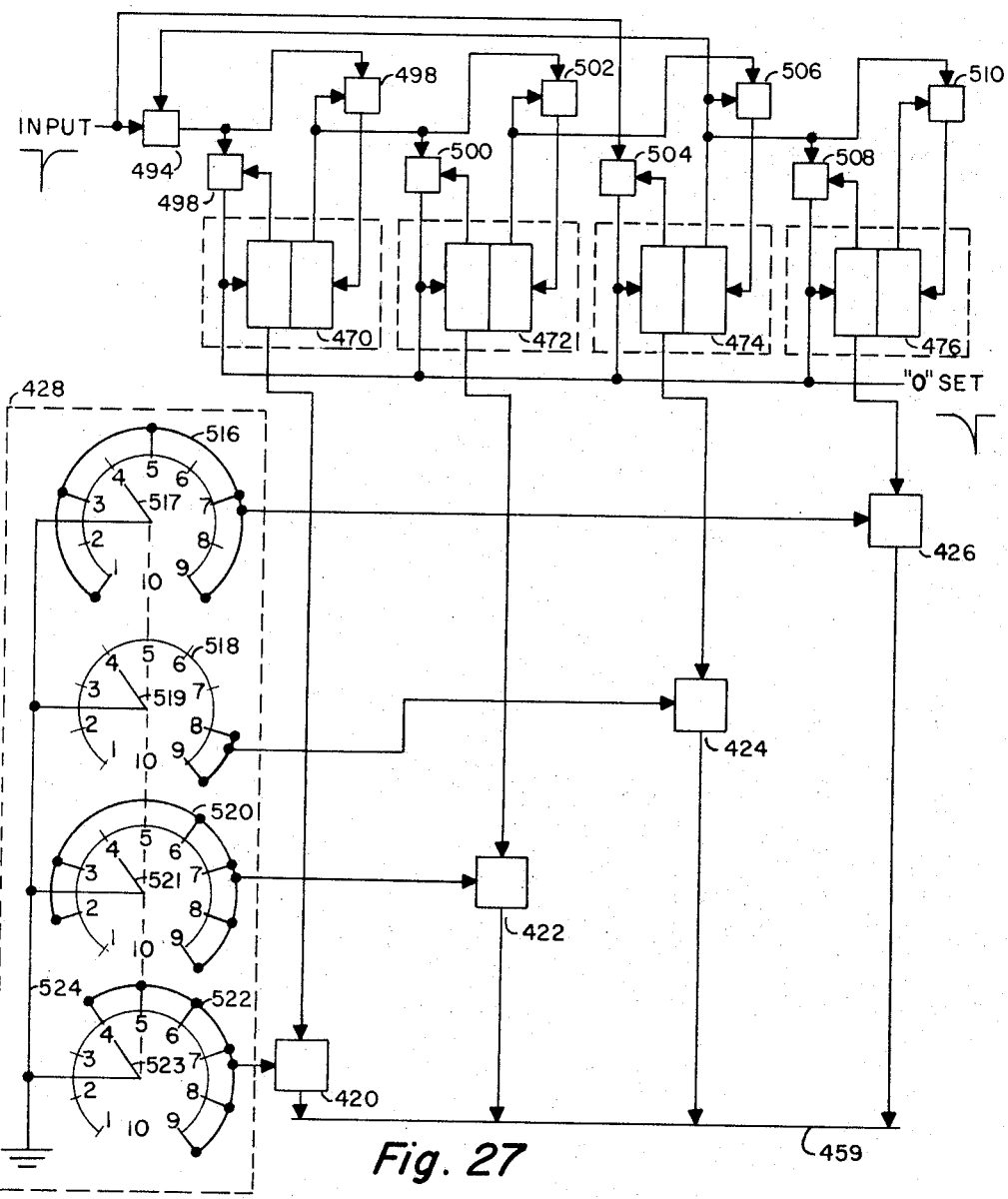
FIGURE 27 is a block diagram illustrating one stage of the decimal rate multiplication system.

There is shown in FIGURE 27 a block diagram of the dollars per pound decade 332, the dollars per pound control 428, and the gates 420, 422, 424 and 426. It should be noted that the dimes per pound decade 324, the dimes per pound control 438 and the gates 430, 432, 434 and 436 are identical to that shown in FIGURE 27 and will not be described separately. Moreover, each of the decade units within the net weight register 318, the tenths cent decade unit 462, and each of the decade units within the total price register 330 are identical to the decade unit 332 to be described.

The decade unit 332 comprises four conventional transistor flip flops 470, 472, 474 and 476. The decade counter 332 also includes a plurality of gates which control the application of voltage signals to the flip flops for switching the flip flops from one stable state to the other, according to a selected sequence in response to input pulses applied to the decade counter. The gates are similar to the gate described with reference to FIGURE 28a. The control voltage is supplied by the functions produced by the flip flops. If the function applied as a control voltage is a "1," the gate is closed. If the function is a "0," the gate will be open. The flip flops within the decade unit are triggered from one stable state to the other stable state by the application to the conducting transistor of a negative going pulse which applies a negative bias to the transistor and renders it non-conductive. As the originally conducting transistor turns off, the other transistor will become conductively biased. Each input of each flip flop within the decade unit is preceded by a gate such that a negative going pulse can be applied to the particular input only when the gate is open.

Initially, the dollars decade is preset to a zero count by applying a negative going pulse to the left inputs of the flip flops from zero set one shot 262. The Not Functions $\bar{A}$, $\bar{B}$, $\bar{C}$ and $\bar{D}$ will each be a digital "1," and the Functions will each be "0" as shown in Table I below:

TABLE I

| No. of Input Pulses | Not Function | | | | Function | | | |
|---|---|---|---|---|---|---|---|---|
| | $\bar{A}$ | $\bar{B}$ | $\bar{C}$ | $\bar{D}$ | D | C | B | A |
| 0 | 1 | 1 | 1 | 1 | 0 | 0 | 0 | 0 |
| 1 | 0 | 1 | 1 | 1 | 0 | 0 | 0 | 1 |
| 2 | 1 | 0 | 1 | 1 | 0 | 0 | 1 | 0 |
| 3 | 0 | 0 | 1 | 1 | 0 | 0 | 1 | 1 |
| 4 | 1 | 1 | 0 | 1 | 0 | 1 | 0 | 0 |
| 5 | 1 | 1 | 1 | 0 | 1 | 0 | 0 | 0 |
| 6 | 0 | 1 | 1 | 0 | 1 | 0 | 0 | 1 |
| 7 | 1 | 0 | 1 | 0 | 1 | 0 | 1 | 0 |
| 8 | 0 | 0 | 1 | 0 | 1 | 0 | 1 | 1 |
| 9 | 1 | 1 | 0 | 0 | 1 | 1 | 0 | 0 |
| 10 | 1 | 1 | 1 | 1 | 0 | 0 | 0 | 0 |

It will be seen that the control voltage applied to the gate 494 preceding the counter is a "0" initially and gate 494 will be open. Thus, the first input pulse will pass through gate 494 to the input of gate 498 preceding the right input to flip flop 470 and to the input of gate 496 preceding the left input of flip flop 470. As a binary "0" is applied to the control gate 498 and a binary "1" is applied to the control of gate 496, gate 498 is open and gate 496 is closed. The first input pulse will, therefore, be applied to the right input, causing the flip flop to switch to a state wherein the Function is a binary "1" and the Not Function is a binary "0." This is indicated in the Table I for the one input pulse. No other flip-flops are affected by the first input pulse. The second input pulse again passes through gate 494 and triggers the flip-flop 470 back to its other stable state, since gate 496 is now open and gate 498 is closed. In so doing, a negative going pulse is produced at its right output and applied to the input of gate 502. Gate 502 is open since a "0" is applied to its control, and this pulse will trigger flip-flop 472 to its other stable state, as indicated in Table I for two input pulses. The third input pulse is again passed by gate 494 and passes through gate 498 to again trigger flip-flop 470. The Function produced by flip-flop 470 changes from a "0" to a "1," providing a positive voltage which cannot pass through gate 502 connected thereto. The fourth input pulse passes through gates 494 and 496 to again trigger flip-flop 470, producing a negative going pulse as the Function changes from a "1" to a "0." The negative going pulse is passed through gate 502, triggering flip-flop 472. The Function produced by flip-flop 472 changes from a "1" to a "0" pulse which passes through the gate 506 to trigger the flip-flop 474. The Not Function produced by flip-flop 474 becomes a "1," closing gate 494 which precedes the decade unit. The fifth input pulse to the decade unit cannot pass the gate 494 at this time, but is applied to the input of gate 504 preceding flip-flop 474. As a "0" is applied to its control, the gate 504 is open and flip-flop 474 is triggered to its opposite state. A negative going pulse is produced as the Function produced by flip-flop 474 changes from a "1" to a "0." Since the Function produced by flip-flop 476 is a "0," gate 510 is open. The negative going pulse passes through gate 510 to trigger flip-flop 476. The count thus proceeds according to Table I until after the ninth pulse, flip-flop 474 and flip-flop 476 are in their alternate states. The tenth input pulse then returns all of the flip-flops to their initial states and the Functions produced by flip-flops 470, 472, 474 and 476 are again "0."

The dollars/lb. control 428 comprises four ganged wafer switches such that movement of a single dial or switch will effect movement of the slide contact within each of the wafer switches. The slide contacts are each connected to ground through line 524. A selected number of switch contacts of each of the wafer switches is connected to each of the gates 420, 422, 424 and 426 to open and close that particular gate according to a selected sequence. The Not Functions $\bar{A}$, $\bar{B}$, $\bar{C}$ and $\bar{D}$ produced by the flip-flops within the decade counter are applied to the inputs of gates 420, 422, 424 and 426, respectively, with the outputs of the gates being connected to line 459. Switch contacts 1, 3, 5, 7 and 9 of switch 516 are commonly connected to gate 426 to open the gate when the slide contact 517 conductively engages one of these switch contacts. Similarly, switch contacts 8 and 9 of switch 518 are commonly connected to gate 424 to open the gate 424 when the slide contact 519 is positioned on either switch contact 8 or 9. Switch contacts 2, 3, 6, 7, 8 and 9 of switch 520 are commonly connected to gate 422 to open the gate when slide contact 521 is positioned thereon. And switch contacts 4, 5, 6, 7, 8 and 9 of switch 522 are commonly connected to gate 420 to open the gate when the slide contact 523 is positioned thereon. Thus, when a slide contact of a particular switch connects the gate through one of the commonly connected switch contacts to ground, the gate is open; otherwise, the gate is closed.

As noted earlier, the number of pulses to be passed to line 459 through the gates for every ten input pulses to the dollars per pound decade 12 is equal to the number of dollars per pound of the article as set on the dollars/lb. control 428, wherein the particular switch contact coincides with the number of dollars per pound. Although the particular sequence in which the pulses are applied to line 459 is immaterial, some sequence must be used and that shown in the following Table II will be used for purposes of explanation and coincides with the particular electrical connections between the wafer switches and the gates just described.

TABLE II

| Switch Position | Pulse | | | | | | | | |
|---|---|---|---|---|---|---|---|---|---|
| | 1 | 2 | 3 | 4 | 5 | 6 | 7 | 8 | 9 |
| 0 | | | | | | | | | |
| 1 | | | | | X | | | | |
| 2 | | X | | | | | X | | |
| 3 | | X | X | | | | X | | |
| 4 | X | | X | | X | | X | | |
| 5 | X | | X | | X | X | | X | |
| 6 | X | X | X | | X | | X | X | |
| 7 | X | X | X | | X | X | X | X | |
| 8 | X | X | X | X | | X | X | X | X |
| 9 | X | X | X | X | X | X | X | X | X |

Since the not functions $\bar{A}$, $\bar{B}$, $\bar{C}$ and $\bar{D}$ are applied to the inputs of the gates 420, 422, 424 and 426, it can be seen that a negative pulse would be applied to these gates only when the Not Function changes from a "1" to a "0." The particular Not Function produced at any time is shown in Table I. With the control 428 in the 1 position, only gate 426 will be open. From Table I, it can be seen that the Not Function produced by the flip-flop 476 changes from a "1" to a "0" on the fifth input pulse to the decade unit, at which time a negative going pulse is passed through the gate 426 to the line 459 as shown in Table II. With the control 428 in the 2 position, only gate 422 will be open, and from Table I, it can be seen that the Not Function $\overline{B}$ changes from a "1" to a "0" on the second and the seventh input pulse to the decade unit, as shown in Table II. By positioning the control 428 in its various positions, it can be seen that pulses will be applied to the line 459 from the decade unit according to the number and sequence shown in Table II. In all cases, the number of pulses applied to the line 459 is equal to the switch position for each group of ten input pulses. It is again pointed out that the sequence in which gates open for passing pulses to the line 459 is immaterial and may be varied by changing the connections on the switches.

Figure 29:
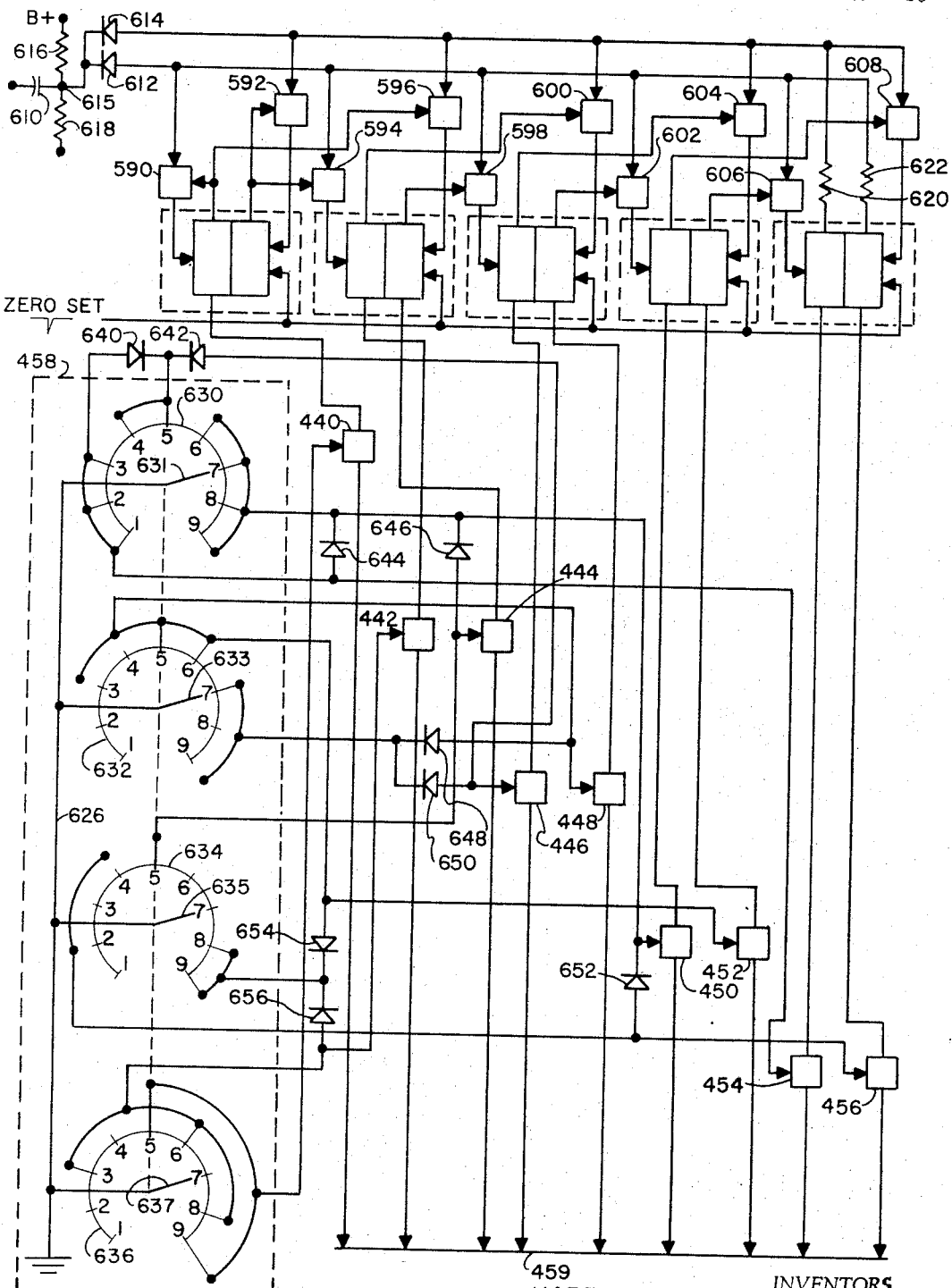
FIGURE 29 illustrates still another stage of the decimal rate multiplication system.

The cents per pound decade 312, the cents/lb. control 458 and the gates for passing the pulses to line 459 are shown in FIGURE 29. The cents per pound decade 312 is similar to the dollars and dimes per pound decades in that it performs a count of ten function, but is different therefrom in that it includes five flip flops instead of four. By using five flip flops connected to form the decade unit, a total of ten Functions and Not Functions can be obtained, making it easier to derive the proper sequence of pulses from the flip flops which are to be applied to line 459 through gates 440, 442, 444, 446, 448 450, 452, 454 and 456. The cents per pound decade also includes gates identical to that described with reference to FIGURE 21a preceding the inputs to each flip flop, although the sequence in which the gates are opened and closed is different from that described with reference to the dollars and dimes per pound decade. The cents/lb. control 458 is more complex than that previously described to take into a account the opening and closing of a greater number of gates.

The cents per pound decade comprises five flip flops 560, 562, 564, 566 and 568 of the conventional type previously described. Pulses are applied to the input of the cents/lb. decade through a capacitor 610 connected to a pair of diodes 612 and 614. As described previously, one pulse is applied to the cents/lb. decade by amplifier 304 for each hundred pulses applied to the dollars/lb. decade. The anode of diode 612 is connected to the right hand side of flip-flop 568 through resistor 622, and the anode of diode 614 is connected to the left hand side of flip-flop 568 through resistor 620. A resistor 616 is connected between a source of positive D.C. potential and the juncture 615, capacitor 610 and the two diodes, as shown. Another resistor 618 is connected between juncture 615 and ground. Resistor 618 is selected to be about twice the resistance of resistor 616. The positive D.C. potential applied to resistor 616 is suitably in the order of 18 volts such that the potential at juncture 615 is a positive 12 volts.

When the Not Function of flip-flop 568 is a "1," indicated by a positive potential of about 18 volts, a positive voltage is applied to the anode of diode 614 through resistor 620 and upon the application to the input of a negative pulse of about 12 volts, the voltage at the interconnection of the capacitor and diode 614 is reduced to zero, thus, forward biasing diode 614. It can then be seen that pulses to the input of the cents/lb. decade will be passed through diode 614 when the Not Function produced by flip-flop 568 is a "0." Conversely, when the Function produced by flip-flop 568 is a "1," a positive voltage is applied to the anode of diode 612 through resistor 622, and upon the application to the input of a negative pulse of about 12 volts, the voltage at the interconnection of the capacitor and diode 612 is reduced to zero, thus forward biasing diode 612. The Not Function of flip-flop 568 is a zero and the diode 614 is reverse biased about 12 volts, thus preventing a negative going pulse of approximately 12 volts at the input from forward biasing diode 614. It can be seen that pulses to the input of the cents/lb. decade will be passed through diode 612 when the Function produced by flip-flop 568 is a "1."

Initially, the cents decade is preset to a zero by applying a negative pulse along line 624 to the right hand inputs of the various flip-flops, which triggers all the flip-flops to a first state wherein the Functions provided are each a "1," and the Not Functions are each a "0," as shown in Table III below:

TABLE III.—COUNTER LOGIC

| No. of Input Pulses | Not Function | | | | | Function | | | | |
|---|---|---|---|---|---|---|---|---|---|---|
| | $\overline{E}$ | $\overline{D}$ | $\overline{C}$ | $\overline{B}$ | $\overline{A}$ | A | B | C | D | E |
| 0 | 0 | 0 | 0 | 0 | 0 | 1 | 1 | 1 | 1 | 1 |
| 1 | 0 | 0 | 0 | 0 | 1 | 0 | 1 | 1 | 1 | 1 |
| 2 | 0 | 0 | 0 | 1 | 1 | 0 | 0 | 1 | 1 | 1 |
| 3 | 0 | 0 | 1 | 1 | 1 | 0 | 0 | 0 | 1 | 1 |
| 4 | 0 | 1 | 1 | 1 | 1 | 0 | 0 | 0 | 0 | 1 |
| 5 | 1 | 1 | 1 | 1 | 1 | 0 | 0 | 0 | 0 | 0 |
| 6 | 1 | 1 | 1 | 1 | 0 | 1 | 0 | 0 | 0 | 0 |
| 7 | 1 | 1 | 1 | 0 | 0 | 1 | 1 | 0 | 0 | 0 |
| 8 | 1 | 1 | 0 | 0 | 0 | 1 | 1 | 1 | 0 | 0 |
| 9 | 1 | 0 | 0 | 0 | 0 | 1 | 1 | 1 | 1 | 0 |
| 10 | 0 | 0 | 0 | 0 | 0 | 1 | 1 | 1 | 1 | 1 |

Thus, diode 614 is reversed biased, and any input pulses will be passed through diode 612. As shown in FIGURE 29, there are five gates 590, 594, 598, 602 and 606, each of which has its input connected to the anode of the diode 612. The output of each of the gates is connected to the left input of the respective flip-flops, and the control voltage applied is the Function produced by the preceding flip-flop except that gate 590 is controlled by the Not-Function of flip-flop 560. Similarly, gates 592, 596, 600, 604 and 608 are connected between the anode of diode 614 and the right inputs of the respective flip-flops. The gates connected to the anode of diode 614 are controlled by the potentials representing the Not Functions of the preceding flip-flops, except gate 592, which is controlled by the function of flip-flop 560. From Table III it can be seen that gates 590 and 596 are initially open and that the first input pulse will be passed through diode 612 and through only gate 590 to trigger flip-flop 560 to its alternate state as shown in Table III. Gates 590 and 596 then close, as the Not Function of flip-flop 560 becomes a "1," and gates 592 and 594 are opened. The second input pulse passes through diode 612 and through gate 594 to trigger flip-flop 562 to its alternate state which opens gate 598. It can be seen that the flip-flops are sequentially triggered to their alternate states in response to the first five input pulses. On the fifth input pulse, flip-flop 568 is triggered to its alternate state thus reversed biasing diode 612 so that it will no longer pass input pulses and forward biasing diode 614 so that it will pass input pulses. The next five input pulses are passed through gates 592, 596, 600, 604 and 608 in sequential order to trigger the flip-flops to their initial states in sequential order, thus following the scheme shown in Table III.

In order to accumulate the proper total price as was noted earlier, the sequence in which pulses are to be applied to line 459 from the cents per pound decade 312 is such that one pulse will be applied to line 459 when the number of cents per pound times the number of input pulses to decade 312 is equal to or greater than ten but less than twenty, a second pulse will be applied when this product is equal to or greater than twenty but less than thirty, and so forth, as shown in that following Table IV.

TABLE IV

| Switch Position | Pulse | | | | | | | | | |
|---|---|---|---|---|---|---|---|---|---|---|
| | 1 | 2 | 3 | 4 | 5 | 6 | 7 | 8 | 9 | 10 |
| 0 | | | | | | | | | | |
| 1 | | | | | | | | | | X |
| 2 | | | | | X | | | | | X |
| 3 | | | | X | | | X | | | X |
| 4 | | | X | | X | | | X | | X |
| 5 | | X | | X | | X | | X | | X |
| 6 | | X | | X | X | | X | | X | X |
| 7 | | X | X | | X | X | | X | X | X |
| 8 | | X | X | X | X | | X | X | X | X |
| 9 | | X | X | X | X | X | X | X | X | X |

To produce this sequence of pulses, a separate gate is connected between line 459 and each of the outputs of each of the flip-flops except the right hand output of flip-flop 560. The various gates are controlled in response to switch positions on the cents/lb. control 458 and are opened in response to the switch being grounded and are closed in response to the switch connection being opened as described in conjunction with FIGURE 2. Thus the Not Function produced by flip-flop 560 is applied to line 459 through gate 440. In similar fashion, the remaining Functions and Not Functions, except the Function produced by flip-flop 560, are applied to line 459 through gates 442, 444, 446, 448, 450, 452, 454 and 456. The cents/lb. control 458 comprises four wafer switches 630, 632, 634 and 636 ganged on a single shaft. A pulse is applied to the input of one of the gates when any one of the flip-flops changes from one stable state to the other. From Table III, it can be seen that only one of the flip-flops will change its state in response to one input pulse to the cents/lb. decade 312.

When the cents/lb. control is set at 1, as shown in Table IV, a pulse should be applied to line 459 only in response to the tenth input pulse to the cents/lb. decade 312. Referring to Table III, it can be seen that the only flip-flop being triggered on the tenth input pulse is flip-flop 568, and that the Not Function of flip-flop 568 changes from a "1" to a "0." Thus the negative going pulse produced as the Not Function of binary bit E changes from a "1" to a "0" will be applied to the input of gate 454. The control of gate 454 is connected to switch contact 1 of wafer switch 630 such that when the slide contact 631 of the wafer switch is in contact therewith, it is grounded through line 626 and opens gate 454. When the cents/lb. control is set at 2, it can be seen that a pulse should be passed to line 459 in response to the fifth and the tenth input pulses. The control of gate 454 is also connected to switch contact 2 of wafer switch 630 and the gate will pass a pulse to line 459 in response to the tenth input pulse to the decade unit. Also, the control of gate 456 is connected to contact 2 of wafer switch 635 and this gate will also be open. From Table III, it can be seen that the only flip-flop undergoing a transition in response to the fifth input pulse is flip-flop 568, and that since the Function E thereof is going from a "1" to a "0," a pulse will be passed through gate 456 in response to the fifth input pulse.

When the cents/lb. control is set at 3, pulses from the cents/lb. decade are applied to line 459 on the 4th, 7th and 10th pulses as shown in Table IV, and from Table III, it can be seen that these pulses will be applied as the Functions D, $\bar{B}$, and $\bar{E}$ each change from a digital "1" to a digital "0." To effect this, $\bar{B}$ is applied to gate 442, D is applied to gate 452 and $\bar{E}$ is applied to gate 454. The control of gate 442 is connected to switch contact 3 of wafer switch 636, the control of gate 452 is connected to switch contact 3 of wafer switch 632, and the control of gate 454 is connected to switch contact 3 of wafer switch 630. No other gates are open when the control is set at 3. When the cents/lb. control is set at 4, Table IV shows that pulses should be applied to line 459 in response to the 3rd, 5th, 8th and 10th input pulses to the cents/lb. decade 312. Again from Table III, it can be seen that Functions C, E, $\bar{C}$ and $\bar{E}$ will change from a "1" to a "0," producing negative going pulses which are to be applied to line 459. To effect this, the control of gate 448 is connected to switch contact 4 of wafer switch 632, the control of gate 456 is connected to switch contact 4 of wafer switch 634, the control of gate 446 is connected to switch contact 4 of wafer switch 630 through diode 642, and the control of gate 454 is connected to switch contact 4 of wafer switch 630 through diode 640. The Functions C, E, $\bar{C}$ and $\bar{E}$ are each applied to the inputs of gates 448, 456, 446 and 454, respectively.

Diode 642 connected between switch contacts 4 and 5 of wafer switch 630 and gate 446 is provided to isolate gate 454 when sliding contact 633 of wafer switch 632 is positioned on switch contact 7, 8 or 9, as will be seen hereinafter. Diode 640 is provided to isolate gate 446 and prevent it opening when slide contact 631 of wafer switch 630 is on switch contacts 1, 2 or 3. As can be seen, when the cents per pound control is set on 4, the cathodes of the two diodes 640 and 642 are grounded and are forward biased to permit conduction therethrough, thus opening gates 446 and 454.

When the cents per pound control is set at 5, it can be seen from Table IV that pulses should be applied to line 459 in response to the 2nd, 4th, 6th, 8th and 10th input pulses to the cents decade 312; and from Table III, it can be seen that these pulses are produced as functions B, D, $\bar{A}$, $\bar{C}$ and $\bar{E}$ change from a "1" to a "0." To effect this, the functions B, D, $\bar{A}$, $\bar{C}$ and $\bar{E}$ are applied to the inputs of gates 444, 452, 440, 446 and 454, respectively. The control of gate 444 is connected to switch contact 5 of wafer switch 634, the control of gate 452 is connected to switch contact 5 of wafer switch 632, the control of gate 440 is connected to switch contact 5 of wafer switch 636, the control of gate 446 is connected to switch contact 5 of wafer switch 630 through diode 642, and the control of gate 454 is connected to switch contact 5 of wafer switch 630 through diode 640. The diodes 640 and 642 are provided for isolating the various gates, as previously described.

Extending this procedure, for every setting of the cents per pound control through 9, it can be seen that pulses are to be applied to the line 459 as set forth in Table IV, and by referring to Table III wherein only one of the functions changes from a "1" to a "0" in response to a single input pulse thereto, the particular gates to be opened can be seen by comparing Table III with Table IV. Moreover, the other various diodes 644, 646, 648, 650, 652, 654 and 656 are provided to isolate the various gates from each other so as to prevent erroneous openings of gates.

The above described decimal rate multiplication system is important in that it provides several advantages. It will be appreciated by utilizing a hundredth cents decade and connecting the cents decade like the dollars decade, the desired multiplication rounding off could be accomplished. This would be of some disadvantage in that it would require one additional binary decimal code decade. However, of much importance, it would be necessary to increase the clock frequency an order of magnitude to obtain the same computation rate as that provided by the present invention.

Thus, in one specific example of the present invention, the clock frequency is 200 kilocycles per second, providing computation of price information at a much faster rate than available competitive systems. At such a comparatively low clock pulse rate, very reliable low speed logic systems, which are relatively simple and inexpensive, can be used. If the rounding off were obtained by the expedient of adding the additional hundredth cents decade, it would be necessary to increase the clock frequency to 2 megacycles per second to obtain the same computation rate. A 2 megacycle clock rate would demand much more expensive components, much more complicated circuitry and result in a generally lower level of reliability as compared to the present system.

*Binary to Gray converter and comparator*

As mentioned previously, the twelve Gray code bits M–X are applied to the binary to Gray converter and comparator 206 for comparison with the twelve binary bits A–L from the gross weight register that comprises a portion of the computer 204. The operation of the binary to Gray converter and comparator 206, which effects the necessary comparison, will now be described with reference to FIGURE 23 of the drawings.

As shown, a source of B+ potential is connected through resistor 681 to the anodes of diodes 701, 702, 704 and 705. In similar fashion, the source of B+ potential is connected through resistor 682 to the anodes of diodes 706, 707, 708 and 709. A source of B+ potential is also connected through resistor 683 to the anodes of diodes 710, 711, 712 and 713 and through resistor 684 to the anodes of diodes 714, 715, 716 and 717. Four AND gates, each comprising three diodes, are formed by diodes 701, 702 and 704; 706, 707 and 708; 710, 711 and 712; and 714, 715 and 716. Each of the four AND gates will produce a positive output when the three functions applied to its inputs are a digital "1." The four diodes 705, 709, 713 and 717 each have their cathodes commonly connected through resistor 685 to ground. The diodes 705, 709, 713 and 717 in combination with the resistor 685 define an OR gate which produces a positive voltage across resistor 685 responsive to a positive voltage being applied to the anode of one or any number of the diodes comprising the OR gate. The above elements define a binary to Gray converting and comparison circuit designated generally by the reference character 690. The circuit 690 is capable of comparing one of the Gray code bits against appropriate binary bits from the gross weight register 316 chosen in a manner to be explained as the description unfolds. Twelve such units are provided. However, as the first through the eleventh are identical, only the first and the twelfth will be described in detail.

The twelfth unit is identical in function to the first eleven. However, since the most significant binary bit is the same as the most significant Gray code bit, as will be explained as the description continues, the number of elements in the unit has been reduced.

Operation of the above described circuit can be best understood in view of the following. Binary bits can be converted to Gray code bits in accordance with the formula $$m = A\bar{B} + \bar{A}B \quad (1)$$

where $m$ is the converted binary to Gray bit, $A$ and $\bar{B}$ are the binary functions applied to one AND gate, $\bar{A}$ and $B$ are the binary functions applied to a second AND gate, and each of the two AND gates are applied to an OR gate. The converted binary to Gray bit $m$ compares to a Gray bit M from the encoder in accordance with the formula $$T = Mm + \bar{M}\bar{m} \quad (2)$$

where M and $m$ are applied to one AND gate, $\bar{M}$ and $\bar{m}$ are applied to a second AND gate, and the two AND gates using the comparison are each applied to an OR gate. Substituting the equivalent $m$ in Equation 1 for the $m$ in Equation 2 the formula for comparison may be written as $$T = (A\bar{B} + \bar{A}B)M + [(\bar{A} + B)(A + \bar{B})]\bar{M} \quad (3)$$

and after the terms are collected, comparison may be obtained as $$T = A\bar{B}M \text{ or } \bar{A}BM \text{ or } AB\bar{M} \text{ or } \bar{A}\bar{B}\bar{M} \quad (4)$$

The above Equation 4 is a general equation for converting binary bits to a Gray bit and comparing the converted Gray bit with the Gray bit from the encoder. The following conversion equations can be written, and the necessary comparison equations can be obtained as above:

$$M = A\bar{B} + \bar{A}B \qquad S = G\bar{H} + \bar{G}H$$
$$N = B\bar{C} + \bar{B}C \qquad T = H\bar{I} + \bar{H}I$$
$$O = C\bar{D} + \bar{C}D \qquad U = I\bar{J} + \bar{I}J$$
$$P = D\bar{E} + \bar{D}E \qquad V = J\bar{K} + \bar{J}K$$
$$Q = E\bar{F} + \bar{E}F \qquad W = K\bar{L} + \bar{K}L$$
$$R = F\bar{G} + \bar{F}G \qquad X = L$$

As mentioned before, in the present system A–L represents the twelve binary bits obtainable from the gross weight register 316. The twelve binary bits are capable of defining any decimal digit from zero through 4,095, where A is the least significant binary bit and L is the most significant one. Also, the letters M–X represent the twelve Gray code bits produced by the encoder 200 and in combination form digital words representative of any decimal digit from zero through 4,095.

Figure 23:
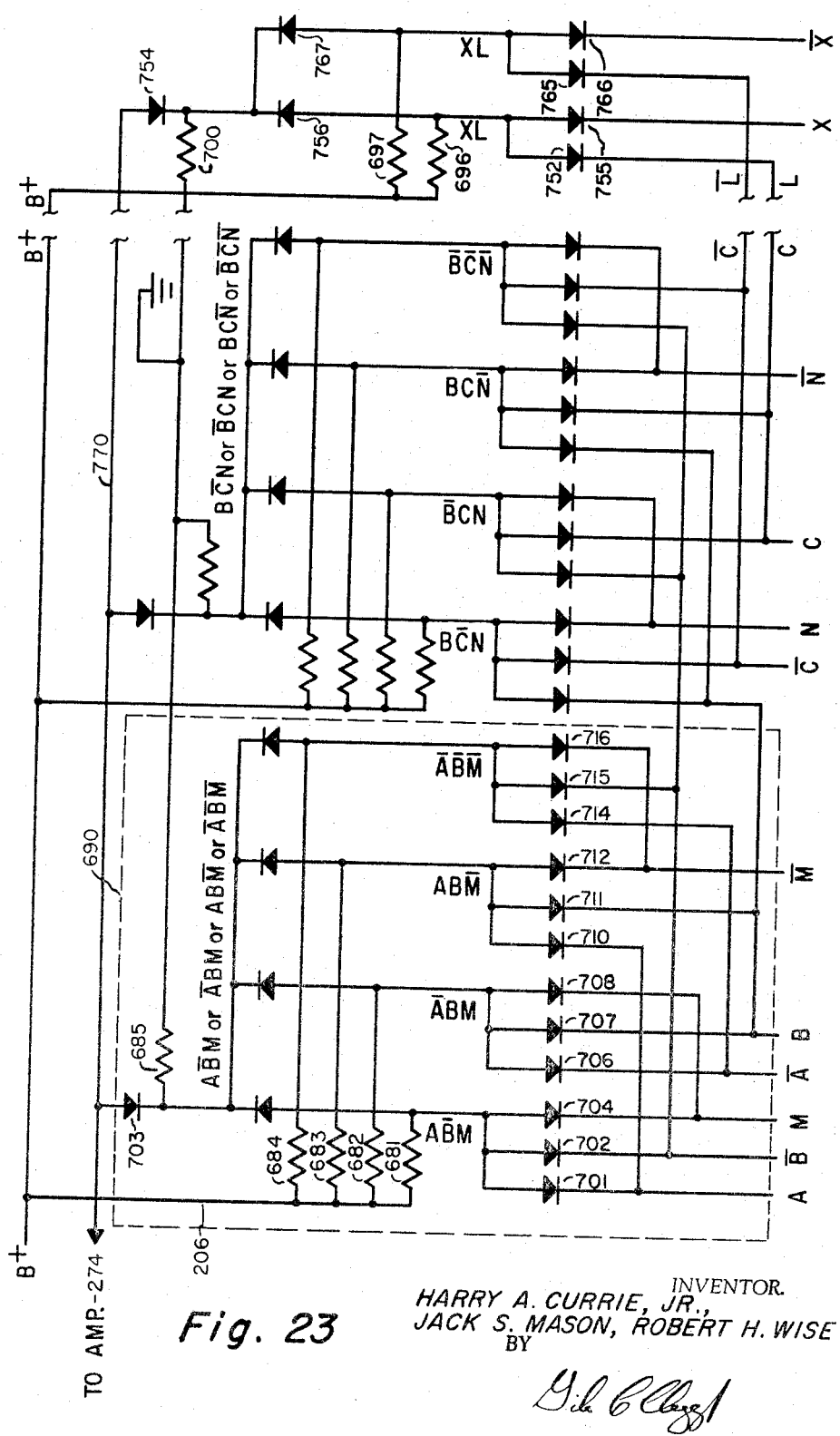
FIGURE 23 is a schematic diagram illustrating a binary to gray converter and comparator.

As shown in FIGURE 23, binary function A is connected to the cathode of diodes 701 and 710. The binary function $\bar{A}$ is connected to the cathode of diodes 706 and 714. Binary function B is connected to the cathode of diodes 707 and 711, while $\bar{B}$ is connected to the cathode of diodes 702 and 715. The Gray code function M is connected to the cathode of diodes 704 and 708, while Gray code function $\bar{M}$ is connected to the cathodes of diodes 712 and 716.

The diodes 701, 702 and 704 in conjunction with the resistor 681 comprise an AND gate which produces the function $A\bar{B}M$ when each of the functions A, $\bar{B}$ and M occurs simultaneously. The diodes 706, 707 and 708 in conjunction with the resistor 682 define a second AND gate which produces a function $\bar{A}BM$ responsive to the simultaneous occurrence of functions $\bar{A}$, B and M. Diodes 710, 711 and 712 in conjunction with resistor 683 define an AND gate which has an output the function $AB\bar{M}$ when the functions A, B and $\bar{M}$ are present simultaneously, and the fourth AND gate comprises the diodes 714, 715 and 716 in conjunction with the resistor 684. The output of the fourth AND gate is $\bar{A}\bar{B}\bar{M}$ when the binary functions $\bar{A}$ and $\bar{B}$ are present and the Gray code function $\bar{M}$ is present.

The diodes 705, 709, 713 and 717 in conjunction with the resistor 685 define a positive OR gate which produces a positive potential across the resistor 685 when any one of the functions $A\bar{B}M$ or $\bar{A}BM$ or $AB\bar{M}$ or $\bar{A}\bar{B}\bar{M}$ is present. The positive potential produced across the resistor 685 is applied to the cathode of diode 703, indicating comparison of binary bits A and B with Gray code bit M.

Twelve such converter comparison stages are provided, there being one for each of the Gray code bits. However, the twelfth unit can be simplified somewhat in view of the identical relationship between the most significant binary bit L and Gray coder bit X. Thus, the twelfth converter comparison unit is seen to comprise the source of B+ potential connected through resistor 696 to the anodes of diodes 752, 755 and 756 and through resistor 697 to the anodes of diodes 765, 766 and 767. The cathodes of diodes 756 and 767 are connected through resistor 700 to ground and through diode 754 and line 770 to the comparator amplifier 274. If the binary bit L and the Gray code bit X occur simultaneously, a function XL is produced by the AND gate comprising the resistor 696 and diodes 752 and 755. In similar fashion, if the binary Not Function $\bar{L}$ and the Gray code Not Function $\bar{X}$ are present simultaneously, the Function $\bar{X}\bar{L}$ is produced from the AND gate comprising the resistor 697 and diodes 765 and 766. If either of the Functions XL or $\bar{X}\bar{L}$ is present, the OR gate comprising diodes 756 and 767 in conjunction with resistor 700 cause a positive voltage to be produced at the cathode of diode 754, indicating comparison of binary bit L with Gray code bit X. Diodes 703, 754 and the other ten diodes from the other ten converter comparison stages comprise a 12 input AND gate whose output is line 770. When all twelve converter comparison stages are positive simultaneously, then a large positive D.C. voltage will occur on line 770, indicating comparison of all twelve binary bits, A through L, with all twelve Gray code bits, M through X.

Figure 24:
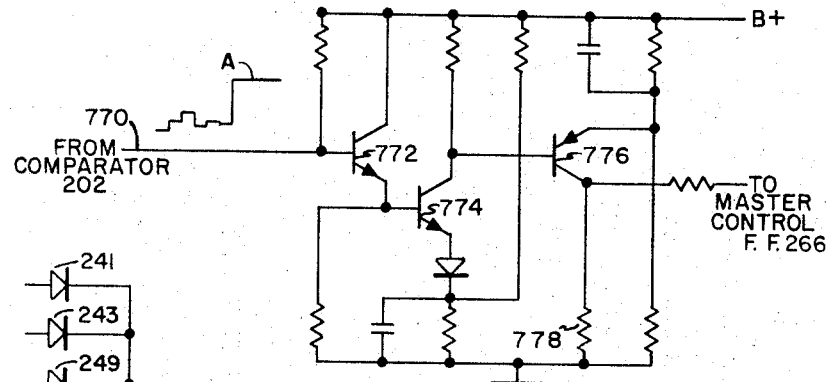
FIGURE 24 is a schematic diagram illustrating a comparator amplifier utilized in the present invention.

The waveform present on the line 770, which applies the pulses produced responsive to comparison of individual bits to the comparator amplifier may, for example, be as shown in FIGURE 24. Thus, the potential present at the input to the comparator amplifier will be dependent upon the number of Gray code bits which compare to the binary bits applied to the converter and comparator 206. If comparison between the twelve binary bits and the twelve Gray code bits occurs, output voltage A is produced on the line 770 and applied to the input of the comparator amplifier.

The comparator amplifier is shown schematically in FIGURE 24 and is seen to comprise three transistors 772, 774 and 776 connected to form an amplifier which is normally biased off. The transistor 772 is connected as an emitter follower with output applied to the base of transistor 774. Transistors 772 and 774 are normally off due to the positive bias applied to the emitter of transistor 774. This causes B+ to be applied to the base of transistor 776 biasing transistor 776 off. The potential at the collector of the transistor 776 will, therefore, normally be at ground potential. However, when the transistor 772 conducts due to the large positive comparison voltage A, transistor 774 will also begin to conduct, decreasing the amount of positive potential applied to the base of transistor 776. As the transistor 776 begins to conduct responsive to the decrease in the positive potential applied to its base, a voltage will be developed across the resistor 778, producing a positive output voltage which is applied to the left side of the master control flip-flop 266 which is a part of inhibit and control 202. This causes the master control flip-flop to immediately stop any further computation.

*Price and weight comparator*

Referring to FIGURE 25, the total price comparator 208 and the net weight comparator 210 compare the binary coded decimal bits A–D from the code disk 140 in the printer with the binary coded decimal bits A–D from each of the decades in the net weight register 318 and the total price register 330. However, the print solenoids 154 cannot be actuated until such time as the print command signal is received from the print command one shot and the switch 191 is closed by cam 188 as the shaft 138 turns.

Figure 30A:
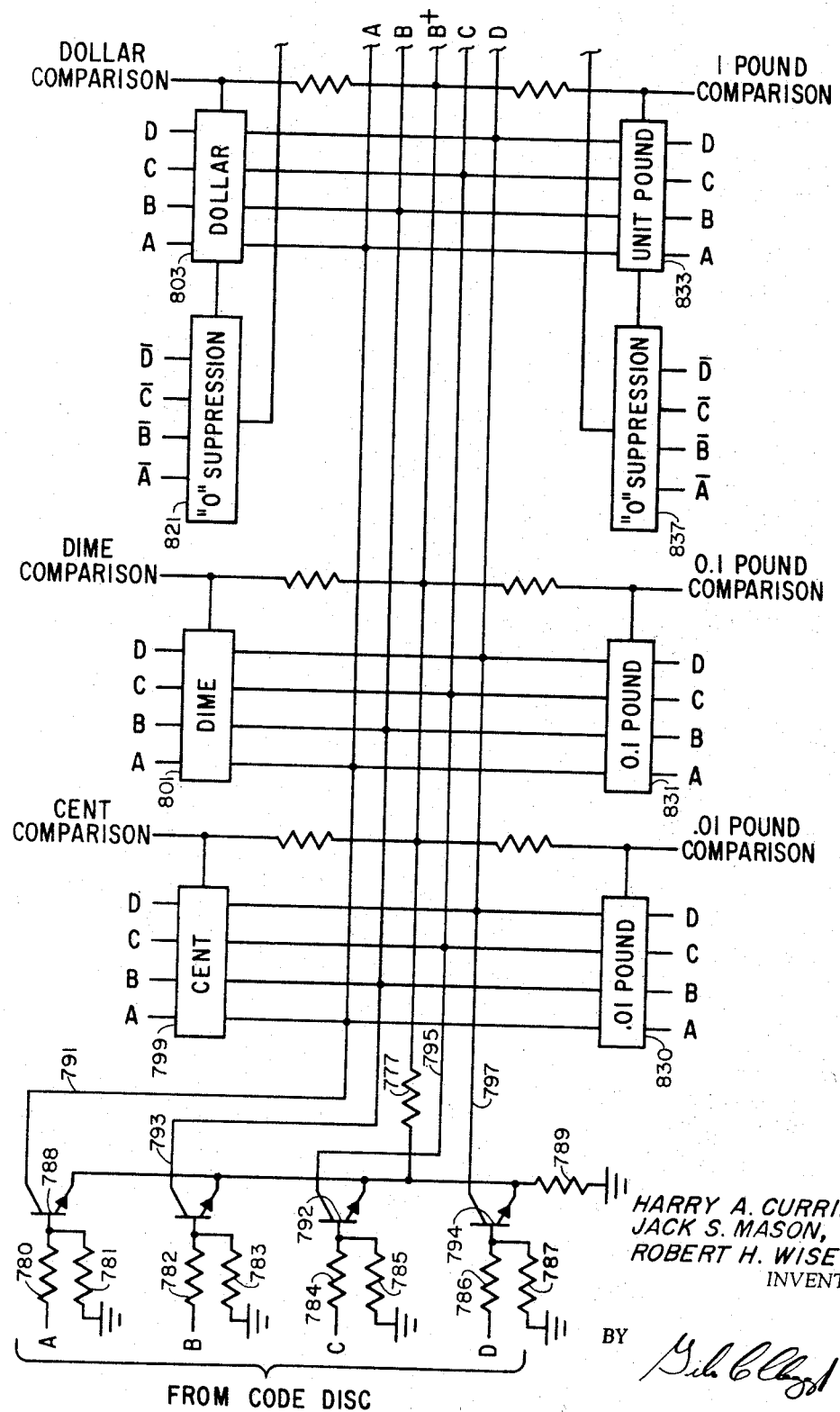

The price comparator and weight comparator are shown in FIGURES 30a and 30b wherein the right side of FIGURE 30a and the left side of FIGURE 30b are connected as indicated. The binary coded decimal bits A, B, C and D from the code disk 140, which comprises a part of the printer, are connected through resistors 780, 782, 784 and 786 to the bases of transistors 788, 790, 792 and 794, respectively. The bases of transistors 788, 790, 792 and 794 are also connected to ground through resistors 781, 783, 785 and 787, respectively. The emitters of transistors 788, 790, 792 and 794 are commonly connected to ground through resistor 789 and to a source of B+ voltage through resistor 777, positively biasing the transistors. The collectors of each of the transistors 788, 790, 792 and 794 are connected to lines 791, 793 795 and 797, respectively. Thus, four code amplifiers are provided, each of the four code amplifiers comprising one of the transistors 788, 790, 792 and 794 with the inputs of each of the amplifiers being connected to the A, B, C, and D rings, respectively, of the code disk through the wiper contacts. When one of the wipers is contacting a conductive portion of one of the code rings, B+ potential will be applied through the resistor to the base of the transistor connected thereto. In the absence of B+ potential applied to the base of one of the transistors, that particular transistor will be cut off as the emitter of the particular transistor will be above ground in an amount depending on the particular resistance of resistors 777 and 789. However, when B+ is applied to the base of one of the transistors, the transistor will begin to conduct as the base to emitter diode will be forward biased.

The total price comparator 208 can be seen to comprise five comparison circuits 799, 801, 803, 805 and 807. The comparison circuits 799, 801, 803 and 805 are identical, and only the ten dollar comparison circuit 805 is shown in detail. As shown, the comparison circuit 805 comprises four transistors 798, 806, 812 and 818. The emitters of each of the transistors are commonly connected through a resistor 802 to a source of B+ potential and through a resistor 809 to ground. The collectors of each of the transistors within the comparison circuit 805 are commonly connected through a resistor 811 to a source of B+ potential and to the output line 813. The output line connects to a solenoid driver amplifier which energizes one of the solenoids responsive to a positive output on line 813 to set the $10.00 print wheel.

It can be seen that each of the transistors 798, 806, 812 and 818 define an amplifier whose emitter is maintained above ground at a potential dependent upon the resistance of resistors 802 and 809. The emitter of each of the transistors within a comparison circuit will be somewhat more above ground than the emitters of the transistors comprising the code amplifiers. The functions A, B, C and D from the $10.00 decade of the total price register 330 are applied to the bases of transistors 798, 806, 812 and 818 through resistors 796, 804, 810 and 816, respectively. The bases of the transistors 798, 806, 812 and 818 are also each connected through diodes 800, 808, 814 and 820 to lines 791, 793, 795 and 797, respectively.

Thus, it can be seen that the base of each transistor in a comparison circuit is connected through a diode to the collector of one of the code amplifier transistors. The Function applied to the base of the transistor from one of the price decades corresponds to the Function applied to the code amplifier from the code disk. If a Function from the decade compares with a Function from the code disk, the associated transistor within the comparator circuit will be cut off. At such time as the Functions A, B, C and D from the decade compare simultaneously to the Functions A, B, C and D from the coke disk, each of the transistors within the comparison circuit will be cut off, and a positive voltage substantially equal to B+ will be applied to the solenoid amplifier. However, as long as one of the amplifiers within the comparing group is conducting, the positive voltage will not be obtained.

The hundred dollar comparison circuit 807 is similar to comparison circuit 805, the difference being that only transistors 798 and 806 with their associated resistors and diodes are provided. It will be noted that in the specific example of the system described herein, the maximum settable price per pound is 9.99, and the maximum weight to be used is 25.50. Accordingly, the maximum total price is 254.75. As the digital word for a decimal digit 2 in the binary decimal code is 0010, if transistors 812 and 818 were provided, they would always remain off and not affect the operation of the comparison circuit, since the functions C and D are each a binary "0."

The operation of the comparator can perhaps be best understood with reference to a specific example. Assume that the functions A and C are binary "1's" and the functions B and D are binary "0's." In the absence of any signal from the code amplifiers, the transistors 798 and 812 will become saturated, causing the voltage across the resistor 811 to drop. The transistors 806 and 818 will be off. The above would, of course, correspond to a digital word 0101 from the decade in the total price register. At such time as the digital word from the code disk becomes 0101, B+ will be applied to the bases of transistors 788 and 792, turning the two transistors on. The transistors 790 and 794 are biased off as described previously. When the transistors 788 and 792 turn on, the diodes 800 and 814 will become forward biased, and the potential at the base of transistors 798 and 812 will fall to approximately the same voltage as that of the emitters of transistors 806 and 818, turning the transistors 798 and 812 off. Since all of the transistors within the comparison group are now off, a positive output will be applied to the appropriate solenoid amplifier.

From the above, it will be apparent that any time the decimal word formed by the bits A, B, C, and D from a decade is zero, a zero will be printed. However, it is undesirable to print insignificant zeros in the price or weight portion of the ticket. For example, it would not be desirable to have a price $010.98 or a weight 00.56. In most prior art apparatus of the type disclosed herein, zero suppression is accomplished mechanically. However, one of the features of the present invention is the provision of electronic zero suppression circuits 821, 822 and 823, which cooperate with the comparator circuits 803, 805 and 807, respectively.

The suppression circuits 821 and 822 are identical and only the circuit 822 is shown in detail. It can be seen to comprise a transistor 824 whose collector is connected to the collectors of the comparison circuit 805 with which it is associated. In similar fashion, the emitter of transistor 824 is also connected to the emitters of the transistors within the comparison circuit 805. The base of the transistor 824 is connected through a resistor 825 to a source of B+ potential. The Not Functions of the binary coded decimal bits applied to the comparison circuit 805 are connected through diodes 826 to the base of the transistor 824. The zero suppression circuit 823 is similar to the zero suppression circuit 822, the difference being that only the functions $\overline{A}$ and $\overline{B}$ are applied as inputs, and, therefore, only two of the diodes 826 are provided. The base of the transistor in the suppression circuit 821 is connected through diode 827 to the base of the transistor in circuit 822. The diode 829 is connected between the transistors of suppression circuits 822 and 823.

The manner in which the zero suppression circuits prevent the imprinting of a zero will now be explained. For example, assume that the price mentioned above is to be printed. The digital word for the decimal digit zero is 0000. Upon comparison, each of the transistors 798, 806, 812 and 818 in each of the comparison circuits 803 and 807 will turn off. However, the Not Functions applied to the suppression circuits associated therewith will each be a binary "1," turning the transistor 824 on, preventing the positive voltage from being developed across the resistors 811 and 817 and applied to lines 813 and 821.

Comparison will be obtained in the comparison circuit 805 when the code disk 140 reaches a position such that the binary coded decimal number produced at its output forms the decimal digit "1," and each of the transistors 798, 806, 812 and 818 within comparison circuit 805 will turn off. The Not Functions applied to the suppression circuit 822 will include at least one binary "0," preventing the transistor 824 within the suppression circuit 822 turning on, and a positive pulse will be applied to the solenoid amplifier which controls the solenoid associated with the ten dollar print wheel. The diode 829, connected between the zero suppression comparison circuit 822 and the zero suppression comparison circuit 823, is reversed biased, preventing the binary "0" applied to the transistor 824 within the zero suppression circuit 822 being applied to the transistor 824 within the zero suppression circuit 823. Accordingly, the transistor within the suppression circuit 823 will remain on, and a positive voltage will not appear in line 821, and the hundred dollar print wheel will not be set on a digit. However, the diode 827, connected between the zero suppression circuit 822 and the zero suppression circuit 821, is forward biased, permitting the binary "0" applied to the input of suppression circuit 822 to also be applied to the base of the transistor within suppression circuit 821. Accordingly, the transistor within zero suppression circuit 821 will be cut off. Thus, at such time as the comparison circuit 803 indicates comparison of the decimal digit "0," all of the transistors connected to the resistor 815 will be off, and a positive voltage will be applied to the dollar solenoid amplifier for energizing the dollar solenoid to set the dollar print wheel to zero.

The weight comparator 210 comprises the comparison circuits 830, 831, 833 and 835. Zero suppression circuits 837 and 839 are also provided for cooperating with the comparison circuits 829 and 831 to prevent the printing of insignificant zeros. However, as the comparison circuits and the zero suppression circuits provided are identical to those used in the total price comparator, a detailed description thereof will not be presented.

It will be noted, however, that since the print wheels are mounted on a common shaft, a single code disk 140 can be used for setting all print wheels. The comparison circuits 830, 831, 833 and 835 compare the binary decimal code word from the code disk against the binary code word from the decades 356, 354, 352 and 350, respectively, of the net weight register 318. As each of the comparison circuits 830, 831, 833 and 835 indicate comparison, a positive voltage is applied to an appropriate one of the solenoid amplifiers for setting one of the print wheels in group 107 to print the proper net weight information.

The solenoid amplifiers 840 are suitably of the type shown in FIGURE 40 and can be seen to comprise an N-P-N transistor 841 and a P-N-P transistor 842 connected as shown. If a positive voltage is present on the output line from one of the comparison circuits connected to the base of transistor 841, the transistor 841 will conduct for the duration of the positive potential. In this connection, it will be noted that as the code disk rotates, the binary number obtained therefrom is continually changing, and therefore each comparison circuit will selectively provide a positive output of limit duration. When the transistor 841 conducts, the base of transistor 842 will become less positive, causing transistor 842 to conduct. Each of the amplifiers 840 is connected across one of the solenoids 154 as shown. A trickle resistor 843 is connected in parallel with the transistor 842 and a diode 844 is connected across the solenoid to suppress inductive voltage spikes produced when the flow of current through the coil is interrupted. As will be explained in greater detail with reference to FIGURE 38, the print solenoids 154 are commonly connected at one terminal to one side of switch 191. The other side of switch 191 is connected to a source of negative potential, suitably —12 volts. Thus, when switch 191 is closed, a small amount of current will flow through the solenoid 154 and trickle resistor 843, but the amount will be insufficient to energize the solenoid 154. However, when transistor 842 conducts, a relatively large current will flow for the duration of the positive voltage on the output line connected to transistor 841 and will cause solenoid 154 to be energized. When the transistor 842 cuts off, the trickle current flowing will be sufficient to maintain the solenoid 154 energized until switch 191 is opened. When transistor 842 is turned off and also when the switch 191 is opened, the solenoid will produce an inductive surge of voltage which is shunted by diode 844, thereby preventing damage to transistor 842 from the inductive surge of voltage.

Operation of the system

Having now described substantially all of the system in detail, the manner in which the system as a whole operates will now be given, in conjunction with a specific example wherein the net weight of the product is 3.65 lbs., and the price per pound of the product is $2.36. The operation of the system will first be described in conjunction with the mode of operation wherein the tare is set manually, and then the mode of operation wherein the tare is set automatically will be described.

The function switch 34 is suitably connected as shown in FIGURE 37. In the form shown, it comprises a single pole, double throw switch where common terminal is connected to the ground side of each of the flip flops in the tare memory register 322. When the switch is in the manual position, ground is removed from the register 322, disabling same, and B+ voltage is applied to the reset tare flip flop 248 as will be described hereinafter. When the function switch is in the automatic position, ground is provided to tare memory register 322 and the line 850 is floating.

Figure 5:
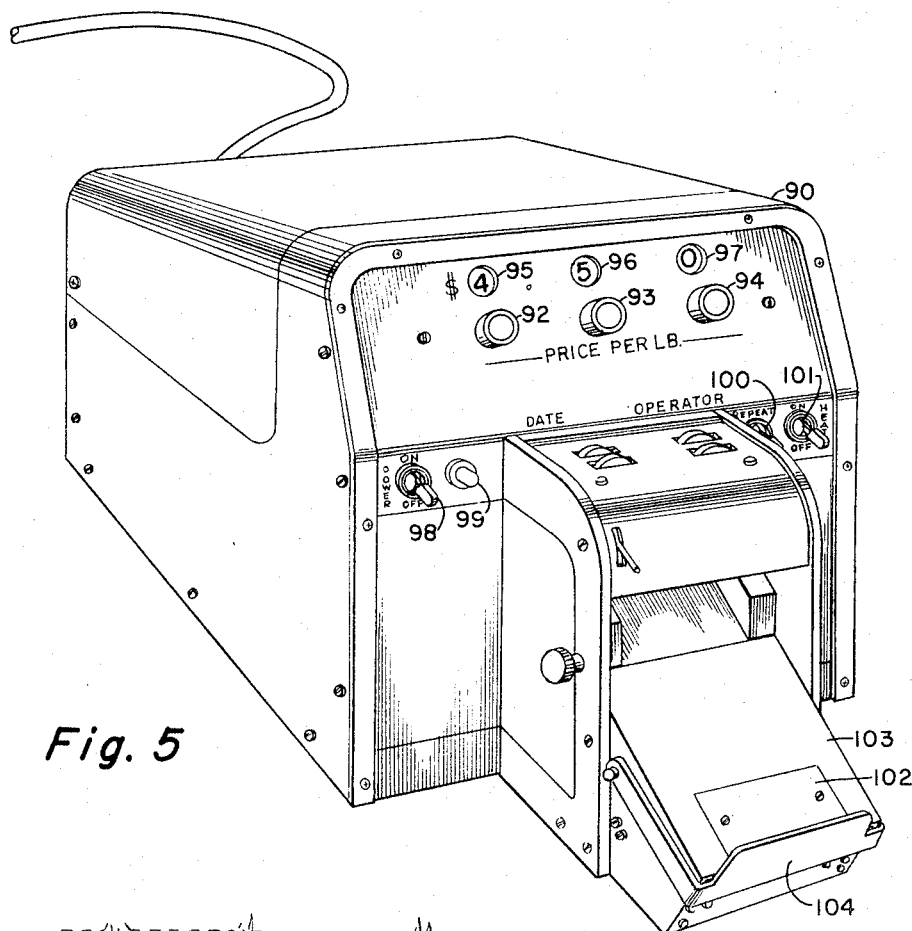
FIGURE 5 is a perspective view of the printer provided by the present invention.

To operate the system, the power switch 98 shown in FIGURE 5 is turned on providing power to all parts of the system. Referring to FIGURE 1, wrapping materials are placed on the scale, and the function switch 34 is placed in the manual position. The scale is then adjusted for zero weight using the knob 36 in conjunction with the tare set indicator 28 and zero weight light 32. At such time as a zero weight condition is obtained, the zero weight light 32 will be lit. The zero weight light is lit anytime a positive voltage is produced from the output of the zero weight detector 230 shown in FIGURES 31 and 32. With the scale adjusted for zero weight indication, the Gray code disk 72 within the optical encoder 70 shown in FIGURE 4 is positioned such that the twelve Gray code functions M-X shown in FIGURE 19 from encoder 200 (see FIGURE 18) are each a "0." Also, referring to FIGURE 31 the zero weight detector will apply a positive voltage to the master inhibit gate 234. The master inhibit gate 234 will, therefore, apply positive voltage to the control electrode of the pulse gates 258 and 260, preventing operation of the computer. Normally, in the course of setting the tare weight manually, the computer will be operated, and ticket will be printed. Therefore, the state of the remove label flip-flop 244 will be such that it will also apply a positive voltage to the master inhibit gate. Therefore, it will be necessary that the U-shaped member 104 on the printer shown in FIGURE 5 be depressed, closing the "label removed switch" (see FIGURE 31). The remove label flip-flop will then be set such that its right output is a "0." The remove label light will then go out, and a positive voltage will no longer be applied to the master inhibit gate from flip-flop 224.

When power is applied to the system, a turn on circuit 286 is used to pre-set certain circuits to an initial condition. A suitable turn on circuit is shown in FIGURE 36, and is seen to comprise a resistor 900 connected in series with a capacitor 902 between B+ voltage and ground. Diode 904 poled to be reverse biased by B+ is connected across the resistor 900. Diodes 288, 290 and 292 are provided for coupling the over terminal of capacitor 902 to the appropriate output of the circuit to be controlled. It will be recognized that each output of a flip-flop also connects to the opposite input. Thus, for example, if the capacitor 902 is connected through diode 288 to the left output of a flip-flop, it will also be connected through a bias resistor to the right input. The size of the resistor 900 is such that when power is turned on, the capacitor 902 will be charged at a lower rate than that at which a potential would normally build up at the two inputs to the flip-flop. Accordingly, the diode 288 will be forward biased tending to maintain the left output and right input of the flip-flop at ground potential, and the flip-flop will turn on with the left hand transistor conducting and the right hand transistor off. Thus, if the turn on connects to the left output, the left hand transistor will be on, and if the turn on connects to the right output, the right hand transistor will be on. Once the capacitor is charged to B+ potential, the diodes 288, 290 and 292 are reverse biased, and the turn on circuit is isolated from the flip-flop. The diode 904 performs an improtant function in that if B+ is lost for one reason or another, the capacitor 902 will discharge very rapidly. Should B+ be applied immediately, the turn on circuit causes the flip-flop to assume its proper state dependent upon the connection to the flip-flop as described above, insuring that an erroneous count caused by a momentary loss of B+ will not result in an erroneous ticket. If the diode 904 had not been present, the capacitor would have discharged slowly and if B+ were to be off only momentarily, the capacitor would not have discharged enough to set the flip-flops.

Thus, at the time that power is applied, the turn on circuit 286 will apply ground potential to the collector of the left hand transistor of the reset tare flip-flop 248, to the collector of the left hand transistor of the ready flip-flop 254, and to the collector of the right hand transistor of the print command one-shot. Accordingly, the right hand transistor of the reset flip-flop 248, the right hand transistor of the ready flip-flop 254, and the left hand transistor of the print command one-shot will tend to be off. However, if the function switch 34 is in the manual position, a positive voltage is applied to the left input of the reset flip-flop 248 and the right input of the ready flip-flop 254. The function switch overrides the turn on circuit 286, insuring that the state of the reset tare flip-flop will be for the left output to be a "1," and the state of the ready flip-flop will be for the right output to be a "1," each for so long as the function switch is in the manual position. The reset tare light will be out, and a "0" is applied to the master inhibit gate from flip-flop 248 and ready flip flop 254. The ready light will be on since the reset tare, ready and master control flip flops each apply a "1" to ready gate 276. The tare in light 42 will be off, as a count will not be stored in the tare memory 322. The start one shot 236 and the zero set one shot 262 are each biased such that their right outputs are each "1." The print command one shot 280 is biased such that its left output will be a "1."

The product to be weighed is then placed onto the scale. So long as the scale is moving, the motion detector 222 will provide a positive voltage to the master inhibit gate 234 as described previously. If the weight of the produce placed on the scale is in excess of 25.50 lbs., the overweight detector 232 will produce a positive output voltage which is applied to the input of the master inhibit gate 234 and also causes the overweight light 30 to become lit. However, if the weight on the scales is such that the indicated weight is greater than zero but less than 5.51 lbs., the overweight detector will not apply the positive voltage to the master inhibit gate, and the overweight light will not be lit.

As each of the outputs from the zero weight detector, motion detector, remove label flip flop, and reset tare flip flop, which are applied to the start flip flop, go from a "1" to "0," the start flip flop will be triggered. However, the pulse gate 260 is closed, and a pulse will not be applied to the zero set one shot. When the scale stabilizes, the motion detector will no longer produce a positive output voltage, and if the motion detector is the last inhibit to be removed, the output of the master inhibit gate 234 will become a "0," opening the pulse gate 260 and the pulse gate 258. As the potential at the output of the motion detector goes from a "1" to a "0," the start one shot 236 produces a negative going pulse which is applied through the pulse gate 260 to the left input of the zero one shot 262, causing the zero one shot to switch from one state to the other state, then return to he one state.

As the right output of the zero set one shot 262 changes from a "1" to "0," a negative zero set pulse is applied to the price per pound register 314, gross weight register 316, net weight register 318, and the total price register 330, setting each of the above registers to zero. In addition, the negative pulse from the right output of the zero set one shot is applied through the pulse gate 303 to the left input of the print command flip flop 280. However, the left output of the print command flip flop 280 is a "1," and, accordingly, the negative pulse will have no effect.

As the zero set one shot returns to its original state, the left output will change from a "1" to a "0," producing a negative pulse which is applied to the gross weight register as add tare pulse. However, the count in the tare memory register 322 is zero. Accordingly, the state of the gross weight register 316 will not change. The negative pulse produced by the left output of the zero set one shot is applied to the left input of the sync flip flop 264, causing its right output to change from a "1" to a "0" and opening pulse gate 272. The left output of the zero one shot is also connected to the left input of the master control flip flop through diode 268. When the left side of the zero set one-shot produces a positive pulse, it insures that the master control flip-flop is in the proper state to render the computer inoperative.

When the clock 300 next produces a pulse, it is amplified by the control gate amplifier 306 and applied through gate 272, which is now open, to the right input of sync flip flop 264. The sync flip flop will then switch causing its left output to change from a "1" to a "0." The resultant negative pulse is passed through pulse gate 273 to the left input of master control flip flop 266, causing it to switch. The left output of flip flop 266 will go from a "0" to a "1," applying power to the amplifiers 302, 304, and 328. It will be noted that the amplifiers 302, 304, and 328 were previously off, preventing clock pulses being applied to the registers in the computer. The ready light is cut off as the right output of flip flop 266 becomes "0."

Each of the registers 314, 316, 318, and 330 will then accumulate a count, as described previously with reference to the detailed description of the computer, until such time as the binary digital word from the gross weight register 316 compares to the Gray code digital word from the encoder 200. Upon comparison, the output voltage from the binary to Gray converter and comparator 206 will be a positive voltage A of amplitude sufficient to turn the comparator amplifier 274 on.

If the gross weight register should count to 4095, indicating lack of comparison, each of the Functions A–L will be a "1," and a positive voltage is applied to the input of pulse gate 252. The next clock pulse will reset the gross weight register such that each Function is a "0," and the voltage applied to gate 252 will change from a "1" to a "0." A negative going pulse is thereby produced which is passed by gate 252 and applied to start one shot 236. The start one shot will thereupon trigger the zero set one shot. As the left output of one shot 262 goes from a "0" to a "1," a positive pulse is applied through diode 268 causing the master control flip flop to change from a "1" to a "0." The resultant negative going pulse is applied through gate 258 to print command one shot 280. However, the right output of the zero set one shot is a negative going pulse which is applied to reset all registers and to the left input of print command 280 simultaneously with the negative going pulse from master control flip-flop 266. When the zero set one-shot returns to its initial condition, the sync flip-flop will again be triggered and a normal computation cycle will be started. Accordingly, the print command is prevented from switching and a ticket will not be printed. Thereafter, the system will operate normally until comparison is obtained.

The output of the comparator amplifier is applied to the left input of the master control flip-flop, and upon comparison, it produces a positive voltage which causes the left output of the master control flip-flop to change from a "1" to a "0." As the output of the master control flip-flop changes from a "1" to a "0," a negative pulse is applied through the pulse gate 258 to the right input of the print command one-shot 280. Ground is also applied to the amplifiers 302, 304 and 328, turning each of them off and preventing additional clock pulses being applied to any of the registers in the computer.

As the left output of the print one-shot 280 changes from a "1" to a "0," negative going pulse is applied through pulse gate 245 to the right input of the remove label flip-flop 244, causing the right output of the remove label flip-flop to become a "1." The positive inhibit voltage is thereupon applied to the input of the master inhibit gate 234, and the remove label light will turn on. When the print command one-shot returns to its original state, a negative voltage is applied to the print command solenoid 197. The period of time which the voltage is applied to the print command solenoid will, of course, depend upon the relaxation time of the print command one-shot. Also, a negative going pulse is applied to the input of the pulse gate 278. However, the ready flip-flop is applying a positive control voltage to the control electrode of the pulse gate 278, and the pulse will not pass.

Turning now to FIGURE 38 of the drawings, a portion of the inhibit and control 202 physically located within the printer 14, will be described. Thus, it is seen that one side of the print command solenoid 197 is connected to ground. The other side is connected to the print command one-shot 280. The other side of the print command solenoid 197 is also connected to the repeat switch 102. When the print command solenoid is energized, the member 194 is caused to pivot about the pin 195 closing the switch 198. Power is thereupon applied to the motor 144 from a source of supply voltage, suitable 110 volts A.C. When power is applied to the motor, it will begin to turn and drive the clutch 139 in the direction shown. As described previously with reference to the printer 14, when the member 194 is actuated by the print command solenoid, the clutch will be engaged, and the shaft 138 will turn in the direction shown. At the end of the print command pulse, the print command solenoid will become de-energized. However, by this time the clutch will have rotated sufficiently that the member 194 will bear on the periphery of the clutch, and the clutch will remain engaged for one revolution.

When the cam wheel 188 closes the switch 191, minus 12 volts will be applied to each of the twelve solenoids 154, and trickle current will flow through the solenoids and trickle resistors 843 and 910 to source of B+ potential, suitably positive 18 volts. Only three solenoids are shown, each one representing the solenoids in one of the three groups. As the code disk 140, also mounted on the shaft 138, turns, binary coded decimal words indicative of the shaft position and thereby indicative of the position of the print wheels in the three groups are applied to the total price comparator 208 and the net weight comparator 210. As described previously, upon comparison of any digit within either the total price number of the net weight, one of the transistors 842 which comprise the last stage of the solenoid amplifier will turn on momentarily, permitting a large pulse current to pass through the transistor for purposes of setting the print wheels in groups 107 and 108. At the end of the pulse, from the comparator, the transistor will turn off. However, the current flowing through the resistor 843, although not sufficient to energize the solenoid, will be sufficient to maintain it in its energized state. Also, as described previously, the insulated disk member 174 carries two wipers 176 which cooperate with wafer switches 912 for setting the price per pound print wheels in group 109.

Turning now to FIGURE 39 of the drawings, the manner in which the price per pound print wheels are set will be described. Thus, as described previously with respect to the printer, the printed circuit board 164 having a generally annular conductive area 170 is provided. The conductive area 170 is connected to a source of B+ voltage, suitably plus 18 volts. Also, as mentioned previously, ten conductive areas 172 are also provided. Each of the conductive areas 172 is connected to one of the contacts on each of three wafer switches 912A, 912B, and 912C. The wiper 914A of the switch 912A is driven by the knob 92 on the printer 14. In similar fashion, wipers 914B and 914C are operated by knobs 93 and 94. Thus, if the price per pound set in the scale is $2.36, the wiper 914A will engage the contact number 2, the wiper 914B will engage contact number 3, and the wiper 914C will engage contact number 6 of switch 912C. The wiper 914A is connected through a resistor 910A to a B+ voltage and to one side of the solenoid 154 associated with the dollar per pound print wheel in group 109. In similar fashion, wiper 914B is connected through resistor 910B to B+ and to one side of the print solenoid associated with the ten cent per pound print wheel, and the wiper 914C is connected through resistor 910C to B+ and to one side of the solenoid 154 associated with the cent per pound print wheel.

As described previously, the other side of each of the solenoids 154 is connected through the switch 191 to the source of minus 12 volts. The two wipers 176 on the disk 174 are conductibly connected together such that B+ voltage is sequentially applied to the conductive areas 172, and power will be applied to the solenoids 154 at a time dependent upon the position of the switch wiper connected thereto. Thus, when the dollar per pound print wheel is in a position such that the character 2 faces the platen, wipers 176 will apply B+ to position 2 of switch 912A and the solenoid 154 connected thereto will be energized, causing the dollar per pound print wheel to be positioned with the character 2 facing downward. As the wiper moves into position 3, voltage will be removed. However, current flowing from B+ through the resistor 910A will be sufficient to maintain the solenoid 154 energized. Thereafter, the ten cent per pound print wheel will be set in position 3, and the cent per pound print wheel will be set in position 6. In accordance with this preferred embodiment of the invention, zero suppression is provided for the dollar per pound print wheel in the price per pound group 109 by not connecting a wire to the zero position terminal of switch 912A.

By the time the shaft 138 has rotated approximately one-half revolution, each of the print wheels in group 107–109 will have been set to the desired character or to a blank.

After such time as the print wheels have been set but prior to the time that the cam wheel 188 allows the switch 191 to open, the cam wheel 189 closes switch 192 applying power to the print solenoid 121. When the print solenoid 121 is energized, the platen 117 is raised against the print wheels, and if used, the commodity slug printing the ticket with the desired information. Both of the switches 191 and 192 are then permitted to open removing power from the print solenoid 121 and from each of the print wheel solenoids 154.

At substantially this point in time, the direction of rotation of shaft 85 on which the print wheels are mounted will change, and the print wheels will start to return to the neutral position. The switch 193 will be closed by cam wheel 190, causing power to be applied to the paper drive solenoid 177 and to relay coil 920 which is effective to close switch 922. When the paper drive solenoid 177 is energized, the shear blade 175 is cocked and the pressure roller 163 causes the tape of tickets to engage the paper drive roller 155, driving the tape of tickets forward. As the tape of tickets moves forward, the index switch 187 is closed, causing power to be applied to the paper drive solenoid 117 and to the solenoid 920 until such time as the tape of tickets is properly indexed for the next printing operation. It will be seen that power will be applied to the motor 144 through switch 922 as long as the coil 920 is energized.

Prior to the time that the tape of tickets is properly indexed for the next printing operation, the shaft 138 will have completed one revolution, and the member 194 will engage the notch 196 in the clutch 139 permitting the switch 198 to open. At such time as the tape of tickets is properly indexed for the next printing operation, the switch 187 will be open, removing power from the motor and from the paper drive solenoid. The shear blade will, thereupon, fall, shearing the printed ticket from the tape of tickets and causing the label to slide down the chute 103 to rest on heating pad 102. Thereafter, when the U-shaped bracket member 104 is depressed in the course of removal of the label, the switch 924 will be closed.

If the repeat switch 100 is in the normal position shown, a negative pulse will be applied to the remove label flip-flop 244, causing the remove label light to be cut off and the positive voltage to be removed from the input to the master inhibit gate and the input to the pulse gate 245. However, when the produce is removed from the scale, the indicated weight on the scale will go to zero, and the zero weight detector will apply a positive voltage to the master inhibit gate 234. Therefore, when the pulse gate 260 is closed, the system will be in readiness for the next weighing and computing operation. If the repeat switch 100 were in the repeat position when the switch 924 was closed, the print command solenoid 197 would again be energized and the printing cycle described above would be repeated. Since a negative pulse is not applied to the remove label flip flop, it will remain in the state such that its right output is a "1," and the master inhibit gate will produce a positive output which is effective to prevent the count in the registers being disturbed. As many identical tickets as are desired can thereupon be obtained by depressing the U-shaped bracket member.

If the tare is to be set automatically, the function switch 34 is placed in the automatic position, providing a ground for the tare memory 322 and removing B+ from the reset tare and ready flip flops. When the power is turned on, the flip flops and one shots will turn on in the state described previously, except that the turn on circuit 286 will cause the right output of the reset tare flip flop 248 to be a "1" and the right output of the ready flip flop 254 to be a "1." Accordingly, the reset flip flop 248 will apply a positive voltage to the reset tare light, causing it to be lit, and to the input of the master inhibit gate 234. As a positive voltage will not be applied to the ready gate 276 from the reset tare flip flop, the ready light will be out.

When the reset tare switch 38 is depressed, a negative pulse is applied to the left input of the reset tare flip flop 248, causing the right output to change from a "1" to a "0" and causing the reset tare light to go out and its positive inhibit voltage to be removed from the master inhibit gate 234. The left side of the reset tare flip-flop 248 will apply positive voltage to ready gate 276. The negative pulse from the reset tare switch is also applied to the left input of the ready flip-flop causing it to switch to a state such that the right output is a "0." When the right output of the ready flip-flop is a "0," the pulse gate 278 is open, the positive voltage is removed from ready gate 276 preventing the ready light being lit, and ground is applied to the total price amplifier 328 preventing it being operative. Also, as the right output changes from a "1" to a "0," a negative going zero set pulse is applied to tare memory register 322.

When the tare weight is placed on the scale after the reset tare switch is actuated, a negative going pulse is produced by the motion detector of the zero weight detector as the last inhibit voltage is removed. The negative going pulse triggers the start one-shot 236. Start one-shot 236 thereupon produces a negative going pulse which is applied through the pulse gate 260 to the left input of the zero set one-shot 262. As the right output of the one-shot 262 goes from a "1" to a "0," a zero set pulse is supplied to the registers 314, 316, 318 and 330, as described previously. When the left side of the zero set one-shot goes from a "1" to a "0" at the end of the zero set pulse, a negative going pulse is applied to the sync flip-flop through gate 265, causing the sync flip-flop to produce a "0" at its right output. As the gate 272 is then open, the next succeeding clock pulse will be passed through the control gate amplifier 306 and pulse gate 272 to trigger the sync flip-flop 264.

When the sync flip-flop 264 is triggered, it closes the pulse gate 272 and applies a negative going pulse through the pulse gate 273 to the input of the master control flip-flop 226. The master control flip-flop then switches states such that its left output is a "1." The positive voltage produced at the left output of the master control flip-flop is applied to the amplifiers 328, 302 and 304 for purposes of enabling same and permitting the clock pulses to be applied to the registers 314, 316, 318 and 330. At such time as the count in the gross weight register 316 corresponds to the indicated tare weight, the binary to Gray converter and comparator 206 will produce a positive output voltage, as described previously.

The positive output voltage from the converter and comparator 206 is applied through the amplifier 274 to the input of the master control flip-flop, causing it to switch states. As the left output of the master control flip-flop goes from a "1" to a "0," the amplifiers 328, 302 and 304 are cut off, and a negative pulse is applied through gate 258 to the print command one-shot 280. The print command one-shot applies a negative pulse to the print command solenoid causing the printer to print a ticket imprinted with the indicated tare weight as described previously with respect to the manual mode of operation. However, the ticket will have zero total price printed on it because the total price amplifier 328 was disabled by the ground (binary "0") applied from the right side of ready flip-flop 254 through diode 282. Also, as the print command one-shot 280 returns to its original state, a negative pulse is applied through the pulse gate 278 which is now opened, to the tare memory 322 as a tare set pulse which causes the tare memory to assume the count stored in the gross weight register 316. The tare set pulse is also applied to the right input of the ready flip-flop 254 causing the ready flip-flop to change states. As the ready flip-flop switches states, its right output will become a "1," closing the pulse gate 278 and applying a positive voltage to the ready gate 276. The ready gate will now receive three positive voltages, one from the master control flip-flop, one from the ready flip-flop 254, and one from the reset tare flip-flop 248, and the ready light 44 will become lit. The remove label light will, however, also be lit, and a positive voltage will be applied to the master inhibit gate 234.

At such time as the ticket which was printed with the tare weight information printed thereon is removed, the label removed switch will be closed, causing the remove label flip-flop to change states, and the system will be in condition for operation in the automatic mode with the tare set in the system. It will be noted that the same tare weight will be set in the system until the reset switch is closed or power is interrupted. Thereafter, when the product to be weighed is placed on the scale with the wrapping material, at such time as the zero weight detector, motion detector, and overweight detector no longer provide a positive potential to the master inhibit gate 234, the start one-shot 236 will be triggered, and a negative pulse will be applied to the zero set one-shot 262. When the zero set one-shot is triggered, its left side goes positive and a positive add tare pulse is applied through diode 268 to the input of the master control flip-flop, preventing clock pulses being applied to any of the registers. Simultaneously, a negative zero set pulse is applied to each of the registers 314, 316, 318 and 330 from its right output, causing each to be set to a zero count. As the zero set one-shot returns to its original state, the left side applies a negative add tare pulse to the gross weight register 316, causing it to assume the count stored in the tare memory register. It will be appreciated that the count stored in the tare memory register is the indicated tare weight and not necessarily the correct tare weight. However, as explained previously, it is not necessary that the tare weight be correct to obtain an accurate indication of net weight, and the scales need not be carefully adjusted for zero weight.

A negative going add tare pulse is also applied through the gate 265 to the sync flip-flop 264 causing it to switch state wherein the right output is a "0" and the left output of a "1." However, the positive pulse produced as the left output of the sync flip-flop changes from a "0" to a "1" is blocked by the pulse gate 273. Thereafter, the next clock pulse generated is applied through the control gate amplifier 306 and pulse gate 272 to the right input of the sync flip-flop 264 causing it to switch states. As the left output of the sync flip-flop goes from a "1" to a "0," a negative pulse is applied to the master control flip-flop which causes it to switch states and apply positive voltage to the input of pulse gate 258 and to the amplifiers 328, 302 and 304. The ready light will go off and pulses will be applied to registers 314, 316, 318 and 330.

At such time as comparison is reached, positive voltage A will be applied to the left input of the master control flip-flop, causing it to again switch states removing the positive voltage from amplifiers 328, 302 and 304 and preventing further pulses being applied to any of the registers. A negative going pulse is applied through gate 258 to the right input of the print command one-shot, causing it to produce a negative pulse which is applied to the print command solenoid 197. Also, negative pulse is produced at the right output of the print command one-shot 280. However, the pulse gate 278 is closed due to the positive potential present at the right output of the ready flip-flop 254, and the state of the tare memory register 322 is not disturbed.

The left output of the print command flip-flop also causes a negative pulse to be applied through pulse gate 245 to the remove label flip-flop. As the remove label flip-flop switches states, it produces a "1" at its right output which causes the remove label light to be lit and a positive voltage to be applied to the master inhibit gate 234.

Thus, it is seen that at the end of the print cycle, each of the flip-flops and one shots will be in a condition which existed at the time the tare was set, except for the differences in count within the various registers. It is also seen that the tare memory register is not disturbed and that the same indicated tare weight will be used for each additional weighing operation until such times as the tare reset switch is again closed for purposes of resetting a different tare weight into the tare memory register 322 or the function switch is placed in the manual position.

It can be seen, in view of the foregoing description that the present invention provides a price computing and marking apparatus which offers many practical advantages. For example, optical coupling is used between the scale weighing mechanism and the computer and control, substantially reducing the frictional drag on the scale and thereby rendering it possible to obtain a more sensitive indication of weight. Although the encoder produces an output in digital Gray code form which is representative of the displacement of the scale linkages at any instant of time, the computer is disabled until such time as conditions are suitable for obtaining an accurate indication of weight and conditions are not present which would adversely affect the computation of weight and price.

In this connection, it will be noted that the information from the scale is not used directly in the computation of the price and weight data, but rather is only used in conjunction with a binary to Gray converter and comparator for disabling the computer at a predetermined point in the operation of the computer. By utilizing digital techniques throughout the computer and control, the maximum possible accuracy is obtained, the size and weight of the system is reduced, but the speed of operation is greater than most prior art systems. Of greater significance is the apparatus and manner in which compensation for the tare weight of the wrapping materials is automatically and accurately obtained and wherein it is not necessary that the scale be accurately set to zero for a very precise indication of net weight and total price to be obtained. Further, a unique system of zero suppression is provided which prevents insignificant "0"'s being printed.

Within the computer itself, a unique decimal rate multiplication system is provided which permits the multiplication of two numbers, each of which is expressed in hundredths, and the product is rounded off to hundredths. The decimal rate multiplication system is one which permits multiplication at a rate equal to that of prior art systems, but using a clock frequency an order of magnitude less. As a result, the cost of the system is greatly reduced in that less complex circuitry and less expensive components can be used.

The system of the present invention is extremely simple to operate, yet very reliable. The only operations required of the operator is to place the product on the scale and affix the printed tag to the product. The mode of operation is very reliable in that a system of inhibits prevents the printing of a ticket if the scale is disturbed or if, in some instances, the computer and control fails to operate properly. For example, the computer is inhibited if the scale is moving, if the scale indicates zero weight, if the scale indicates an overweight condition, if the tare has not been set when operating in the automatic mode, if the last printed ticket has not been removed, or if an indication of comparison between the computed weight and the measured weight is not obtained. Thus, the apparatus provided by the present invention is characterized by being of relatively small size and low cost but yet capable of high operating speeds with a high degree of accuracy and reliability. It is very versatile, and unskilled operators can use it.

Although the invention has been described with reference to a specific preferred embodiment, many changes and modifications will be obvious to those skilled in the art. It will, therefore, be understood that the invention is not intended to be limited to the precise form of apparatus described herein, but that such changes and modifications may be made without departing from the scope of the invention defined in the appended claims.

What we claim is:

1. A computing scale system comprising:
a weighing mechanism including a scale and a movable element proportionally displaced by a weight on said scale;
a digital computer for computing the weight and price of an article weighed by said weighing mechanism;
and an optical shaft position encoder coupling said computer to said weighing mechanism;
said encoder being proportionally mechanically rotated by said movable element,
said encoder having a plurality of parallel weight outputs describing a weight on said scale in a cyclic digital code,
a portion of said weight outputs of said encoder providing a distinctive parallel digital output at a predetermined overweight level,
said computer including motion detector means sensing a change in at least one of said encoder weight outputs and providing an inhibit signal inhibiting operation of said computer,
said computer including means for automatically storing tare weight and zero weight scale error from said weight outputs of said encoder and including means for subtracting said stored tare weight and zero weight scale error from said weight outputs of said encoder,
said computer including an internal clock pulse generator, a weight register, a price register, multiplier means, and selectable input means for selectably setting price per unit weight information therein,
said multiplier means being driven by said clock pulse generator and providing a number of output pulses to the price register proportional to and controlled by said selectable input means and said weight outputs of said encoder,
said weight register accumulating a total number of pulses from said clock pulse generator determined by said weight outputs of said encoder; and
output means actuated by said computer providing output indicia indicative of the net weight and price of an article on said scale from said price register and said weight register.

2. A computing scale system comprising:
a weighing mechanism including a scale and a movable element proportionally displaced by a weight on said scale;
a digital computer for computing the weight and price of an article weighed by said weighing mechanism;
and an optical shaft position encoder coupling said computer to said weighing mechanism;
said encoder being proportionally mechanically rotated by said movable element,
said encoder having a plurality of parallel weight outputs describing a weight on said scale in a cyclic digital code,
said computer including an internal clock pulse generator, a weight register, a price register, multiplier means, and selectable input means for selectably setting price per unit weight information therein,
said multiplier means being driven by said clock pulse generator and providing a number of output pulses to the price register proportional to and controlled by said selectable input means and said weight outputs of said encoder,
said weight register accumulating a total number of pulses from said clock pulse generator determined by said weight outputs of said encoder; and
output means actuated by said computer providing output indicia indicative of the net weight and price of an article on said scale from said price register and said weight register.

3. The computing scale system of claim 2 wherein:
a portion of said weight outputs of said encoder provide a distinctive parallel digital output at a predetermined overweight level, and
said computer includes motion detector means sensing a change in at least one of said encoder weight outputs and providing an inhibit signal inhibiting operation of said computer.

4. The computing scale system of claim 2 wherein:
said computer includes a gross weight register and a separate net weight register,
said computer including a storage means for selectably automatically storing tare weight and zero weight scale error from said weight outputs of said encoder responsive to a tare weight placed on said scale,
said computer including selectable means for repeatably positively presetting said gross weight register from said storage means with said stored tare weight and zero weight scale error, and means for presetting said net weight register and said price register to zero,
said computer including means for applying an equal number of pulses from said clock pulse generator to said gross weight register and said net weight register and simultaneously applying pulses from said multiplier circuit to said price register, said computer including comparator means for halting the accumulation of pulses in both said gross weight and net weight registers when the indication of the number of pulses accumulated in said gross weight register becomes equal to said weight outputs of said encoder, whereby said net weight register indicates the net weight of the article on said scale.

5. The computing scale system of claim 2 wherein:

said computer includes automatic recycling means actuated by an accumulation of pulses in said weight register in excess of a preset maximum accumulation, said automatic recycling means automatically resetting said weight register to its initial condition, resetting said price register to zero, and restarting the accumulation of pulses from said clock pulse generator.

References Cited

UNITED STATES PATENTS

| | | | |
|---|---|---|---|
| 2,948,464 | 8/1960 | Allen | 235—58 |
| 3,064,743 | 11/1962 | Marshall | 235—58 X |
| 3,071,318 | 1/1963 | Allen | 235—58 |
| 3,084,285 | 4/1963 | Bell | 235—160 |
| 3,104,806 | 9/1963 | Allen | 235—58 |
| 3,163,247 | 12/1964 | Bell | 177—3 |
| 3,177,957 | 4/1965 | Adler | 235—58 |

OTHER REFERENCES

Pages 83–86, July 1962, Kennedy, D.W. and Hibscher, C. W., Weighing Scales Couple to Computer, in Control Engineering.

Page 462, 1957, Richards, R. K., Digital Computer Components and Circuits, N.J., D. Van Nostrand.

MALCOLM A. MORRISON, *Primary Examiner.*

I. FAIBISCH, M. J. SPIVAK, *Assistant Examiners.*